US010579212B2

(12) United States Patent
Gross et al.

(10) Patent No.: US 10,579,212 B2
(45) Date of Patent: Mar. 3, 2020

(54) STRUCTURED SUGGESTIONS

(71) Applicant: Apple Inc., Cupertino, CA (US)

(72) Inventors: Daniel C. Gross, San Francisco, CA (US); Lawrence Y. Yang, San Francisco, CA (US); Stephen O. Lemay, Palo Alto, CA (US); Tiffany S. Jon, Sunnyvale, CA (US)

(73) Assignee: APPLE INC., Cupertino, CA (US)

( * ) Notice: Subject to any disclaimer, the term of this patent is extended or adjusted under 35 U.S.C. 154(b) by 39 days.

(21) Appl. No.: 14/724,751

(22) Filed: May 28, 2015

(65) Prior Publication Data

US 2015/0347985 A1 Dec. 3, 2015

Related U.S. Application Data

(63) Continuation-in-part of application No. 14/718,049, filed on May 20, 2015.
(Continued)

(51) Int. Cl.
*G06F 16/9535* (2019.01)
*G06F 3/0482* (2013.01)
(Continued)

(52) U.S. Cl.
CPC ........ *G06F 3/0482* (2013.01); *G06F 16/2379* (2019.01); *G06F 16/9535* (2019.01);
(Continued)

(58) Field of Classification Search
CPC ......... G06F 17/30595; G06F 17/30587; G06F 3/0482; G06F 3/0481; G06F 3/048; G06F 3/2379; G06F 3/9535; G06Q 10/10; G06Q 10/107; G06Q 10/109; G06Q 10/06; G06Q 10/1095; G06Q 50/01; H04L 12/58;
(Continued)

(56) References Cited

U.S. PATENT DOCUMENTS 5,946,647 A 8/1999 Miller et al.
5,949,647 A 9/1999 Kolman et al.
(Continued)

FOREIGN PATENT DOCUMENTS

AU 2015100705 A4 6/2015
CN 1248744 A 3/2000
(Continued)

OTHER PUBLICATIONS

Smith, Detecting and Browsing Events in Unstructured Text, SIGIR'02, Aug. 1115, 2002, Tampere, Finland. (Year: 2002).*
(Continued)

*Primary Examiner* — Jay A Morrison
*Assistant Examiner* — Antonio J Caiado
(74) *Attorney, Agent, or Firm* — Dentons US LLP

(57) ABSTRACT

An electronic device suggests contacts and calendar events for users based on their messages. The device can analyze a user's messages for contact and event information and automatically generate or update suggested contacts and calendar events for the user based on this information. The suggested contacts and calendar events can be searchable as if they were manually entered by the user, and the user can choose to add or ignore the suggested contacts and calendar events.

45 Claims, 35 Drawing Sheets

Related U.S. Application Data

(60) Provisional application No. 62/005,839, filed on May 30, 2014.

(51) Int. Cl.
    *G06Q 10/10*                 (2012.01)
    *H04L 12/58*               (2006.01)
    *G06F 16/23*               (2019.01)
    *G06Q 50/00*               (2012.01)

(52) U.S. Cl.
    CPC .......... *G06Q 10/107* (2013.01); *G06Q 10/109* (2013.01); *G06Q 10/1095* (2013.01); *G06Q 50/01* (2013.01); *H04L 51/046* (2013.01); *H04L 51/08* (2013.01)

(58) Field of Classification Search
    CPC ....... H04L 29/06; H04L 51/046; H04L 51/16; H04L 51/22; H04L 51/28; H04L 51/08
    USPC ........................ 707/722; 704/9, 235; 715/758
    See application file for complete search history.

(56) References Cited

U.S. PATENT DOCUMENTS

| | | |
|---|---|---|
| 6,323,846 B1 | 11/2001 | Westerman et al. |
| 6,349,299 B1 | 2/2002 | Spencer et al. |
| 6,570,557 B1 | 5/2003 | Westerman et al. |
| 6,629,793 B1 | 10/2003 | Miller |
| 6,677,932 B1 | 1/2004 | Westerman |
| 6,987,991 B2 | 1/2006 | Nelson |
| 6,990,452 B1 | 1/2006 | Ostermann et al. |
| 7,167,731 B2 | 1/2007 | Nelson |
| 7,419,469 B2 | 9/2008 | Vacca |
| 7,480,870 B2 | 1/2009 | Anzures et al. |
| 7,502,606 B2 | 3/2009 | Flynt et al. |
| 7,573,984 B2 | 8/2009 | Ger et al. |
| 7,614,008 B2 | 11/2009 | Ording |
| 7,633,076 B2 | 12/2009 | Huppi et al. |
| 7,653,883 B2 | 1/2010 | Hotelling et al. |
| 7,657,849 B2 | 2/2010 | Chaudhri et al. |
| 7,663,607 B2 | 2/2010 | Hotelling et al. |
| 7,669,135 B2 | 2/2010 | Cunningham et al. |
| 7,730,143 B1 | 6/2010 | Appelman |
| 7,844,914 B2 | 11/2010 | Andre et al. |
| 7,890,996 B1 | 2/2011 | Chauhan et al. |
| 7,903,801 B1 | 3/2011 | Ruckart |
| 7,957,762 B2 | 6/2011 | Herz et al. |
| 8,006,002 B2 | 8/2011 | Kalayjian et al. |
| 8,069,166 B2 * | 11/2011 | Alvarado ............ G06Q 10/109 |
| | | 707/722 |
| 8,074,172 B2 | 12/2011 | Kocienda et al. |
| 8,078,978 B2 | 12/2011 | Perry et al. |
| 8,232,973 B2 | 7/2012 | Kocienda et al. |
| 8,239,784 B2 | 8/2012 | Hotelling et al. |
| 8,255,810 B2 | 8/2012 | Moore et al. |
| 8,279,180 B2 | 10/2012 | Hotelling et al. |
| RE43,835 E | 11/2012 | Knight et al. |
| 8,381,135 B2 | 2/2013 | Hotelling et al. |
| 8,423,577 B1 | 4/2013 | Lee et al. |
| 8,479,122 B2 | 7/2013 | Hotelling et al. |
| 8,502,856 B2 | 8/2013 | Cranfill et al. |
| 8,539,382 B2 | 9/2013 | Lyon et al. |
| 8,543,927 B1 | 9/2013 | McKinley et al. |
| 8,832,584 B1 | 9/2014 | Agarwal et al. |
| 8,893,023 B2 | 11/2014 | Perry et al. |
| 8,903,718 B2 | 12/2014 | Akuwudike |
| 8,930,820 B1 * | 1/2015 | Elwell ................. G06Q 10/109 |
| | | 705/319 |
| 8,996,639 B1 | 3/2015 | Faaborg et al. |
| 9,015,149 B2 | 4/2015 | Lucovsky et al. |
| 9,143,907 B1 | 9/2015 | Caldwell et al. |
| 9,213,754 B1 | 12/2015 | Zhang et al. |
| 9,246,870 B2 | 1/2016 | Parker et al. |
| 9,317,870 B2 | 4/2016 | Tew et al. |
| 9,460,290 B2 | 10/2016 | Glew et al. |
| 9,665,574 B1 | 5/2017 | Rose |
| 9,817,436 B2 | 11/2017 | Christie et al. |
| 9,819,768 B2 | 11/2017 | Toledo et al. |
| 9,928,272 B1 | 3/2018 | Niyogi et al. |
| 10,013,601 B2 | 6/2018 | Ebersman et al. |
| 2002/0015024 A1 | 2/2002 | Westerman et al. |
| 2003/0078981 A1 | 4/2003 | Harms et al. |
| 2003/0115189 A1* | 6/2003 | Srinivasa ............. G06F 16/335 |
| 2003/0158855 A1* | 8/2003 | Farnham .............. G06F 3/0481 |
| 2003/0158860 A1 | 8/2003 | Caughey |
| 2004/0054736 A1 | 3/2004 | Daniell et al. |
| 2004/0066404 A1 | 4/2004 | Malik et al. |
| 2004/0186848 A1 | 9/2004 | Kobashikawa et al. |
| 2005/0081150 A1 | 4/2005 | Beardow |
| 2005/0131888 A1 | 6/2005 | Tafoya et al. |
| 2005/0156873 A1 | 7/2005 | Walter et al. |
| 2005/0190059 A1 | 9/2005 | Wehrenberg |
| 2005/0197846 A1 | 9/2005 | Pezaris et al. |
| 2005/0198131 A1 | 9/2005 | Appelman et al. |
| 2005/0204007 A1 | 9/2005 | Mcgregor et al. |
| 2005/0289173 A1 | 12/2005 | Vacca |
| 2006/0017692 A1 | 1/2006 | Wehrenberg et al. |
| 2006/0025091 A1 | 2/2006 | Buford |
| 2006/0026536 A1 | 2/2006 | Hotelling et al. |
| 2006/0033724 A1 | 2/2006 | Chaudhri et al. |
| 2006/0053386 A1 | 3/2006 | Kuhl et al. |
| 2006/0080276 A1 | 4/2006 | Suzuki et al. |
| 2006/0184584 A1 | 8/2006 | Dunn et al. |
| 2006/0197753 A1 | 9/2006 | Hotelling |
| 2006/0206713 A1 | 9/2006 | Hickman et al. |
| 2006/0267931 A1 | 11/2006 | Vainio et al. |
| 2007/0002077 A1 | 1/2007 | Gopalakrishnan |
| 2007/0064882 A1 | 3/2007 | Ger et al. |
| 2007/0100898 A1 | 5/2007 | Petras et al. |
| 2007/0125860 A1 | 6/2007 | Lapstun et al. |
| 2007/0162454 A1 | 7/2007 | D'Albora et al. |
| 2007/0171924 A1 | 7/2007 | Eisner et al. |
| 2008/0009300 A1 | 1/2008 | Vuong |
| 2008/0122796 A1 | 5/2008 | Jobs et al. |
| 2008/0126075 A1 | 5/2008 | Thorn |
| 2008/0126314 A1 | 5/2008 | Thorn |
| 2008/0133479 A1 | 6/2008 | Zelevinsky et al. |
| 2008/0168144 A1 | 7/2008 | Lee |
| 2008/0207184 A1* | 8/2008 | Wassingbo ........... H04M 1/7253 |
| | | 455/417 |
| 2008/0208812 A1 | 8/2008 | Quoc et al. |
| 2008/0235242 A1 | 9/2008 | Swanburg et al. |
| 2008/0261569 A1 | 10/2008 | Britt et al. |
| 2008/0270559 A1 | 10/2008 | Milosavljevic |
| 2008/0281643 A1 | 11/2008 | Wertheimer et al. |
| 2008/0320391 A1 | 12/2008 | Lemay et al. |
| 2009/0040875 A1* | 2/2009 | Buzescu .............. G06Q 10/109 |
| | | 368/29 |
| 2009/0089342 A1 | 4/2009 | Runstedler et al. |
| 2009/0106695 A1 | 4/2009 | Perry et al. |
| 2009/0149204 A1 | 6/2009 | Riley et al. |
| 2009/0158173 A1* | 6/2009 | Palahnuk ............... G06Q 30/00 |
| | | 715/753 |
| 2009/0219166 A1* | 9/2009 | MacFarlane ....... H04M 1/72566 |
| | | 340/691.4 |
| 2009/0248415 A1 | 10/2009 | Jablokov et al. |
| 2009/0284471 A1 | 11/2009 | Longe et al. |
| 2009/0292690 A1* | 11/2009 | Culbert ................. G06Q 10/107 |
| 2009/0305730 A1 | 12/2009 | Herz et al. |
| 2009/0306969 A1 | 12/2009 | Goud et al. |
| 2009/0319288 A1 | 12/2009 | Slaney et al. |
| 2010/0011304 A1 | 1/2010 | Van Os |
| 2010/0082239 A1* | 4/2010 | Hardy .................... G01C 21/26 |
| | | 701/532 |
| 2010/0088302 A1 | 4/2010 | Block |
| 2010/0112989 A1 | 5/2010 | Andreasson |
| 2010/0123724 A1 | 5/2010 | Moore et al. |
| 2010/0125785 A1 | 5/2010 | Moore et al. |
| 2010/0138933 A1 | 6/2010 | Yamashita et al. |
| 2010/0144323 A1 | 6/2010 | Collins et al. |
| 2010/0175001 A1* | 7/2010 | Lazarus ............... G06Q 10/109 |
| | | 715/753 |
| 2010/0248757 A1 | 9/2010 | Baek |

(56) References Cited

U.S. PATENT DOCUMENTS

| | | | |
|---|---|---|---|
| 2010/0287241 A1 | 11/2010 | Swanburg et al. | |
| 2010/0291948 A1 | 11/2010 | Wu et al. | |
| 2010/0312838 A1* | 12/2010 | Lyon | G06Q 10/109 709/206 |
| 2010/0323730 A1 | 12/2010 | Karmarkar | |
| 2011/0009109 A1 | 1/2011 | Hyon | |
| 2011/0047492 A1 | 2/2011 | Bostrom et al. | |
| 2011/0054976 A1* | 3/2011 | Adler | G06Q 10/109 705/7.18 |
| 2011/0072394 A1 | 3/2011 | Victor | |
| 2011/0093328 A1* | 4/2011 | Woolcott | G06Q 30/02 705/14.41 |
| 2011/0105190 A1 | 5/2011 | Cha et al. | |
| 2011/0141493 A1* | 6/2011 | Berger | G06Q 10/109 358/1.6 |
| 2011/0151850 A1 | 6/2011 | Haaparanta et al. | |
| 2011/0161878 A1 | 6/2011 | Stallings et al. | |
| 2011/0164058 A1 | 7/2011 | Lemay | |
| 2011/0184768 A1* | 7/2011 | Norton | G06Q 10/02 705/5 |
| 2011/0201387 A1 | 8/2011 | Paek et al. | |
| 2011/0252351 A1* | 10/2011 | Sikora | G06Q 10/109 715/769 |
| 2011/0294525 A1 | 12/2011 | Jonsson | |
| 2011/0302249 A1 | 12/2011 | Orr et al. | |
| 2012/0030194 A1* | 2/2012 | Jain | G06F 3/0481 707/722 |
| 2012/0079373 A1 | 3/2012 | Kocienda et al. | |
| 2012/0084340 A1 | 4/2012 | McCormack et al. | |
| 2012/0096389 A1 | 4/2012 | Flam et al. | |
| 2012/0108217 A1 | 5/2012 | Iwaki | |
| 2012/0117036 A1 | 5/2012 | Lester et al. | |
| 2012/0124153 A1* | 5/2012 | Carroll | G06Q 10/107 709/206 |
| 2012/0136855 A1 | 5/2012 | Ni et al. | |
| 2012/0173222 A1 | 7/2012 | Wang et al. | |
| 2012/0185486 A1* | 7/2012 | Voigt | H04L 51/32 707/741 |
| 2012/0259842 A1 | 10/2012 | Oman et al. | |
| 2012/0271676 A1* | 10/2012 | Aravamudan | G06Q 10/1093 705/7.18 |
| 2012/0271957 A1 | 10/2012 | Carney et al. | |
| 2012/0278765 A1 | 11/2012 | Kuwahara | |
| 2013/0007036 A1 | 1/2013 | Childs et al. | |
| 2013/0024910 A1 | 1/2013 | Verma et al. | |
| 2013/0067039 A1 | 3/2013 | Hartzler et al. | |
| 2013/0085786 A1 | 4/2013 | Longtine et al. | |
| 2013/0132964 A1 | 5/2013 | Kim et al. | |
| 2013/0159919 A1 | 6/2013 | Leydon | |
| 2013/0173600 A1* | 7/2013 | Edwards | G06F 19/327 707/722 |
| 2013/0173602 A1* | 7/2013 | James | G06F 19/32 707/722 |
| 2013/0185285 A1 | 7/2013 | Shuman et al. | |
| 2013/0189961 A1 | 7/2013 | Channakeshava et al. | |
| 2013/0204897 A1 | 8/2013 | McDougall | |
| 2013/0211869 A1* | 8/2013 | Subramanyaiah | G06Q 10/06314 705/7.24 |
| 2013/0246329 A1 | 9/2013 | Pasquero et al. | |
| 2013/0246518 A1 | 9/2013 | Nace | |
| 2013/0253906 A1 | 9/2013 | Archer et al. | |
| 2013/0275923 A1 | 10/2013 | Griffin et al. | |
| 2013/0282421 A1* | 10/2013 | Graff | G06Q 10/1093 705/7.18 |
| 2013/0297317 A1 | 11/2013 | Lee et al. | |
| 2013/0300645 A1 | 11/2013 | Fedorov | |
| 2013/0325970 A1 | 12/2013 | Roberts et al. | |
| 2013/0326385 A1* | 12/2013 | Verstraete | G06F 3/0484 715/771 |
| 2013/0332525 A1* | 12/2013 | Liu | G06Q 50/01 709/204 |
| 2013/0339283 A1 | 12/2013 | Grieves et al. | |
| 2014/0006970 A1 | 1/2014 | Casey et al. | |
| 2014/0010358 A1 | 1/2014 | Patil et al. | |
| 2014/0025371 A1 | 1/2014 | Min | |
| 2014/0032550 A1 | 1/2014 | Park et al. | |
| 2014/0040243 A1 | 2/2014 | Rubinstein et al. | |
| 2014/0040368 A1 | 2/2014 | Janssens | |
| 2014/0066044 A1 | 3/2014 | Ramnani et al. | |
| 2014/0067702 A1* | 3/2014 | Rathod | G06Q 10/10 705/319 |
| 2014/0143687 A1* | 5/2014 | Tan | G06F 3/1462 715/757 |
| 2014/0156262 A1 | 6/2014 | Yuen et al. | |
| 2014/0163954 A1 | 6/2014 | Joshi et al. | |
| 2014/0165006 A1 | 6/2014 | Chaudhri et al. | |
| 2014/0179358 A1 | 6/2014 | Khan et al. | |
| 2014/0181681 A1 | 6/2014 | Keinanen et al. | |
| 2014/0278379 A1 | 9/2014 | Coccaro et al. | |
| 2014/0282211 A1 | 9/2014 | Ady et al. | |
| 2014/0288990 A1* | 9/2014 | Moore | G06Q 10/1095 705/7.19 |
| 2014/0317502 A1 | 10/2014 | Brown et al. | |
| 2014/0334616 A1 | 11/2014 | Jeong et al. | |
| 2014/0337438 A1 | 11/2014 | Govande et al. | |
| 2014/0349690 A1 | 11/2014 | Yang | |
| 2014/0365226 A1 | 12/2014 | Sinha | |
| 2014/0372898 A1* | 12/2014 | Ayres | G06Q 10/109 715/744 |
| 2015/0012554 A1 | 1/2015 | Midtun | |
| 2015/0015511 A1 | 1/2015 | Kwak et al. | |
| 2015/0046828 A1 | 2/2015 | Desai et al. | |
| 2015/0100537 A1 | 4/2015 | Grieves et al. | |
| 2015/0127628 A1* | 5/2015 | Rathod | H04W 4/206 707/710 |
| 2015/0172241 A1 | 6/2015 | Sharma et al. | |
| 2015/0172419 A1 | 6/2015 | Toledo et al. | |
| 2015/0188858 A1 | 7/2015 | Nagata et al. | |
| 2015/0188861 A1 | 7/2015 | Esplin et al. | |
| 2015/0188869 A1 | 7/2015 | Gilad et al. | |
| 2015/0199371 A1 | 7/2015 | Loofbourrow et al. | |
| 2015/0201062 A1 | 7/2015 | Shih et al. | |
| 2015/0220774 A1 | 8/2015 | Ebersman et al. | |
| 2015/0222586 A1 | 8/2015 | Ebersman et al. | |
| 2015/0227611 A1 | 8/2015 | Bao et al. | |
| 2015/0269164 A1 | 9/2015 | Jo et al. | |
| 2015/0294220 A1* | 10/2015 | Oreif | G06F 16/338 706/12 |
| 2015/0324420 A1* | 11/2015 | Rubinstein | G06F 17/30528 707/722 |
| 2015/0347534 A1 | 12/2015 | Gross et al. | |
| 2015/0347586 A1* | 12/2015 | Fasen | G06Q 10/1093 707/722 |
| 2015/0347630 A1 | 12/2015 | Li | |
| 2015/0350118 A1 | 12/2015 | Yang et al. | |
| 2015/0358447 A1 | 12/2015 | Horling et al. | |
| 2016/0021168 A1 | 1/2016 | Chaudhri et al. | |
| 2016/0125071 A1 | 5/2016 | Gabbai | |
| 2016/0182410 A1 | 6/2016 | Janakiraman et al. | |
| 2016/0196577 A1* | 7/2016 | Reese | H04W 4/029 705/14.5 |
| 2016/0224540 A1 | 8/2016 | Stewart et al. | |
| 2016/0337301 A1 | 11/2016 | Rollins et al. | |
| 2016/0359771 A1 | 12/2016 | Sridhar | |
| 2017/0010769 A1 | 1/2017 | Gross et al. | |
| 2017/0011354 A1 | 1/2017 | Gross et al. | |
| 2017/0011355 A1 | 1/2017 | Gross et al. | |
| 2017/0024697 A1 | 1/2017 | Baessler et al. | |
| 2017/0075878 A1 | 3/2017 | Jon et al. | |
| 2017/0325056 A1* | 11/2017 | Mehta | H04W 4/02 |
| 2018/0032997 A1* | 2/2018 | Gordon | G06Q 20/3224 |
| 2018/0063324 A1 | 3/2018 | Van Meter, II | |
| 2018/0302501 A1 | 10/2018 | Toledo et al. | |

FOREIGN PATENT DOCUMENTS

| | | |
|---|---|---|
| CN | 1413008 A | 4/2003 |
| CN | 101247366 A | 8/2008 |
| CN | 101326523 A | 12/2008 |
| CN | 101401407 A | 4/2009 |

(56) References Cited

FOREIGN PATENT DOCUMENTS

| | | |
|---|---|---|
| CN | 101557409 A | 10/2009 |
| CN | 101895623 A | 11/2010 |
| CN | 101951425 A | 1/2011 |
| CN | 102055832 A | 5/2011 |
| CN | 102289431 A | 12/2011 |
| CN | 103079008 A | 5/2013 |
| CN | 103377276 A | 10/2013 |
| CN | 205038557 U | 2/2016 |
| EP | 0987641 A2 | 3/2000 |
| EP | 2172833 A1 | 4/2010 |
| EP | 2393046 A1 | 12/2011 |
| EP | 2688014 A1 | 1/2014 |
| EP | 2713323 A1 | 4/2014 |
| EP | 2770762 A1 | 8/2014 |
| GB | 2412546 A | 9/2005 |
| JP | 9-244969 A | 9/1997 |
| JP | 10-171827 A | 6/1998 |
| JP | 2005-32160 A | 2/2005 |
| JP | 2005-517234 A | 6/2005 |
| JP | 2011-250134 A | 12/2011 |
| JP | 2012-059083 A | 3/2012 |
| JP | 2013137592 A | 7/2013 |
| JP | 5287315 B2 | 9/2013 |
| JP | 2014-509804 A | 4/2014 |
| WO | 99/16181 A1 | 4/1999 |
| WO | 2000/55739 A1 | 9/2000 |
| WO | 03/067365 A2 | 8/2003 |

OTHER PUBLICATIONS

Smith, Detecting Events with Date and Place Information in Unstructured Text, JCDL'02, Jul. 1317, 2002, Portland, Oregon, USA. (Year: 2003).*
Final Office Action received for U.S. Appl. No. 14/719,163, dated Feb. 26, 2016, 36 pages.
Non-Final Office Action received for U.S. Appl. No. 14/719,163, dated Sep. 25, 2015, 37 pages.
Office Action received for Netherlands Patent Application No. 2014870 dated Feb. 1, 2016, 13 pages (6 pages of English Translation and 7 pages of Official copy).
Office Action received for Australian Patent Application No. 2015100705, dated Jul. 20, 2015, 6 pages.
Office Action received for Australian Patent Application No. 2015100705, dated Jan. 13, 2016, 3 pages.
Notice of Allowance received for Chinese Patent Application No. 201520364899.5, dated Jan. 12, 2016, 5 pages (3 pages of English Translation and 2 pages of Official copy).
Intention to Grant received for Danish Patent Application No. PA201570316 dated Feb. 19, 2016, 3 pages.
Office Action received for Danish Patent Application No. PA201570316, dated Aug. 28, 2015, 8 pages.
Iphoneblog, "[iPhone-Game] The Secret of Monkey Island: Special Edition", available at https://www.youtube.com/watch?v=2YuxCWA0sEg, Jul. 23, 2009, 2 pages.
International Search Report and Written Opinion received for PCT Patent Application No. PCT/US2015/032055, dated Oct. 15, 2015, 21 pages.
Invitation to Pay Additional Fees received for PCT Patent Application No. PCT/US2015/032055, dated Aug. 6, 2015, 9 pages.
Rogerthat, "Quick Starter Guide | Rogerthat Enterprise", available at http://www.rogerthat.net/guide/quick-starter-guide/, 2014, 4 pages.
Smith, Shamblesguru, "Handwrite a Google Search on an iPad", available at https://www.youtube.com/watch?v=2zlQ20whYak, Jul. 28, 2012, 2 pages.
Notice of Allowance received for Denmark Patent Application No. PA201570316, dated Jul. 7, 2016, 2 pages.
Extended European Search Report received for European Patent Application No. 16190190.5, dated Feb. 27, 2017, 7 pages.
International Search Report and Written Opinion received for PCT Patent Application No. PCT/US2016/048044, dated Oct. 31, 2016, 9 pages.

Office Action received for Netherland Patent Application No. 2016997, dated Feb. 6, 2017, 12 pages. (1 page of English Translation and 11 pages of Official Copy).
"WhatsApp", Online available at :—http://web.archive.org/web/20140122054942/http://www.whatsapp.com/, Jan. 22, 2014, 2 pages.
Extended European Search Report received for European Patent Application No. 16190201.0, dated Mar. 24, 2017, 7 Pages.
Extended European Search Report received for European Patent Application No. 16190204.4, dated Mar. 24, 2017, 7 pages.
Office Action received for Australian Patent Application No. 2015266840, dated Mar. 27, 2017, 3 Pages.
Office Action received for Taiwanese Patent Application No. 104117530, dated Mar. 2, 2017, 13 pages (6 pages of English Translation and 7 pages of Official Copy).
International Search Report and Written Opinion received for PCT Patent Application No. PCT/US2015/033023, dated Aug. 12, 2015, 14 pages.
International Preliminary Report on Patentability received for PCT Patent Application No. PCT/US2015/032055, dated Dec. 15, 2016, 15 pages.
International Preliminary Report on Patentability received for PCT Patent Application No. PCT/US2015/033023, dated Dec. 15, 2016, 11 pages.
International Search Report and Written Opinion received for PCT Patent Application No. PCT/US2016/025418, dated Jul. 1, 2016, 20 pages.
Non-Final Office Action received for U.S. Appl. No. 14/846,574, dated Jun. 22, 2017, 21 pages.
Filipowicz, Luke, "How to use the QuickType keyboard in iOS 8", available online at <https://www.imore.com/comment/568232>, Oct. 11, 2014, pp. 1-3.
Office Action received for Taiwanese Patent Application No. 104117530, dated Jul. 6, 2017, 7 pages (3 pages of English Translation and 4 pages of Official Copy).
Extended European Search Report received for European Patent Application No. 16190186.3, dated Mar. 28, 2017, 7 pages.
Final Office Action received for U.S. Appl. No. 14/719,163, dated Apr. 20, 2017, 36 pages.
Decision to Grant received for Danish patent Application No. PA201670430, dated Jul. 18, 2017, 2 pages.
Non-Final Office Action received for U.S. Appl. No. 15/273,593, dated Jul. 11, 2017, 20 pages.
Notice of Allowance received for Taiwanese Patent Application No. 104117505, dated Jun. 30, 2017, 3 pages (Official Copy only) (See communication under 37 CFR § 1.98(a) (3)).
Search Report and Opinion received for Netherlands Patent Application No. 2016996, dated Jun. 23, 2017, 8 pages (1 pages of English Translation and 7 pages of Official Copy).
Search Report and Opinion received for Netherlands Patent Application No. 2017011, dated Jun. 23, 2017, 8 pages (1 pages of English Translation and 7 pages of Official Copy).
Search Report and Opinion received for Netherlands Patent Application No. 2017012, dated Jun. 23, 2017, 9 pages (1 page of English Translation and 8 pages of Official Copy).
Office Action received for Chinese Patent Application No. 201510291041.5, dated Jul. 24, 2017, 22 pages (6 pages of English Translation and 16 pages of Official Copy).
Office Action received for Korean Patent Application No. 10-2016-7033576, dated Sep. 8, 2017, 19 pages (11 pages of English Translation and 8 pages of Official Copy).
Non-Final Office Action received for U.S. Appl. No. 15/188,081, dated Jun. 8, 2017, 17 pages.
Intention to Grant received for Danish Patent Application No. PA201670430, dated May 8, 2017, 2 pages.
Non-Final Office Action received for U.S. Appl. No. 14/718,049, dated May 16, 2017, 33 pages.
Office Action received for Australian Patent Application No. 2016231587, dated Apr. 27, 2017, 3 pages.
Office Action received for Australian Patent Application No. 2016231588, dated Apr. 27, 2017, 3 pages.
Office Action received for Australian Patent Application No. 2016231589, dated Apr. 27, 2017, 3 pages.

(56) References Cited

OTHER PUBLICATIONS

Office Action received for Australian Patent Application No. 2016231590, dated Apr. 27, 2017, 3 pages.
Office Action received for Korean Patent Application No. 10-2016-7033576, dated Jul. 25, 2018, 5 pages (2 pages of English Translation and 3 pages of Official Copy).
Office Action received for Chinese Patent Application No. 201510291041.5, dated May 24, 2018, 18 pages (3 pages of English Translation and 15 pages of Official Copy).
Office Action received for European Patent Application No. 15728336.7 dated Jul. 17, 2018, 8 pages.
Office Action received for Japanese Patent Application No. 2018-093215, dated Jun. 19, 2018, 10 pages (5 pages of English Translation and 5 pages of Official copy).
Notice of Acceptance received for Australian Patent Application No. 2016231589, dated Apr. 11, 2018, 3 pages.
Notice of Acceptance received for Australian patent Application No. 2016231590, dated Apr. 11, 2018, 3 pages.
Office Action received for Japanese Patent Application No. 2017-515016, dated Apr. 13, 2018, 4 pages (1 pages of English Translation and 3 pages of Official Copy).
Examiner's Answer to Appeal Brief received for U.S. Appl. No. 14/719,163, dated May 17, 2018, 48 pages.
Notice of Acceptance received for Australian Patent Application No. 2015266840, dated Mar. 14, 2018, 3 pages.
Notice of Acceptance received for Australian Patent Application No. 2016231588, dated Mar. 14, 2018, 3 pages.
Office Action received for Australian Patent Application No. 2016231587, dated Mar. 12, 2018, 2 pages.
Office Action received for Japanese Patent Application No. 2017-515016, dated Dec. 15, 2017, 10 pages (5 pages of English Translation and 5 pages of Official Copy).
Advisory Action received for U.S. Appl. No. 14/718,049, dated Apr. 19, 2018, 4 pages.
Final Office Action received for U.S. Appl. No. 15/273,593, dated Apr. 5, 2018, 29 pages.
Final Office Action received for U.S. Appl. No. 14/718,049, dated Dec. 6, 2017, 44 pages.
International Preliminary Report on Patentability received for PCT Patent Application No. PCT/US2016/025418, dated Dec. 21, 2017, 16 pages.
International Preliminary Report on Patentability received for PCT Patent Application No. PCT/US2016/048044, dated Mar. 22, 2018, 8 pages.
Non-Final Office Action received for U.S. Appl. No. 14/846,574, dated Nov. 29, 2017, 27 pages.
Non-Final Office Action received for U.S. Appl. No. 15/188,081, dated Mar. 30, 2018, 21 pages.
Notice of Acceptance received for Australian Patent Application No. 2016231587, dated Apr. 23, 2018, 3 pages.
Notice of Allowance received for Japanese Patent Application No. 2018-093215, dated Nov. 2, 2018, 5 Pages (2 pages of English Translation and 3 pages of Official copy).
Office Action received for European Patent Application No. 16190190.5, dated Oct. 29, 2018, 8 pages.
Extended European Search Report received for European Patent Application No. 16807953.1, dated Dec. 4, 2018, 7 pages.
Final Office Action received for U.S. Appl. No. 15/188,081, dated Dec. 13, 2018, 10 pages.
Non Final Office Action received for U.S. Appl. No. 15/273,593, dated Nov. 27, 2018, 31 pages.
Office Action received for European Patent Application No. 16190186.3, dated Nov. 30, 2018, 8 pages.
Office Action received for European Patent Application No. 16190201.0, dated Nov. 20, 2018, 8 pages.
Office Action received for European Patent Application No. 16190204.4, dated Nov. 20, 2018, 7 pages.
IOS 8 Release, "Quick Type Keyboard on iOS 8 Makes Typing Easier", Online available at: < https://www.youtube.com/watch?v=0CIdLR4fhVU >, Jun. 3, 2014, 3 pages.
Non-Final Office Action received for U.S. Appl. No. 15/273,584, dated Jan. 31, 2019, 30 pages.
Notice of Allowance received for Korean Patent Application No. 10-2016-7033576, dated Jan. 24, 2019, 4 pages (2 pages of English Translation and 2 pages of Official Copy).
Search Report and Opinion received for Netherlands Patent Application No. 2017005, dated Sep. 5, 2018, 13 pages (Official Copy Only) (Please see communication under 37 CFR § 1.98(a) (3).
Non-Final Office Action received for U.S. Appl. No. 14/718,049, dated Oct. 5, 2018, 70 pages.
Non-Final Office Action received for U.S. Appl. No. 14/846,574, dated Sep. 20, 2018, 61 pages.
Inews and Tech, "How to Use the QuickType Keyboard in IOS 8", Available online at: http://www.inewsandtech.com/how-to-use-the-quicktype-keyboard-in-ios-8/, Sep. 17, 2014, 6 pages.
Office Action received for Chinese Patent Application No. 201580028663.7, dated Feb. 27, 2019, 16 pages (6 pages of English Translation and 10 pages of Official Copy).
Office Action received for Korean Patent Application No. 10-2019-7012117, dated May 14, 2019, 15 pages (7 pages of English Translation and 8 pages of Official copy).
Extended European Search Report received for European Patent Application No. 16844879.3, dated Mar. 1, 2019, 6 pages.
Final Office Action received for U.S. Appl. No. 14/718,049, dated Mar. 11, 2019, 61 pages.
Non-Final Office Action received for U.S. Appl. No. 15/273,576, dated Mar. 7, 2019, 34 pages.
Search Report received for Netherlands Patent Application No. 2017007, dated Jan. 8, 2019, 15 pages (5 pages of English Translation and 10 pages of Official Copy).
Search Report received for Netherlands Patent Application No. 2017009, dated Jan. 8, 2019, 12 pages (2 pages of English Translation and 10 pages of Official Copy).
Tang et al., "ConNexus to Awarenex: Extending Awareness to Mobile Users", Sun Microsystems Laboratories, CHI'01, ACM, vol. 3, Issue No. 1, Mar. 31-Apr. 5, 2001, pp. 221-228.
Decision of Rejection received for Chinese Patent Application No. 201510291041.5, dated Feb. 27, 2019, 14 pages (3 pages of English Translation and 11 pages of Official Copy).
Final Office Action received for U.S. Appl. No. 14/846,574, dated May 10, 2019, 36 pages.
Final Office Action received for U.S. Appl. No. 15/273,593, dated May 20, 2019, 26 pages.
Non-Final Office Action received for U.S. Appl. No. 14/718,049, dated Jun. 21, 2019, 64 pages.
Notice of Allowance received for U.S. Appl. No. 15/188,081, dated Mar. 20, 2019, 6 pages.
Hazra, et al., "Sentiment Learning Using Twitter Ideograms", 8th Annual Industrial Automation and Electromechanical Engineering Conference, 2017, pp. 115-120.
Komninos, et al., "Text Input on a Smart Watch", IEEE, 2014, pp. 50-58.
Notice of Allowance received for U.S. Appl. No. 15/188,081, dated Jun. 26, 2019, 8 pages.
Advisory Action received for U.S. Appl. No. 15/273,584, dated Oct. 4, 2019, 4 pages.
Non-Final Office Action received for U.S. Appl. No. 14/846,574, dated Sep. 30, 2019, 29 pages.
Ikeda, Masaru, "beGLOBAL SEOUL 2015 Startup Battle: Talkey", YouTube Publisher, Online Available at: https://www.youtube.com/watch?v=4Wkp7sAAldg, May 14, 2015, 1 page.
Final Office Action received for U.S. Appl. No. 15/273,576, dated Jul. 23, 2019, 71 pages.
Final Office Action received for U.S. Appl. No. 15/273,584, dated Jul. 22, 2019, 51 pages.
Office Action received for Australian Patent Application No. 2018204388, dated Aug. 14, 2019, 3 pages.
Office Action received for Chinese Patent Application No. 201580028663.7, dated Aug. 8, 2019, 18 pages (8 pages of English Translation and 10 pages of Official Copy).
Notice of Acceptance received for Australian Patent Application No. 2018204388, dated Dec. 5, 2019, 3 pages.

(56) References Cited

OTHER PUBLICATIONS

Office Action received for Japanese Patent Application No. 2018-226695, dated Nov. 29, 2019, 8 pages (4 pages of English Translation and 4 pages of Official Copy).
Yoshida et al., "Mac People Basic, Let's Master Incorrupt Mail Applications!", Special Appendix of Mail Mac People, ASCII Media Works Co. Ltd., Feb. 2012, 67 pages (Official Copy Only). {See Communication under 37 CFR § 1.98(a) (3)}.

* cited by examiner

1100

1102 Receive a message

1104 Identify, in the received message, event information

1106 The identified event information comprises a date and a time

1108 The identifying comprises
identifying a format of content in the message;
identifying a template from a collection of predefined templates that is configured to recognize event information in the format of the content in the message; and
analyzing the content with the identified template for the event information 1110 The message comprises an email and the content comprises a reservation 1112 The collection of predefined templates are updated over a network 1114 The identifying comprises
identifying in the message one or more references to a date and time based on a collection of predefined references to a date and time; and
analyzing the one or more identified references to a date and time for the event information 1116 The collection of predefined references to a date and time are updated over a network 1118 One or more of the predefined references to a date and time are downgraded as a result of a request to reject the suggested calendar event

FIG. 11A

STRUCTURED SUGGESTIONS

CROSS-REFERENCE TO RELATED APPLICATIONS

This application is a Continuation-in-Part of U.S. Non-Provisional patent application Ser. No. 14/718,049, "STRUCTURED SUGGESTIONS," filed on May 20, 2015 and this application claims priority to U.S. Provisional Patent Application Ser. No. 62/005,839, "STRUCTURED SUGGESTIONS," filed on May 30, 2014, the content of each of which is hereby incorporated by reference for all purposes.

BACKGROUND

1. Field

This disclosure relates generally to context-aware computing, and more specifically, to identifying and providing suggested contact information and event information to users.

2. Description of Art

Modern electronic devices allow users to be more connected than ever to friends, colleagues and activities. However, managing contacts and calendar events on electronic devices can be burdensome. For example, adding or updating a contact or calendar event typically requires several manual steps. As a result, many users neglect to maintain their address books and calendars, choosing instead to rely on an inefficient search of stored messages and other content on their devices when they need to locate information on people or events. This can create a frustrating user experience and lead to a loss in productivity.

BRIEF SUMMARY

In some embodiments, a method of suggesting a contact comprises: at an electronic device: receiving a message; identifying, in the received message, an entity and contact information associated with the entity; determining that a contact associated with the identified entity does not exist among a plurality of contacts in a database; and in response to the determining, generating a contact associated with the entity, the generated contact comprising the contact information and an indication that the generated contact is a suggested contact.

In some embodiments, a method of suggesting a contact comprises: at an electronic device: receiving a message; identifying, in the received message, an entity and an item of contact information associated with the entity; determining that a contact associated with the identified entity exists among a plurality of contacts in a database and that the contact does not comprise the identified item of contact information; and in response to the determining, updating the contact to comprise the item of contact information and an indication that the item of contact information is a suggested item of contact information.

In some embodiments, a method of suggesting a contact comprising: at an electronic device with a display: receiving a message; identifying, in the received message, an entity and contact information associated with the entity; generating an indication that the identified contact information is suggested contact information; and displaying a first user interface corresponding to a contact associated with the entity, the first user interface comprising a first user interface object, based on the generated indication, indicating that the identified contact information is suggested contact information.

In some embodiments, a method of suggesting a contact comprising: at an electronic device with a display: receiving a message; identifying, in the received message, an entity and contact information associated with the entity; and displaying a first user interface corresponding to the received message, the first user interface comprising: a first portion comprising content of the message as received by the electronic device; and a second portion comprising: a first user interface object corresponding to the identified entity; a second user interface object corresponding to the identified contact information; and a third user interface object associated with the identified contact information that, when selected, causes the electronic device to add the identified contact information to a database.

In some embodiments, a method of suggesting a calendar event comprising: at an electronic device: receiving a message; identifying, in the received message, event information; and generating a calendar event associated with the identified event information, the generated calendar event comprising the event information and an indication that the generated calendar event is a suggested calendar event.

In some embodiments, a method of suggesting a calendar event comprising: at an electronic device with a display: receiving a message; identifying, in the received message, event information; and displaying a first user interface corresponding to the received message, the first user interface comprising: a first portion comprising content of the message as received by the electronic device; and a second portion comprising: a first user interface object corresponding to the identified event information; and a second user interface object associated with the identified event information that, when selected, causes the electronic device to add the identified event information to a database comprising a plurality of calendar events.

In some embodiments, a method of suggesting multiple contacts and/or calendar events comprising: at an electronic device with a display: receiving a message; identifying, in the received message, multiple instances of contact or event information; and displaying a first user interface corresponding to the received message, the first user interface comprising: a first portion comprising content of the message as received by the electronic device; and a second portion that, when selected, causes the electronic device to display a second user interface comprising a list of the multiple instances of identified contact or event information.

DESCRIPTION OF THE FIGURES

FIGS. 11A and 11B illustrate a flow diagram of an exemplary process for generating a suggested calendar event in accordance with some embodiments.

DETAILED DESCRIPTION

Figure 1A:
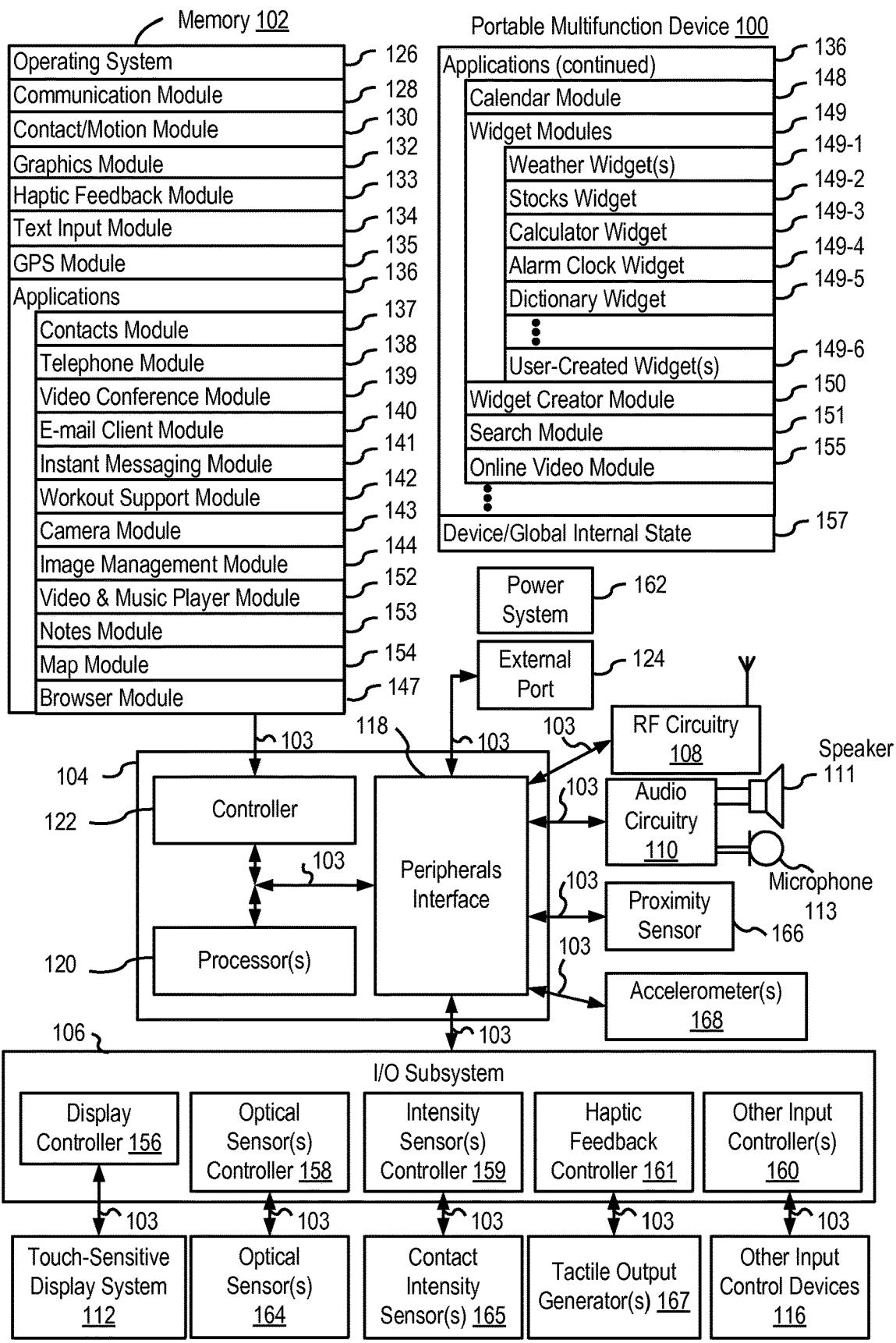
FIG. 1A is a block diagram illustrating a portable multifunction device with a touch-sensitive display in accordance with some examples.

In the following description of the disclosure and embodiments, reference is made to the accompanying drawings in which it is shown by way of illustration specific embodiments that can be practiced. It is to be understood that other embodiments and examples can be practiced and changes can be made without departing from the scope of the disclosure.

As noted above, managing contacts and calendar events on an electronic device can be burdensome to a user because adding or updating contacts and calendar events requires several manual steps that adds up over time. Because of this, many users simply neglect to keep their address books and calendars up to date, which costs them time later when they need to manually search their device for particular contact or event information. This can lead to a frustrating user experience and loss in productivity.

The present disclosure addresses this problem by providing an electronic device that automatically suggests contacts and calendar events for users based on their messages. The device can analyze a user's messages for contact and event information and automatically generate or update suggested contacts and calendar events for the user based on this information. The suggested contacts and calendar events can be searchable as if they were manually entered by the user, and the user can choose to add or ignore the suggested contacts and calendar events. In this manner, a user's contacts and calendar events can be maintained with no or minimal effort on the user's part, which can save the user time, enhance productivity and produce a more efficient human-machine interface.

1. Exemplary Devices

Below, FIGS. 1A-1B, 2, and 3 provide a description of exemplary devices for performing the techniques for suggesting contact and event information. FIGS. 4A-4B and 6A-6G illustrate exemplary user interfaces for suggesting contact and event information. The user interfaces in the FIGS. are also used to illustrate the processes described below, including the processes in FIGS. 7A-13.

Although the following description uses terms "first," "second," etc. to describe various elements, these elements should not be limited by the terms. These terms are only used to distinguish one element from another. For example, a first touch could be termed a second touch, and, similarly, a second touch could be termed a first touch, without departing from the scope of the various described embodiments. The first touch and the second touch are both touches, but they are not the same touch.

The terminology used in the description of the various described embodiments herein is for the purpose of describing particular embodiments only and is not intended to be limiting. As used in the description of the various described embodiments and the appended claims, the singular forms "a", "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, Calif. Other portable electronic devices, such as laptops or tablet computers with touch-sensitive surfaces (e.g., touch screen displays and/or touchpads), are, optionally, used. It should also be understood that, in some embodiments, the device is not a portable communications device, but is a desktop computer with a touch-sensitive surface (e.g., a touch screen display and/or a touchpad).

In the discussion that follows, an electronic device that includes a display and a touch-sensitive surface is described. It should be understood, however, that the electronic device optionally includes one or more other physical user-interface devices, such as a physical keyboard, a mouse, and/or a joystick.

The device may support a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display 112 is sometimes called a "touch screen" for convenience and is sometimes known as or called a "touch-sensitive display system." Device 100 includes memory 102 (which optionally includes one or more computer-readable storage mediums), memory controller 122, one or more processing units (CPUs) 120, peripherals interface 118, RF circuitry 108, audio circuitry 110, speaker 111, microphone 113, input/output (I/O) subsystem 106, other input control devices 116, and external port 124. Device 100 optionally includes one or more optical sensors 164. Device 100 optionally includes one or more contact intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure, and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click,"

"roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application-specific integrated circuits.

Memory 102 may include one or more computer readable storage mediums. The computer readable storage mediums may be tangible and non-transitory. Memory 102 may include high-speed random access memory and may also include non-volatile memory, such as one or more magnetic disk storage devices, flash memory devices, or other non-volatile solid-state memory devices. Memory controller 122 may control access to memory 102 by other components of device 100.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data. In some embodiments, peripherals interface 118, CPU 120, and memory controller 122 may be implemented on a single chip, such as chip 104. In some other embodiments, they may be implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 108 optionally includes well-known circuitry for detecting near field communication (NFC) fields, such as by a short-range communication radio. The wireless communication optionally uses any of a plurality of communications standards, protocols, and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g, IEEE 802.11n, and/or IEEE 802.11ac), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data may be retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, intensity sensor controller 159, haptic feedback controller 161, and one or more input controllers 160 for other input or control devices. The one or more input controllers 160 receive/send electrical signals from/to other input control devices 116. The other input control devices 116 optionally include physical buttons (e.g., push buttons, rocker buttons, etc.), dials, slider switches, joysticks, click wheels, and so forth. In some alternate embodiments, input controller(s) 160 are, optionally, coupled to any (or none) of the following: a keyboard, an infrared port, a USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2).

A quick press of the push button may disengage a lock of touch screen 112 or begin a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 206) may turn power to device 100 on or off. The user may be able to customize a functionality of one or more of the buttons. Touch screen 112 is used to implement virtual or soft buttons and one or more soft keyboards.

Touch-sensitive display 112 provides an input interface and an output interface between the device and a user. Display controller 156 receives and/or sends electrical signals from/to touch screen 112. Touch screen 112 displays visual output to the user. The visual output may include graphics, text, icons, video, and any combination thereof (collectively termed "graphics"). In some embodiments, some or all of the visual output may correspond to user-interface objects.

Touch screen 112 has a touch-sensitive surface, sensor, or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and convert the detected contact into interaction with user-interface objects (e.g., one or more soft keys, icons, web pages, or images) that are displayed on touch screen 112. In an exemplary embodiment, a point of contact between touch screen 112 and the user corresponds to a finger of the user.

Touch screen 112 may use LCD (liquid crystal display) technology, LPD (light emitting polymer display) technology, or LED (light emitting diode) technology, although other display technologies may be used in other embodiments. Touch screen 112 and display controller 156 may detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone® and iPod Touch® from Apple Inc. of Cupertino, Calif.

A touch-sensitive display in some embodiments of touch screen 112 may be analogous to the multi-touch sensitive touchpads described in the following U.S. patents: U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 112 displays visual output from device 100, whereas touch sensitive touchpads do not provide visual output.

A touch-sensitive display in some embodiments of touch screen 112 may be as described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 112 may have a video resolution in excess of 100 dpi. In some embodiments, the touch screen has a video resolution of approximately 160 dpi. The user may make contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 may include a touchpad (not shown) for activating or deactivating particular functions. In some embodiments, the touchpad is a touch-sensitive area of the device that, unlike the touch screen, does not display visual output. The touchpad may be a touch-sensitive surface that is separate from touch screen 112 or an extension of the touch-sensitive surface formed by the touch screen.

Device 100 also includes power system 162 for powering the various components. Power system 162 may include a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 may also include one or more optical sensors 164. FIG. 1A shows an optical sensor coupled to optical sensor controller 158 in I/O subsystem 106. Optical sensor 164 may include charge-coupled device (CCD) or complementary metal-oxide semiconductor (CMOS) phototransistors. Optical sensor 164 receives light from the environment, projected through one or more lenses, and converts the light to data representing an image. In conjunction with imaging module 143 (also called a camera module), optical sensor 164 may capture still images or video. In some embodiments, an optical sensor is located on the back of device 100, opposite touch screen display 112 on the front of the device so that the touch screen display may be used as a viewfinder for still and/or video image acquisition. In some embodiments, an optical sensor is located on the front of the device so that the user's image may be obtained for video conferencing while the user views the other video conference participants on the touch screen display. In some embodiments, the position of optical sensor 164 can be changed by the user (e.g., by rotating the lens and the sensor in the device housing) so that a single optical sensor 164 may be used along with the touch screen display for both video conferencing and still and/or video image acquisition.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112, which is located on the front of device 100.

Device 100 may also include one or more proximity sensors 166. FIG. 1A shows proximity sensor 166 coupled to peripherals interface 118. Alternately, proximity sensor 166 may be coupled to input controller 160 in I/O subsystem 106. Proximity sensor 166 may perform as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112, which is located on the front of device 100.

Device 100 may also include one or more accelerometers 168. FIG. 1A shows accelerometer 168 coupled to peripherals interface 118. Alternately, accelerometer 168 may be coupled to an input controller 160 in I/O subsystem 106. Accelerometer 168 may perform as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers. Device 100 optionally includes, in addition to accelerometer(s) 168, a magnetometer (not shown) and a GPS (or GLONASS or other global navigation system) receiver (not shown) for obtaining information concerning the location and orientation (e.g., portrait or landscape) of device 100.

Figure 3:
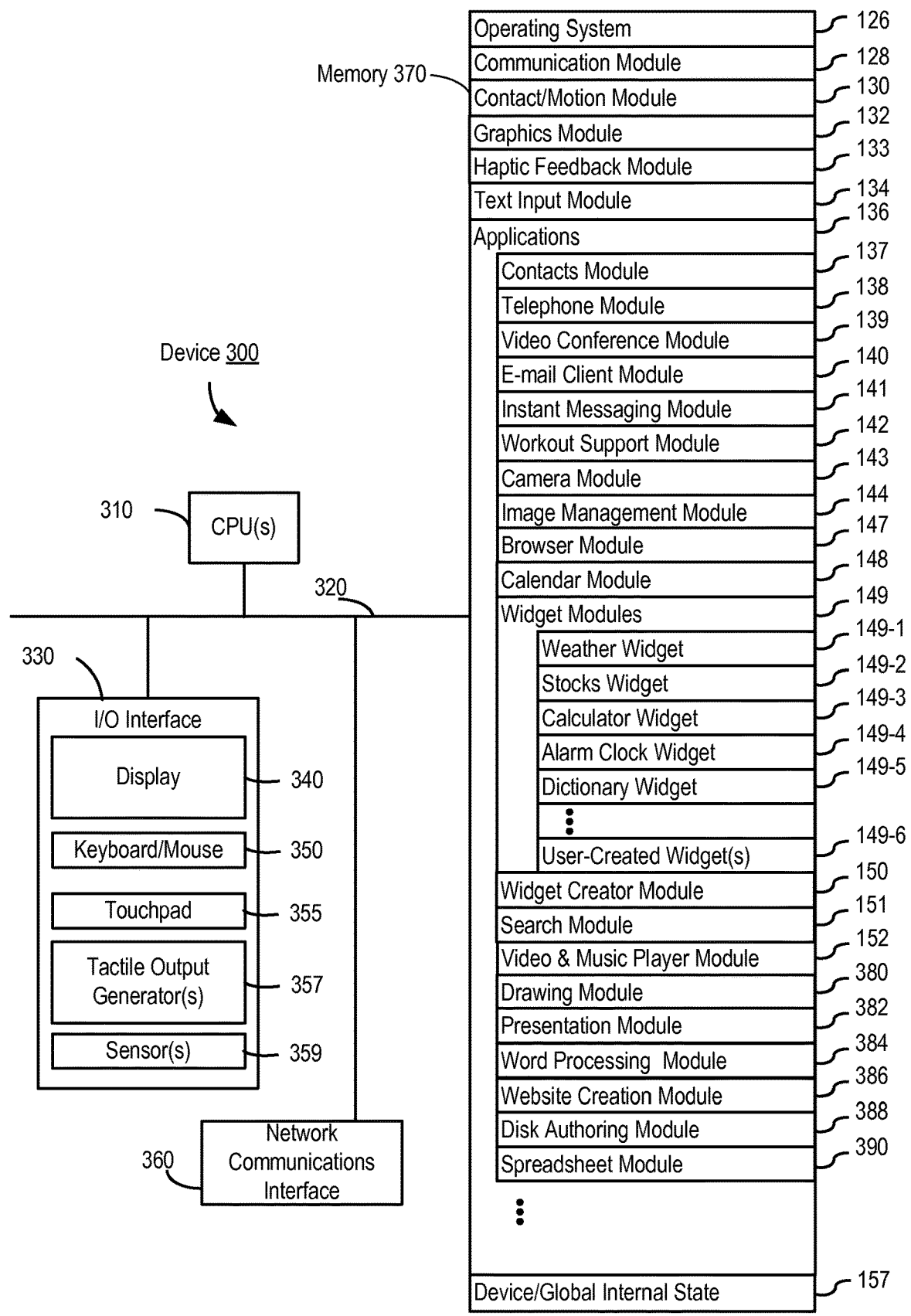
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments, memory 102 (FIG. 1A) or 370 (FIG. 3) stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with, the 30-pin connector used on iPod® (trademark of Apple Inc.) devices.

Contact/motion module 130 optionally detects contact with touch screen 112 (in conjunction with display controller 156) and other touch-sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined threshold values without changing the trackpad or touch screen display hardware. Additionally, in some implementations, a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event.

Graphics module 132 includes various known software components for rendering and displaying graphics on touch screen 112 or other display, including components for changing the visual impact (e.g., brightness, transparency, saturation, contrast, or other visual property) of graphics that are displayed. As used herein, the term "graphics" includes any object that can be displayed to a user, including, without limitation, text, web pages, icons (such as user-interface objects including soft keys), digital images, videos, animations, and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which may be a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing, to camera 143 as picture/video metadata, and to applications that provide location-based services such as weather widgets, local yellow page widgets, and map/navigation widgets).

Applications 136 may include the following modules (or sets of instructions), or a subset or superset thereof:
　Contacts module 137 (sometimes called an address book or contact list);
　Telephone module 138;
　Video conferencing module 139;
　E-mail client module 140;
　Instant messaging (IM) module 141;
　Workout support module 142;
　Camera module 143 for still and/or video images;
　Image management module 144;
　Video player module;
　Music player module;
　Browser module 147;
　Calendar module 148;
　Widget modules 149, which may include one or more of: weather widget 149-1, stocks widget 149-2, calculator widget 149-3, alarm clock widget 149-4, dictionary widget 149-5, and other widgets obtained by the user, as well as user-created widgets 149-6;
　Widget creator module 150 for making user-created widgets 149-6;
　Search module 151;
　Video and music player module 152, which merges video player module and music player module;
　Notes module 153;
　Map module 154; and/or
　Online video module 155.

Examples of other applications 136 that may be stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact/motion module 130, graphics module 132, and text input module 134, contacts module 137 may be used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference module 139, e-mail 140, or IM 141; and so forth.

In conjunction with RF circuitry 108, audio circuitry 110, speaker 111, microphone 113, touch screen 112, display controller 156, contact/motion module 130, graphics module 132, and text input module 134, telephone module 138 may be used to enter a sequence of characters corresponding to a telephone number, access one or more telephone numbers in contacts module 137, modify a telephone number that has been entered, dial a respective telephone number, conduct a conversation, and disconnect or hang up when the conversation is completed. As noted above, the wireless communication may use any of a plurality of communications standards, protocols, and technologies.

In conjunction with RF circuitry 108, audio circuitry 110, speaker 111, microphone 113, touch screen 112, display controller 156, optical sensor 164, optical sensor controller 158, contact/motion module 130, graphics module 132, text input module 134, contacts module 137, and telephone module 138, video conference module 139 includes executable instructions to initiate, conduct, and terminate a video conference between a user and one or more other participants in accordance with user instructions.

In conjunction with RF circuitry 108, touch screen 112, display controller 156, contact/motion module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact/motion module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages, and to view received instant messages. In some embodiments, transmitted and/or received instant messages may include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact/motion module 130, graphics module 132, text input module 134, GPS module 135, map module 154, and music player module, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store, and transmit workout data.

In conjunction with touch screen 112, display controller 156, optical sensor(s) 164, optical sensor controller 158, contact/motion module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact/motion module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display controller 156, contact/motion module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display controller 156, contact/motion module 130, graphics module 132, text input module 134, e-mail client module 140, and browser module 147, calendar module 148 includes executable instructions to create, display, modify, and store calendars and data associated with calendars (e.g., calendar entries, to-do lists, etc.) in accordance with user instructions.

In conjunction with RF circuitry 108, touch screen 112, display controller 156, contact/motion module 130, graphics module 132, text input module 134, and browser module 147, widget modules 149 are mini-applications that may be downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display controller 156, contact/motion module 130, graphics module 132, text input module 134, and browser module 147, the widget creator module 150 may be used by a user to create widgets (e.g., turning a user-specified portion of a web page into a widget).

In conjunction with touch screen 112, display controller 156, contact/motion module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display controller 156, contact/motion module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present, or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact/motion module 130, graphics module 132, and text input module 134, notes module 153 includes executable instructions to create and manage notes, to-do lists, and the like in accordance with user instructions.

In conjunction with RF circuitry 108, touch screen 112, display controller 156, contact/motion module 130, graphics module 132, text input module 134, GPS module 135, and browser module 147, map module 154 may be used to receive, display, modify, and store maps and data associated with maps (e.g., driving directions, data on stores and other points of interest at or near a particular location, and other location-based data) in accordance with user instructions.

In conjunction with touch screen 112, display controller 156, contact/motion module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the contents of which are hereby incorporated by reference in their entirety.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs, procedures, or modules, and thus various subsets of these modules may be combined or otherwise rearranged in various embodiments. For example, video player module may be combined with music player module into a single module (e.g., video and music player module 152, FIG. 1A). In some embodiments, memory 102 may store a subset of the modules and data structures identified above. Furthermore, memory 102 may store additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 may be reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
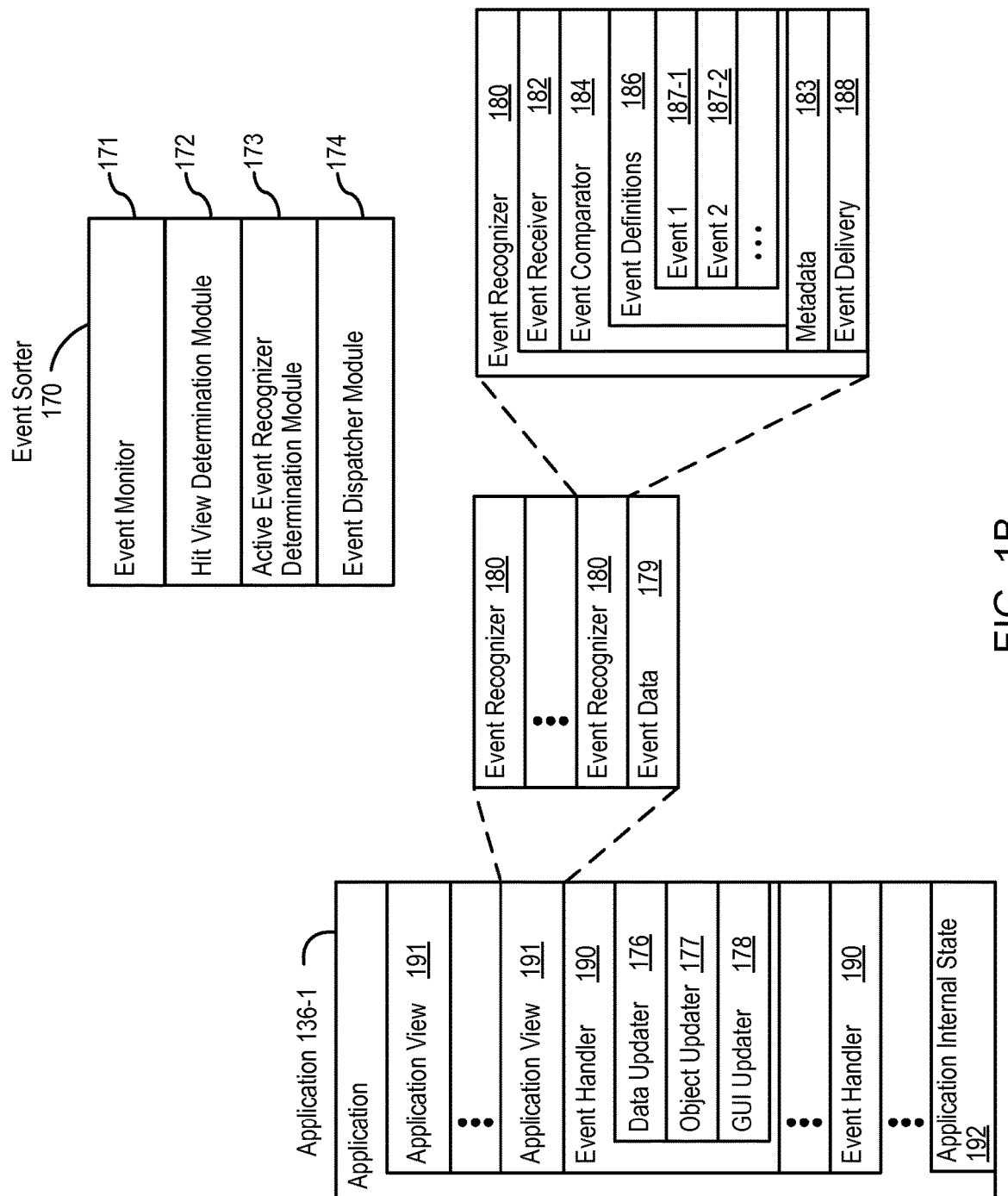
FIG. 1B is a block diagram illustrating exemplary components for event handling in accordance with some embodiments.

FIG. 1B is a block diagram illustrating exemplary components for event handling in accordance with some embodiments. In some embodiments, memory 102 (FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display 112 when the application is active or executing. In some embodiments, device/global internal state 157 is used by event sorter 170 to determine which application(s) is(are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripherals interface 118 transmits event information only when there is a significant event (e.g., receiving an input above a predetermined noise threshold and/or for more than a predetermined duration). In some embodiments, event sorter 170 also includes a hit view determination module 172 and/or an active event recognizer determination module 173.

Hit view determination module 172 provides software procedures for determining where a sub-event has taken place within one or more views when touch-sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected may correspond to programmatic levels within a programmatic or view hierarchy of the application. For example, the lowest level view in which a touch is detected may be called the hit view, and the set of events that are recognized as proper inputs may be determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module 172, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 may utilize or call data updater 176, object updater 177, or GUI updater 178 to update the application internal state 192. Alternatively, one or more of the application views 191 include one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170 and identifies an event from the event information. Event recognizer 180 includes event receiver 182 and event comparator 184. In some embodiments, event recognizer 180 also includes at least a subset of: metadata 183, and event delivery instructions 188 (which may include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information may also include speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event (187) include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and liftoff of the touch (touch end). In some embodiments, the event also includes information for one or more associated event handlers 190.

In some embodiments, event definition 186 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event (187) also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers may interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input devices, not all of which are initiated on touch screens. For example, mouse movement and mouse button presses, optionally coordinated with single or multiple keyboard presses or holds; contact movements such as taps, drags, scrolls, etc. on touchpads; pen stylus inputs; movement of the device; oral instructions; detected eye movements; biometric inputs; and/or any combination thereof are optionally utilized as inputs corresponding to sub-events which define an event to be recognized.

Figure 2:
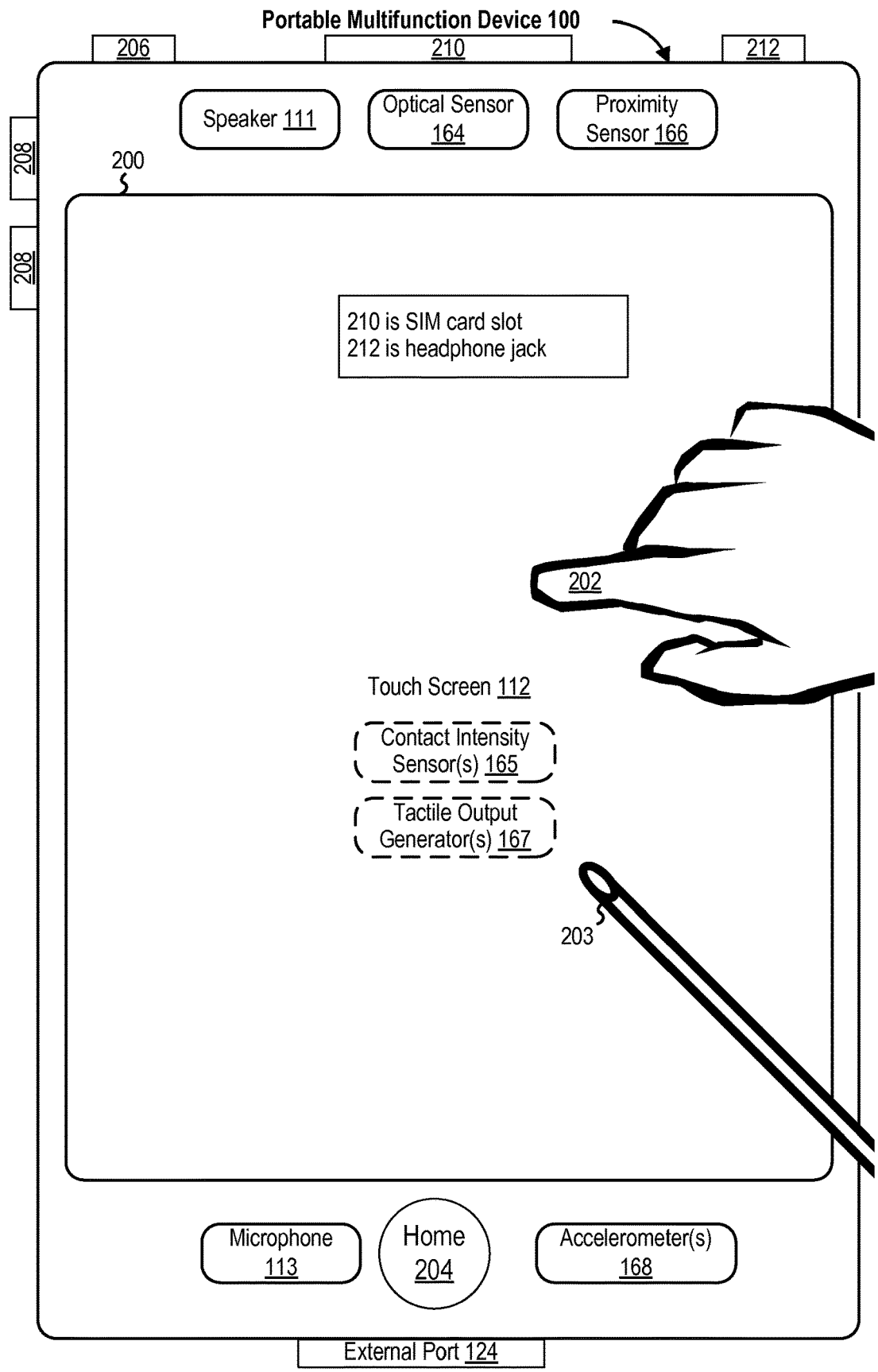
FIG. 2 illustrates a portable multifunction device having a touch screen in accordance with some embodiments.

FIG. 2 illustrates a portable multifunction device 100 having a touch screen 112 in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward), and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 may also include one or more physical buttons, such as "home" or menu button 204. As described previously, menu button 204 may be used to navigate to any application 136 in a set of applications that may be executed on device 100. Alternatively, in some embodiments, the menu button is implemented as a soft key in a GUI displayed on touch screen 112.

In some embodiments, device 100 includes touch screen 112, menu button 204, push button 206 for powering the device on/off and locking the device, volume adjustment button(s) 208, subscriber identity module (SIM) card slot 210, headset jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPUs) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM, or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above-identified elements in FIG. 3 may be stored in one or more of the previously mentioned memory devices. Each of the above-identified modules corresponds to a set of instructions for performing a function described above. The above-identified modules or programs (e.g., sets of instructions) need not be implemented as separate software programs, procedures, or modules, and thus various subsets of these modules may be combined or otherwise rearranged in various embodiments. In some embodiments, memory 370 may store a subset of the modules and data structures identified above. Furthermore, memory 370 may store additional modules and data structures not described above.

Attention is now directed towards embodiments of user interfaces that may be implemented on, for example, portable multifunction device 100.

Figure 4A:
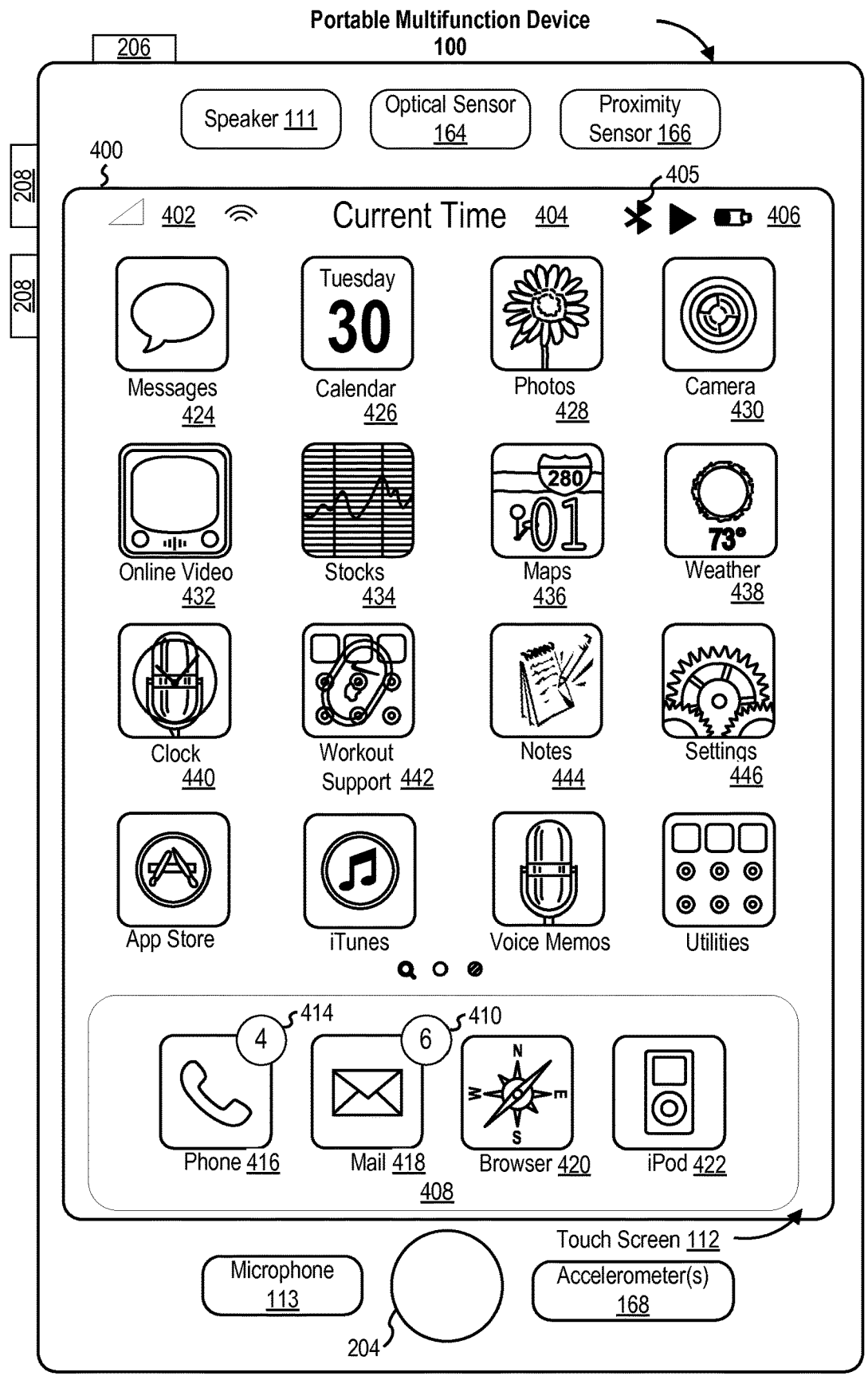
FIGS. 4A and 4B illustrate an exemplary user interface for a menu of applications on a portable multifunction device in accordance with some

FIG. 4A illustrates an exemplary user interface for a menu of applications on portable multifunction device 100 in accordance with some embodiments. Similar user interfaces may be implemented on device 300. In some embodiments, user interface 400 includes the following elements, or a subset or superset thereof:

Signal strength indicator(s) 402 for wireless communication(s), such as cellular and Wi-Fi signals;

Time 404;
Bluetooth indicator 405;
Battery status indicator 406;
Tray 408 with icons for frequently used applications, such as:
  Icon 416 for telephone module 138, labeled "Phone," which optionally includes an indicator 414 of the number of missed calls or voicemail messages;
  Icon 418 for e-mail client module 140, labeled "Mail," which optionally includes an indicator 410 of the number of unread e-mails;
  Icon 420 for browser module 147, labeled "Browser;" and
  Icon 422 for video and music player module 152, also referred to as iPod (trademark of Apple Inc.) module 152, labeled "iPod;" and
Icons for other applications, such as:
  Icon 424 for IM module 141, labeled "Messages;"
  Icon 426 for calendar module 148, labeled "Calendar;"
  Icon 428 for image management module 144, labeled "Photos;"
  Icon 430 for camera module 143, labeled "Camera;"
  Icon 432 for online video module 155, labeled "Online Video;"
  Icon 434 for stocks widget 149-2, labeled "Stocks;"
  Icon 436 for map module 154, labeled "Maps;"
  Icon 438 for weather widget 149-1, labeled "Weather;"
  Icon 440 for alarm clock widget 149-4, labeled "Clock;"
  Icon 442 for workout support module 142, labeled "Workout Support;"
  Icon 444 for notes module 153, labeled "Notes;" and
  Icon 446 for a settings application or module, labeled "Settings," which provides access to settings for device 100 and its various applications 136.

It should be noted that the icon labels illustrated in FIG. 4A are merely exemplary. For example, icon 422 for video and music player module 152 may optionally be labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

Figure 4B:
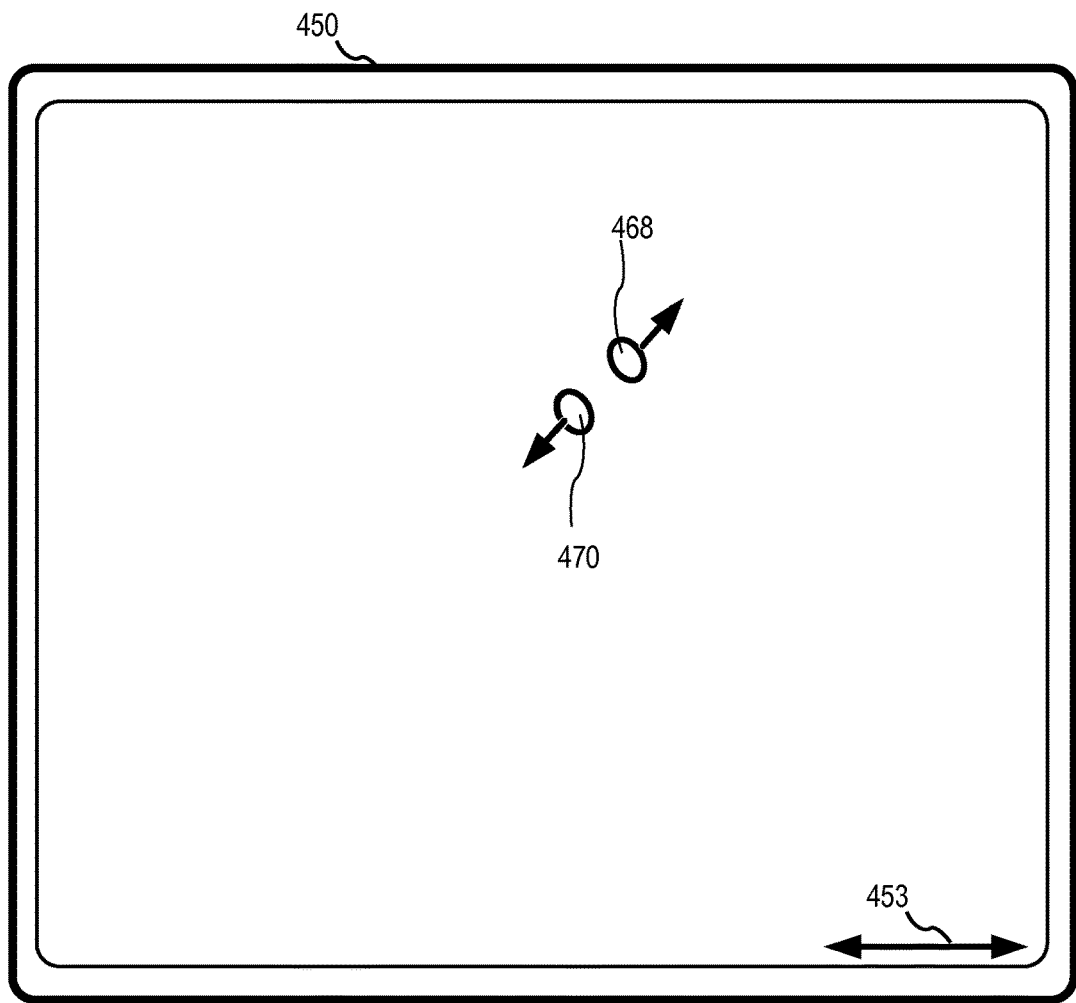
Figure 4B:
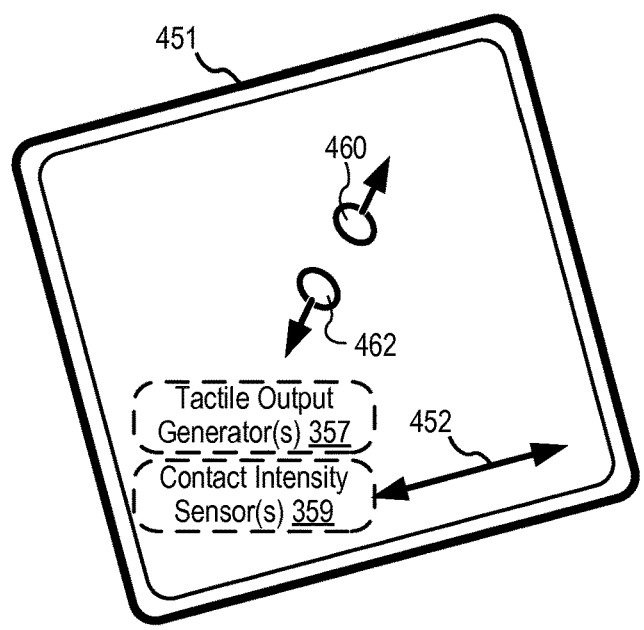

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 357) for detecting intensity of contacts on touch-sensitive surface 451 and/or one or more tactile output generators 359 for generating tactile outputs for a user of device 300.

Although some of the examples which follow will be given with reference to inputs on touch screen display 112 (where the touch-sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

As used here, the term "affordance" refers to a user-interactive graphical user interface object that may be displayed on the display screen of devices 100, 300, and/or 500 (FIGS. 1, 3, and 5). For example, an image (e.g., icon), a button, and text (e.g., hyperlink) may each constitute an affordance.

As used herein, the term "focus selector" refers to an input element that indicates a current part of a user interface with which a user is interacting. In some implementations that include a cursor or other location marker, the cursor acts as a "focus selector" so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider or other user interface element), the particular user interface element is adjusted in accordance with the detected input. In some implementations that include a touch screen display (e.g., touch-sensitive display system 112 in FIG. 1A or touch screen 112 in FIG. 4A) that enables direct interaction with user interface elements on the touch screen display, a detected contact on the touch screen acts as a "focus selector" so that when an input (e.g., a press input by the contact) is detected on the touch screen display at a location of a particular user interface element (e.g., a button, window, slider, or other user interface element), the particular user interface element is adjusted in accordance with the detected input. In some implementations, focus is moved from one region of a user interface to another region of the user interface without corresponding movement of a cursor or movement of a contact on a touch screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds may include a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In some embodiments, a comparison between the characteristic intensity and one or more thresholds is used to determine whether or not to perform one or more operations (e.g., whether to perform a respective operation or forgo performing the respective operation) rather than being used to determine whether to perform a first operation or a second operation.

In some embodiments, a portion of a gesture is identified for purposes of determining a characteristic intensity. For example, a touch-sensitive surface may receive a continuous swipe contact transitioning from a start location and reaching an end location, at which point the intensity of the contact increases. In this example, the characteristic intensity of the contact at the end location may be based on only a portion of the continuous swipe contact, and not the entire swipe contact (e.g., only the portion of the swipe contact at the end location). In some embodiments, a smoothing algorithm may be applied to the intensities of the swipe contact prior to determining the characteristic intensity of the contact. For example, the smoothing algorithm optionally includes one or more of: an unweighted sliding-average smoothing algorithm, a triangular smoothing algorithm, a median filter smoothing algorithm, and/or an exponential smoothing algorithm. In some circumstances, these smoothing algorithms eliminate narrow spikes or dips in the intensities of the swipe contact for purposes of determining a characteristic intensity.

The intensity of a contact on the touch-sensitive surface may be characterized relative to one or more intensity thresholds, such as a contact-detection intensity threshold, a light press intensity threshold, a deep press intensity threshold, and/or one or more other intensity thresholds. In some embodiments, the light press intensity threshold corresponds to an intensity at which the device will perform operations typically associated with clicking a button of a physical mouse or a trackpad. In some embodiments, the deep press intensity threshold corresponds to an intensity at which the device will perform operations that are different from operations typically associated with clicking a button of a physical mouse or a trackpad. In some embodiments, when a contact is detected with a characteristic intensity below the light press intensity threshold (e.g., and above a nominal contact-detection intensity threshold below which the contact is no longer detected), the device will move a focus selector in accordance with movement of the contact on the touch-sensitive surface without performing an operation associated with the light press intensity threshold or the deep press intensity threshold. Generally, unless otherwise stated, these intensity thresholds are consistent between different sets of user interface figures.

An increase of characteristic intensity of the contact from an intensity below the light press intensity threshold to an intensity between the light press intensity threshold and the deep press intensity threshold is sometimes referred to as a "light press" input. An increase of characteristic intensity of the contact from an intensity below the deep press intensity threshold to an intensity above the deep press intensity threshold is sometimes referred to as a "deep press" input. An increase of characteristic intensity of the contact from an intensity below the contact-detection intensity threshold to an intensity between the contact-detection intensity threshold and the light press intensity threshold is sometimes referred to as detecting the contact on the touch-surface. A decrease of characteristic intensity of the contact from an intensity above the contact-detection intensity threshold to an intensity below the contact-detection intensity threshold is sometimes referred to as detecting liftoff of the contact from the touch-surface. In some embodiments, the contact-detection intensity threshold is zero. In some embodiments, the contact-detection intensity threshold is greater than zero.

In some embodiments described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., an "up stroke" of the respective press input).

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90%, or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the descriptions of operations performed in response to a press input associated with a press-input intensity threshold or in response to a gesture including the press input are, optionally, triggered in response to detecting either: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, and/or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold.

2. Structured Suggestions

In embodiments of the present disclosure, the electronic device can structure suggested contacts and calendar events for users from their messages. The suggested contacts and calendar events can be searchable as if they were manually entered by the user, and the user can choose to add or ignore (e.g., reject) the suggested contacts and calendar events. In this manner, a user's contacts and calendar events can be maintained with no or minimal effort on the user's part, which can save the user time, enhance productivity and produce a more efficient human-machine interface.

2.1 Suggested Contact Information

Figure 5A:
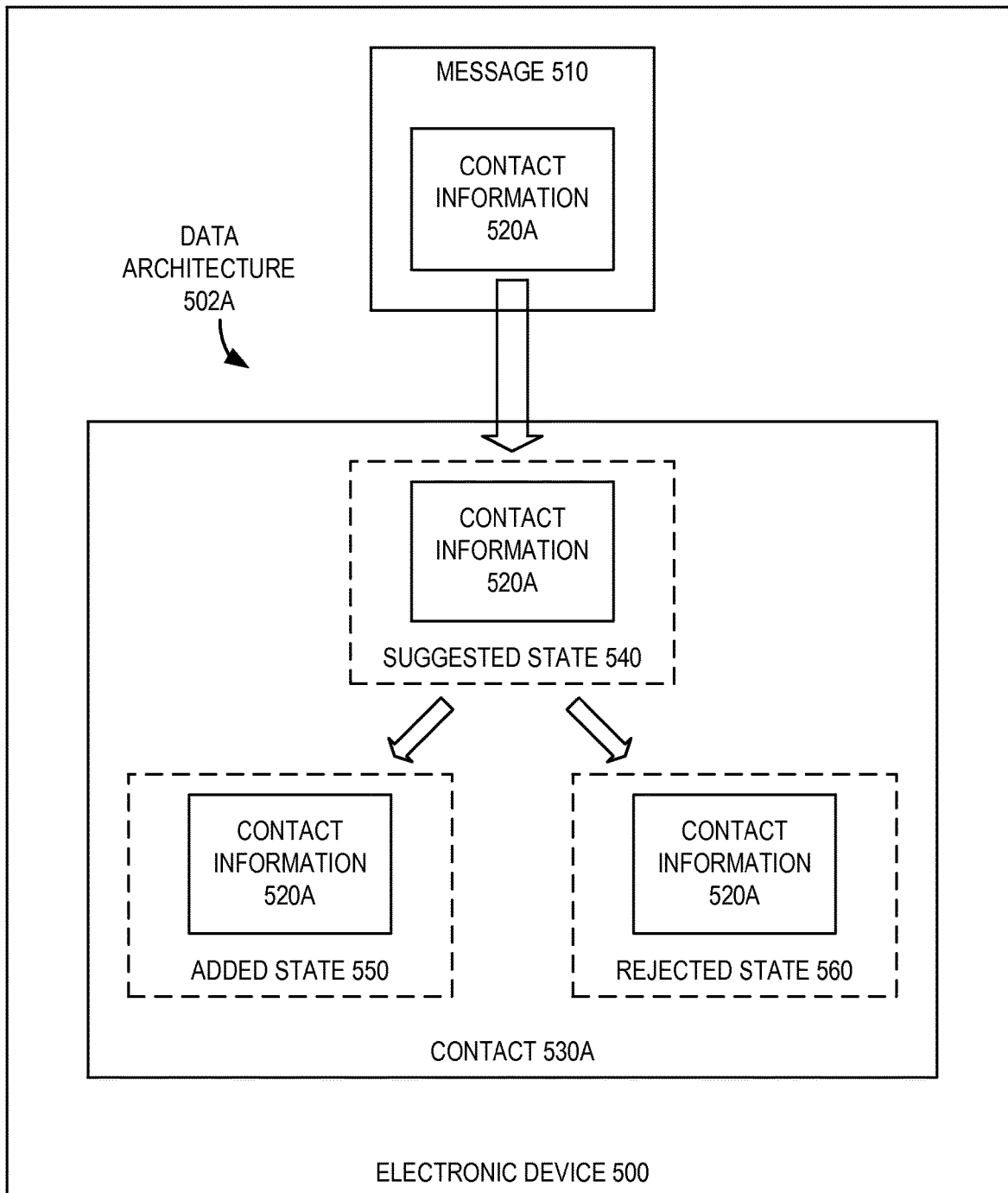
FIG. 5A illustrates a block diagram of an exemplary data architecture for suggested contacts in accordance with some embodiments.

FIG. 5A illustrates an exemplary data architecture 502A for suggested contacts in accordance with some embodiments. As shown in FIG. 5A, electronic device 500 can associate (e.g., store) contact information 520A from message 510 with a corresponding contact 530A. Message 510 can include any type of message that can be sent or received by the user of device 500, such as an email, instant message, messaging via an application on device 500, etc., and can include any attachment to message 510.

Contact information 520A can include information typically associated with a contact entry in an address book database, such as name, phone number, address, business or social networking handle, etc., of an entity. Contact entries are typically organized or indexed by the entity, which can include an individual, group, organization, company, etc. Contact information 520A can be stored in any suitable format that applications, such as contacts module 137, can recognize in order to process contact information 520A. Contact information 520 can also be formatted according to standard protocols, such as the CardDAV protocol, to allow for updating or synchronization over a network with other clients.

In some embodiments, the identified contact information 520A can be associated with contact 530A in any one of three mutually exclusive states—suggested state 540, added state 550 and rejected state 560. Suggested state 540 can reflect a state in which the user has not yet confirmed or approved the addition of contact information 520A to a contact. Added state 550 can reflect a state in which the user has confirmed or approved the addition of contact information 520A to a contact. Rejected state 560 can reflect a state in which the user has rejected the addition of contact information 520A to a contact. Contact 530A can also be associated with any one of these three states when all associated contact information belongs to the same state.

In some embodiments, added state 550 can be treated by device 500 as a default state, meaning that no additional data is required to be associated with such contacts to indicate that they are in added state 550. For example, user added contacts on device 500 can be defaulted to added state 550.

In embodiments in which added state 550 is treated as the default state, device 500 can associate data with contact information 520A to indicate that contact information 520A belongs to either suggested state 540 or rejected state 560. This data can take any suitable form, such as metadata, which can be used by applications processing contact information 520A to recognize that contact information 520A is in either suggested state 540 or rejected state 560. Device 500 can also associate data with contact 530A to indicate that contact 530A and all associated contact information belong to either suggested state 540 or rejected state 560.

By storing contact information 520A in suggested state 540, device 500 (e.g., via an application running on device 500) can include the suggested contact information in searches of contacts. To avoid user confusion, device 500 can also indicate to the user that contact information 520A is in suggested state 540 by providing a visual indication (e.g., via labeling or highlighting) and/or preventing a user from directly acting on contact information 520A (e.g., by requiring the user to provide an additional input before allowing the user to act on contact information 520A). Input can refer to any suitable manner in input, such as touch, mouse, speech, etc.

By storing contact information 520A in rejected state 560, device 500 can remember previously suggested contact information that the user had rejected so as not to suggest it again to the user. Contact information 520A in rejected state 560 can be ignored by applications that process contact information in added state 550 and suggested state 540.

Device 500 can store contact information 520A locally on device 500, and refrain from synchronizing contact information 520A to remote databases until contact information 520A is changed from suggested state 540 to added state 550. In other embodiments, contact information 520A can be updated to remote databases while in suggested state 540.

Device 500 can identify contact information 520A from structured or unstructured content in message 510. Structured content refers to content with formal organization or structure arranged according to a predefined format, such as automated e-mails provided by online travel agencies that lay out flight, hotel and/or car reservation information in the same predefined way (e.g., using the same HTML structure). In some embodiments, to identify contact information 520A from structured content, device 500 can use templates configured to recognize contact information in the particular format provided by such messages. In some embodiments, device 500 can add and/or update these templates over a network.

Unstructured content refers to content without formal organization or structure, such as natural language content (e.g., someone says in a message that they have a new number) and email signatures. To identify contact information 520A from unstructured content, device 500 can use data detectors that are configured to identify predefined references to contact information, such as particular phrases like "I got a new number, it's <number>." Device 500 can also add and/or update these data detectors over a network. Device 500 can improve the predefined references relied on by the data detectors by cross-correlating contact information on device 500 (e.g., in an address book database) with language associated with that contact information on device 500 (e.g., in messages). The correlated language can then be used to refine the predefined references for subsequent use. The message content analyzed by device 500 can include any information that is recognizable by device 500, including message metadata.

In some embodiments, the device receives an instruction (e.g., a user request) to initiate a communication (e.g., a phone call, instant message, email) with a contact (e.g., an individual or a business). The device determines that the contact is not in the device's address book. In response, the device locates contact information (e.g., a phone number, a username, an email address) based on one or more communications (e.g., instant messages, emails, calendar entries). In other words, the device searches through a database of potential contacts to disambiguate the requested contact referenced in the instruction. Optionally, the device presents a ranked list of potentially matching contacts and receives user input selecting the intended contact. In response to the user input selecting the intended contact, the device may initiate the communication (e.g., a phone call, instant message, email) with the intended contact.

2.2 Suggested Event Information

Figure 5B:
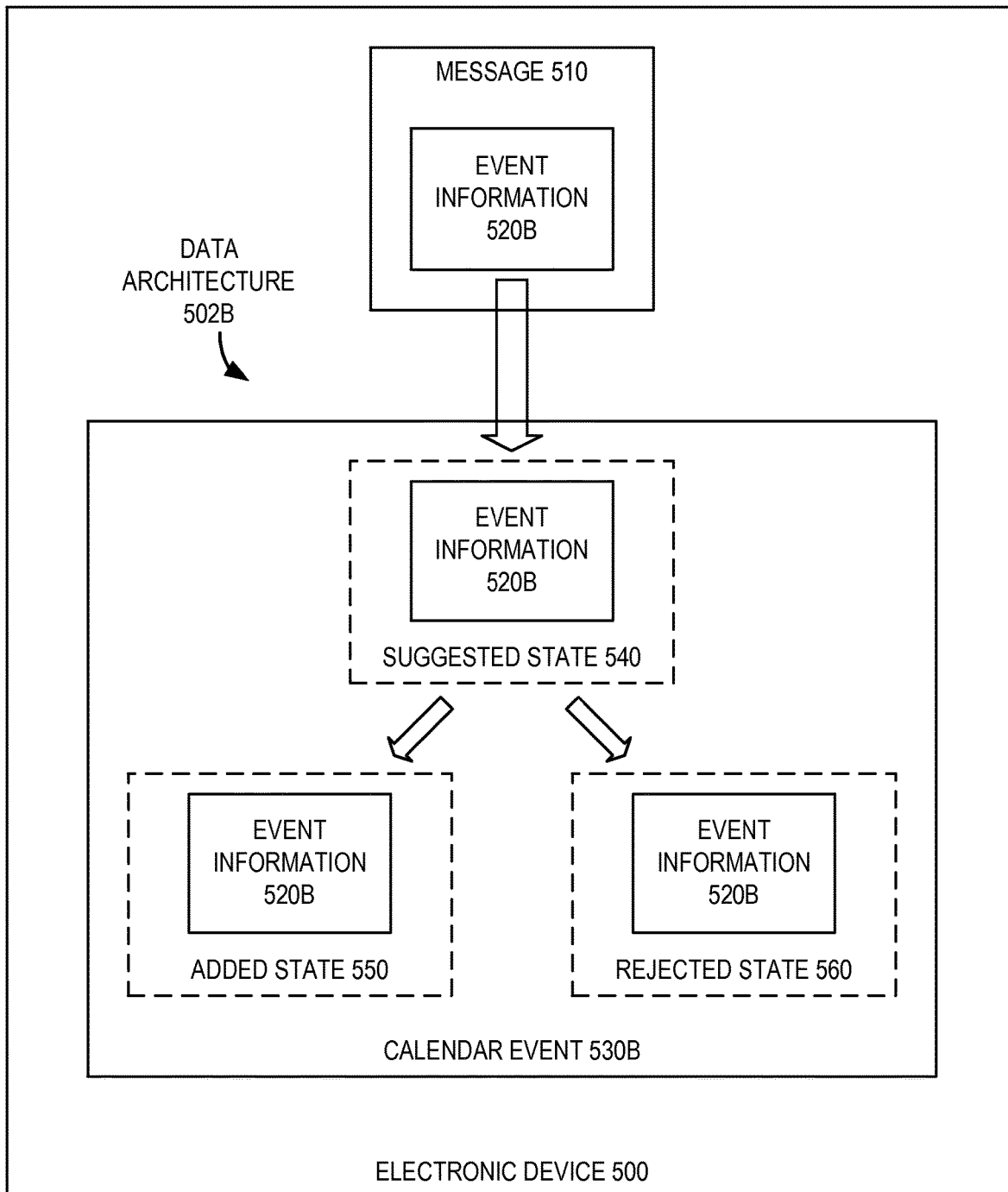
FIG. 5B illustrates a block diagram of an exemplary data architecture for suggested calendar events in accordance with some embodiments.

FIG. 5B illustrates an exemplary data architecture 502B for suggested calendar events in accordance with some embodiments. As shown in FIG. 5B, electronic device 500 can associate (e.g., store) event information 520B from message 510 with a corresponding calendar event 530B. Message 510 can include any type of message that can be sent or received by the user of device 500, such as an email, instant message, messaging via an application on the device, etc., and can include any attachment to the message.

Event information 520B can include information typically associated with a calendar entry in a calendar database, such as time, date, location, etc. Event information 520B can be stored in any suitable format that applications, such as calendar module 148, can recognize in order to process event information 520B. Event information 520B can also be formatted according to standard protocols, such as the CalDAV protocol, to allow for updating or synchronization over a network with other clients.

In some embodiments, the identified event information 520B can be associated with calendar event 530B in any one of three mutually exclusive states—suggested state 540, added state 550 and rejected state 560. Suggested state 540 can reflect a state in which the user has not yet confirmed or approved the addition of event information 520B to a calendar event. Added state 550 can reflect a state in which the user has confirmed or approved the addition of event information 520B to a calendar event. Rejected state 560 can reflect a state in which the user has rejected the addition of event information 520B to a calendar event. Calendar event 530B can also be associated with any one of these three states when all associated calendar event information belongs to the same state.

In some embodiments, added state 550 can be treated by device 500 as a default state, meaning that no additional data is required to be associated with such calendar events to indicate that they are in added state 550. For example, user added calendar events on device 500 can be defaulted to added state 550.

In embodiments in which added state 550 is treated as the default state, device 500 can associate data with event information 520B to indicate that event information 520B belongs to either suggested state 540 or rejected state 560. This data can take any suitable form, such as metadata, which can be used by applications processing event information 520B to recognize that event information 520B is in either suggested state 540 or rejected state 560. Device 500 can also associate data with calendar event 530B to indicate that calendar event 530B and all associated event information belong to either suggested state 540 or rejected state 560.

By storing event information 520B in suggested state 540, device 500 (e.g., via an application running on device 500) can include the suggested event information in searches of calendar events. To avoid user confusion, device 500 can also indicate to the user that event information 520B is in suggested state 540 by providing a visual indication (e.g., via labeling or highlighting) and/or preventing a user from directly acting on event information 520B (e.g., by requiring the user to provide an additional input before allowing the user to act on event information 520B). Input can refer to any suitable manner in input, such as touch, mouse, speech, etc.

By storing event information 520B in rejected state 560, device 500 can remember previously suggested event information that the user had rejected so as not to suggest it again to the user. Event information 520B in rejected state 560 can be ignored by applications that process event information in added state 550 and suggested state 540.

Device 500 can store event information 520B locally on device 500, and refrain from synchronizing event information 520B to remote databases until event information 520B is changed from suggested state 540 to added state 550. In other embodiments, event information 520B can be updated to remote databases while in suggested state 540.

Device 500 can identify event information 520B from structured or unstructured content in message 510. Structured content refers to content with formal organization or structure arranged according to a predefined format, such as automated e-mails provided by online travel agencies that lay out flight, hotel and/or car reservation information in the same predefined way (e.g., using the same HTML structure). In some embodiments, to identify event information 520B from structured content, device 500 can use templates configured to recognize event information in the particular format provided by such messages. In some embodiments, device 500 can add and/or update these templates over a network.

Unstructured content refers to content without formal organization or structure, such as natural language content (e.g., someone says in a message that they'll meet you somewhere at a particular time) and email signatures. To identify event information 520B from unstructured content, device 500 can use data detectors that are configured to identify predefined references to event information, such as particular phrases like "meet me at <address> at <time>." Device 500 can also add and/or update these data detectors over a network. Device 500 can improve the predefined references relied on by the data detectors by cross-correlating event information on device 500 (e.g., in a calendar database) with language associated with that event information on device 500 (e.g., in messages). The correlated language can then be used to refine the predefined references for subsequent use. The message content analyzed by device 500 can include any information that is recognizable by device 500, including message metadata.

In some examples, the device identifies one or more communications (e.g., email or other content) associated with a calendar event (e.g., a user-added calendar event or a received meeting invite accepted by the user). For example, the device may determine that a communication is associated with a calendar event when the communication describes an event of the same or similar name, an event of the same or similar day/time and/or duration, and/or an event of the same location. For another example, the device may determine that a communication is associated with a calendar event based on the calendar event including the same or similar language used in the communication. The one or more communications and the associated calendar event are analyzed and/or compared to better identify candidate communications for which a future calendar entry should be created or suggested. For example, a machine learning technique can be employed to learn patterns of event creation by training from/analyzing emails on which events are based (using support vector machine and a corpus of emails that were used to create calendar events).

For example, the device may receive an email communication from an auto parts shop that includes the language "Hi, Can you swing by the parts shop tomorrow to get the replacement part?" The email may also include an email signature that includes the street address of the parts shop. The user may then manually create a calendar event, including the language "swing by the parts shop to get the replacement part". The calendar event may also include the street address of the parts shop as the location of the calendar event. Based on the email communication and the calendar event, the device may use machine learning to determine that this type of email communication warrants a suggestion for a calendar entry. The determination may be based on: the similarity between the "swing by the parts shop to get the replacement part" in the email communication and the calendar event, the similarity between the street address in the email communication and the calendar event, a similarity in the day/time identified in the email communication and the calendar event, or a combination of two or more of the these.

In some examples, the device identifies event information from (e.g., during) an instant message conversation (e.g., an SMS or text message conversation). During the conversation, the device collects information relevant to an event. After a relevant portion of the conversation (e.g., after a predetermined set of information has been collected), the device produces a suggested calendar event. In some examples, the suggested calendar event is updated based on messages in the conversation sent or received after the initial suggested calendar event is produced. This conversational event creation technique allows users to quickly and efficiently add events to their calendars based on messages in an instant message conversation.

For example, the device may be displaying an instant message conversation between the device's user and a representative from an auto parts shop. The conversation may include a message from the representative include the language "Hi, Can you swing by the parts shop tomorrow to get the replacement part?" The conversation may also include a message from the representative that includes the street address of the parts shop. The user may respond "yes, I'll be there!" In response to a relevant portion of the conversation (e.g., the confirmation of attendance "yes, I'll be there!"; or receiving the time "tomorrow" and the location (street address)), the device produces a suggested calendar event. The device may update the suggested calendar event if the device subsequently receives a message from the representative that indicates an updated time (e.g., "Actually, tomorrow won't work, but this Friday will work."), location, or other event component.

It should be recognized that exemplary data architectures 520A and 520B can be the same or different. For example, a single data architecture can be used for suggested contacts as for suggested calendar events. Alternatively, one data architecture can be used for suggested contacts, while another, different data architecture can be used for suggested calendar events.

It should also be recognized that message 510 can be processed for only suggested contacts, only suggested calendar events, or both suggested contacts and suggested calendar events. When processed for both suggested contacts and suggested calendar events, message 510 can be processed for suggested contacts and suggested calendar events in series or parallel. For example, message 510 can be first processed for suggested contacts, and then processed for suggested calendar events. Alternatively, message 510 and a copy of message 510 can be processed for suggested contacts and suggested calendar events in parallel.

In some examples, a notification or reminder may be presented to the user (e.g., through a visual notification, a haptic notification, an audio notification, or a combination of one or more notifications on device 500) based on event information identified from structured or unstructured content in a message or other media. In some examples, the notification or reminder may be presented to the user even though the event information is not associated with the added state. For example, the device may remind a user to pack a suitcase based on an email received about an upcoming camping trip, even though the camping trip has not been added to the user's calendar. Thus, reminders may be presented for calendar entries, events, and the like that are in a suggested state (e.g., not explicitly accepted or declined).

3. User Interfaces and Associated Processes

FIGS. 6A-13 depict embodiments of user interfaces ("UI") and associated processes that may be implemented on device 500. In some embodiments, device 500 corresponds to devices 100 or 300.

Figure 6A:
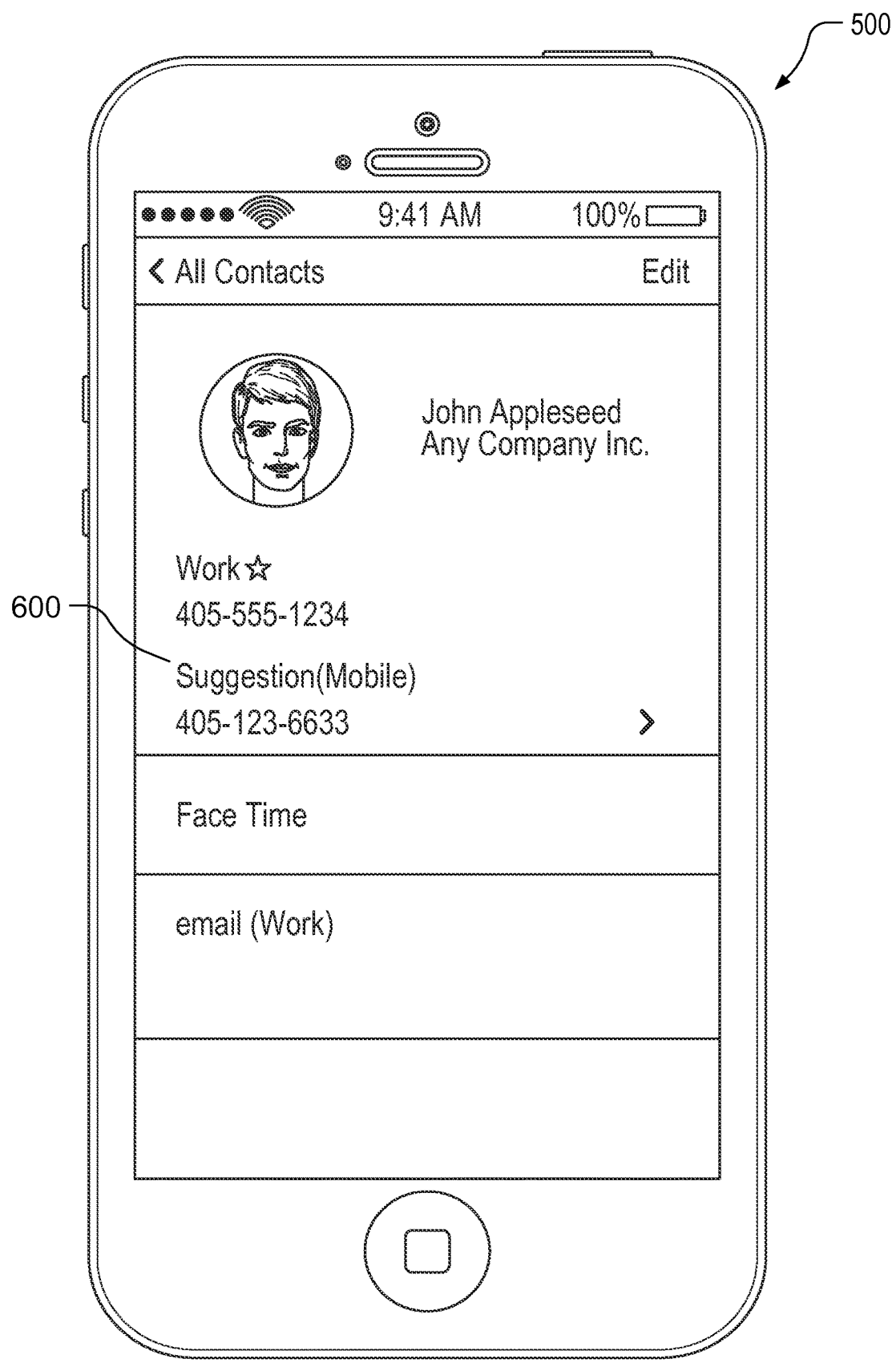
FIGS. 6A-6G illustrate exemplary user interfaces for providing suggested contacts and calendar events in accordance with some embodiments.
Figure 6B:
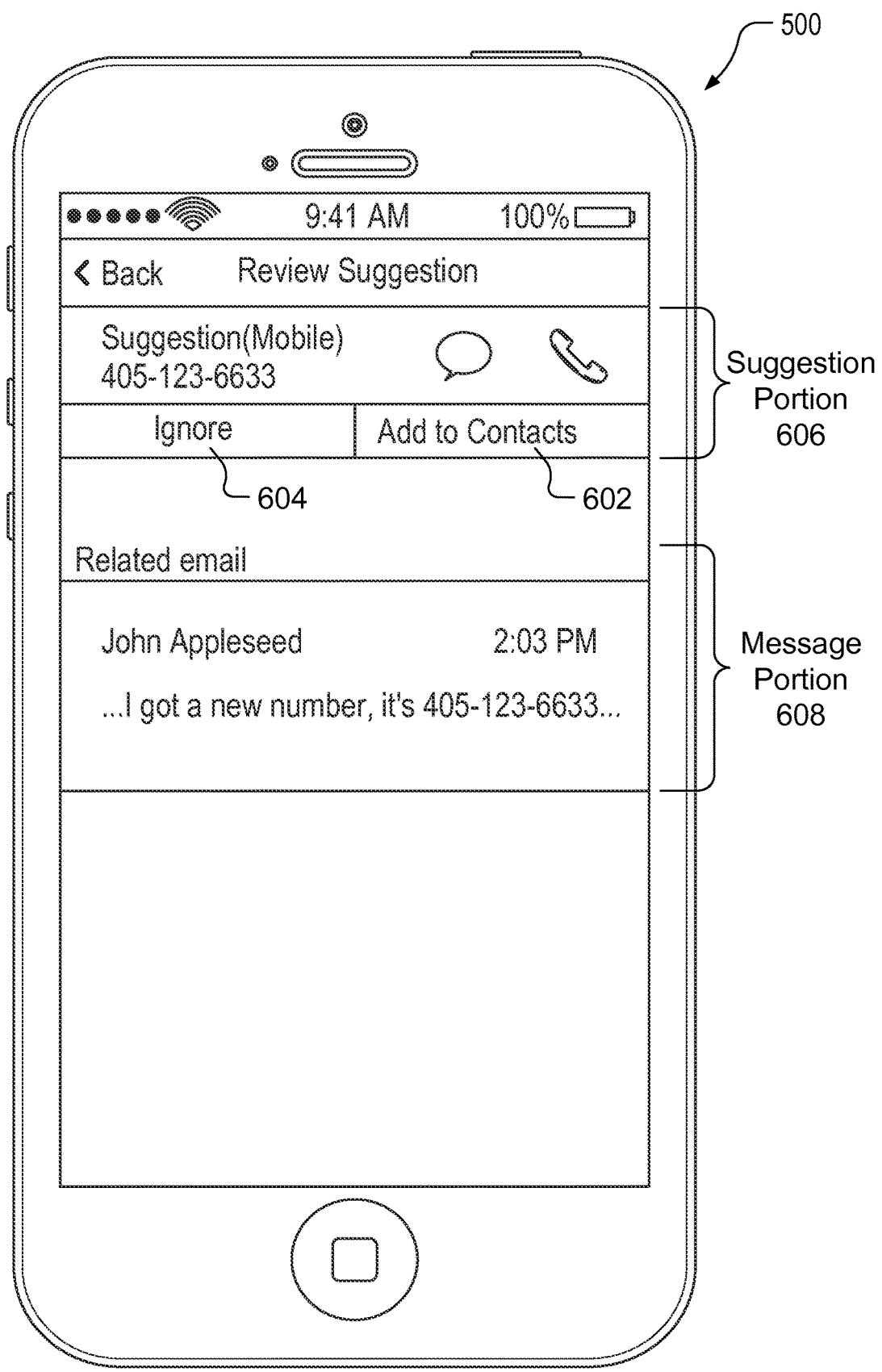
Figure 6C:
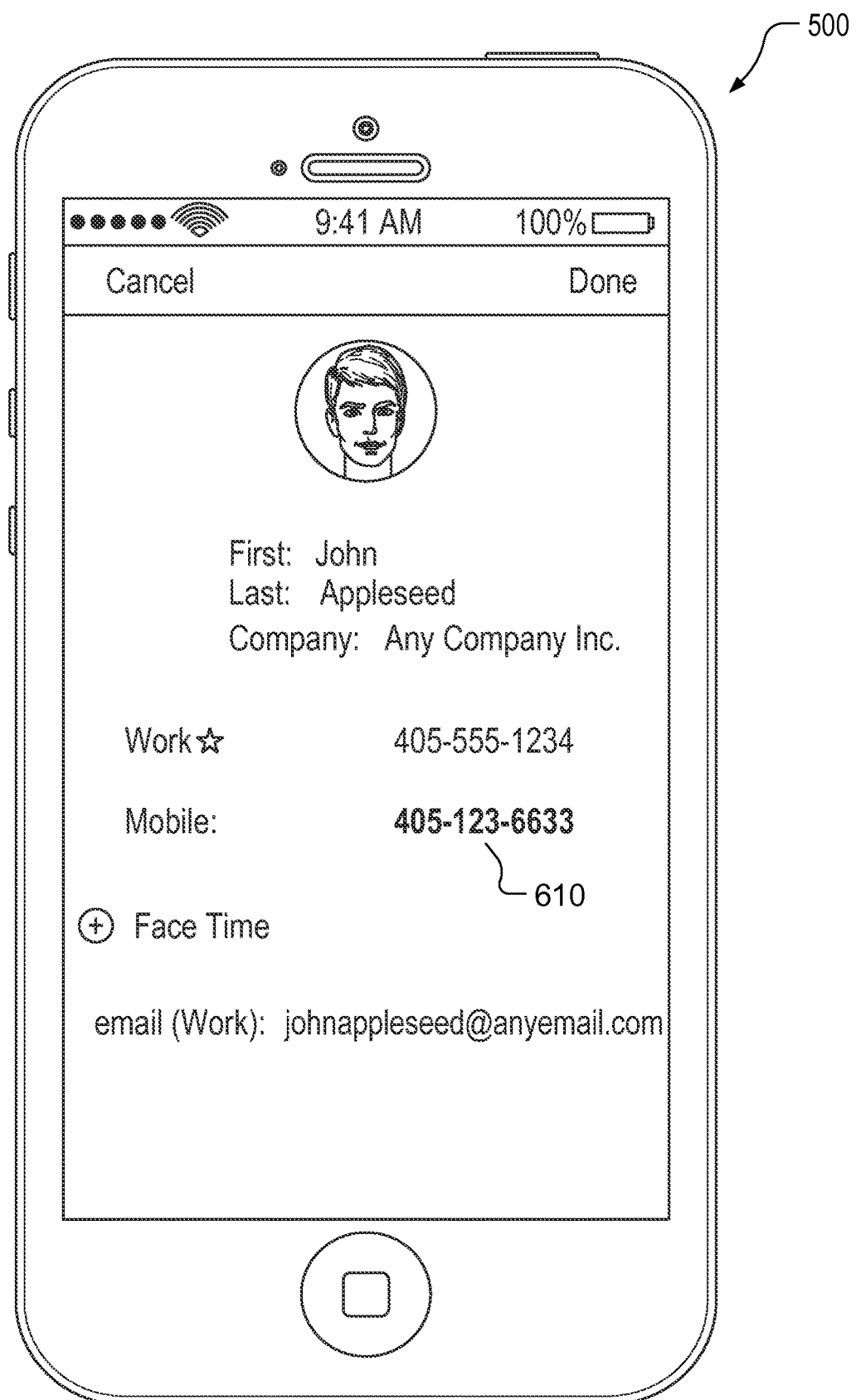
Figure 6D:
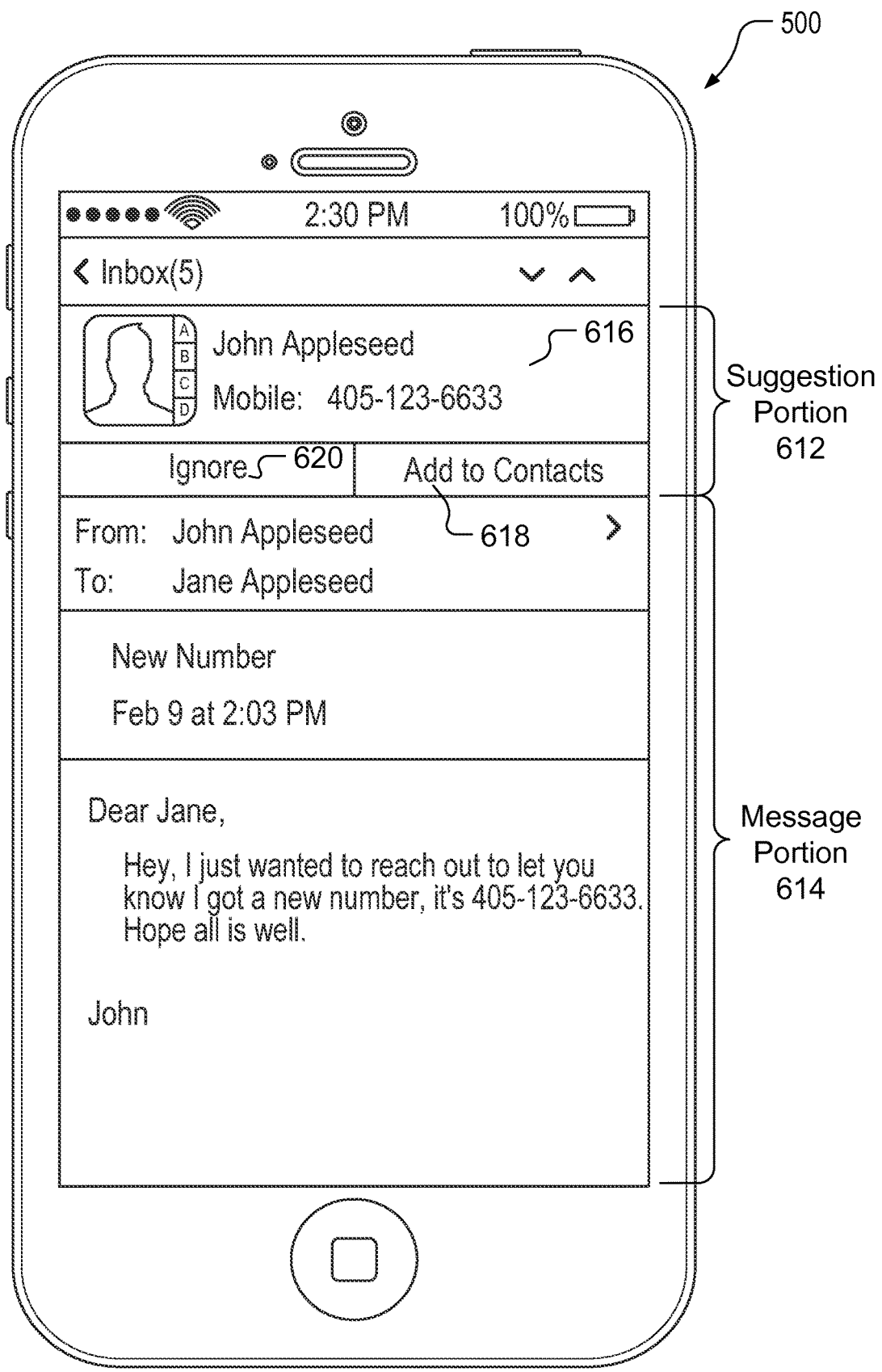
Figure 6E:
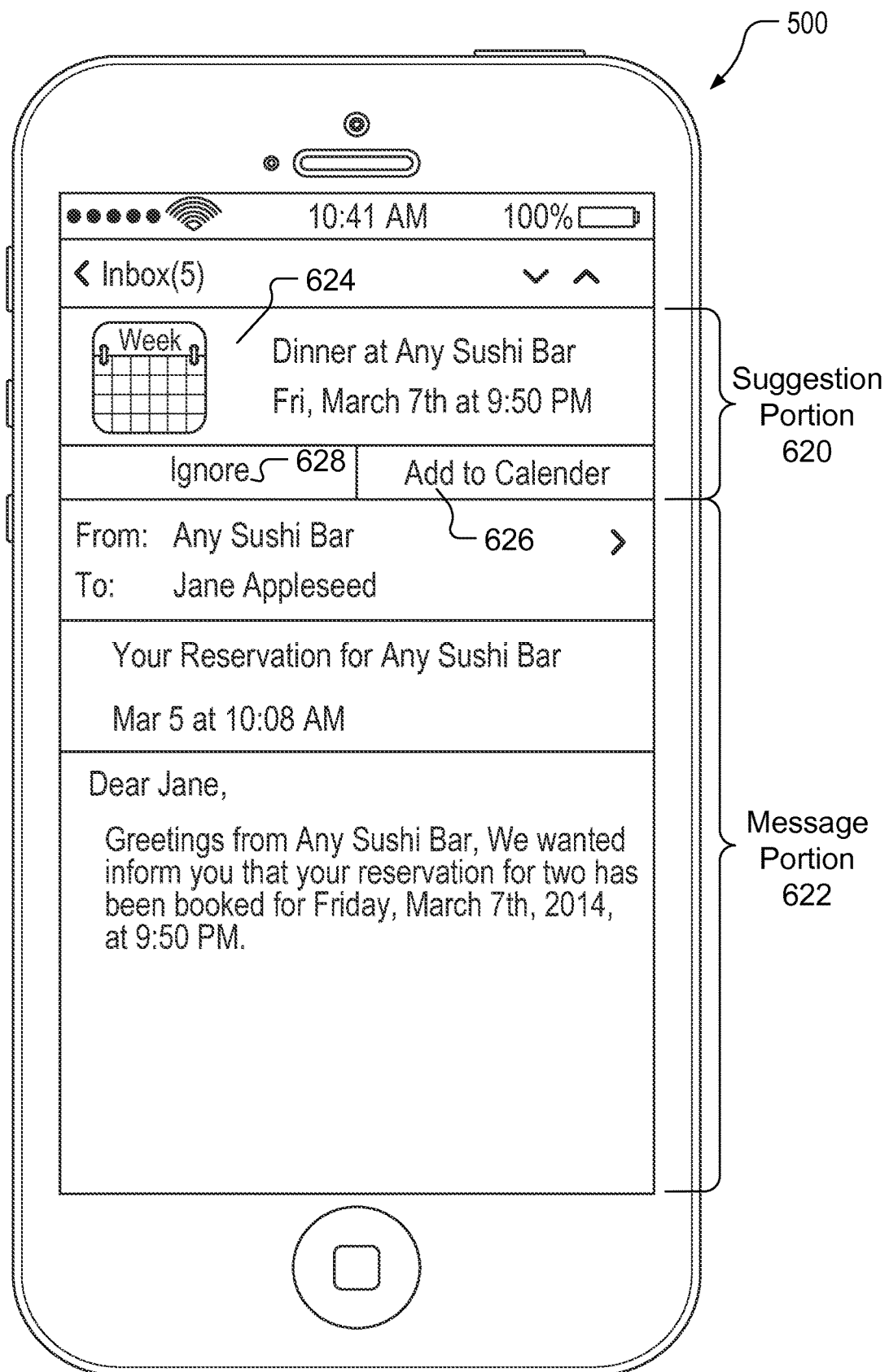
Figure 6F:
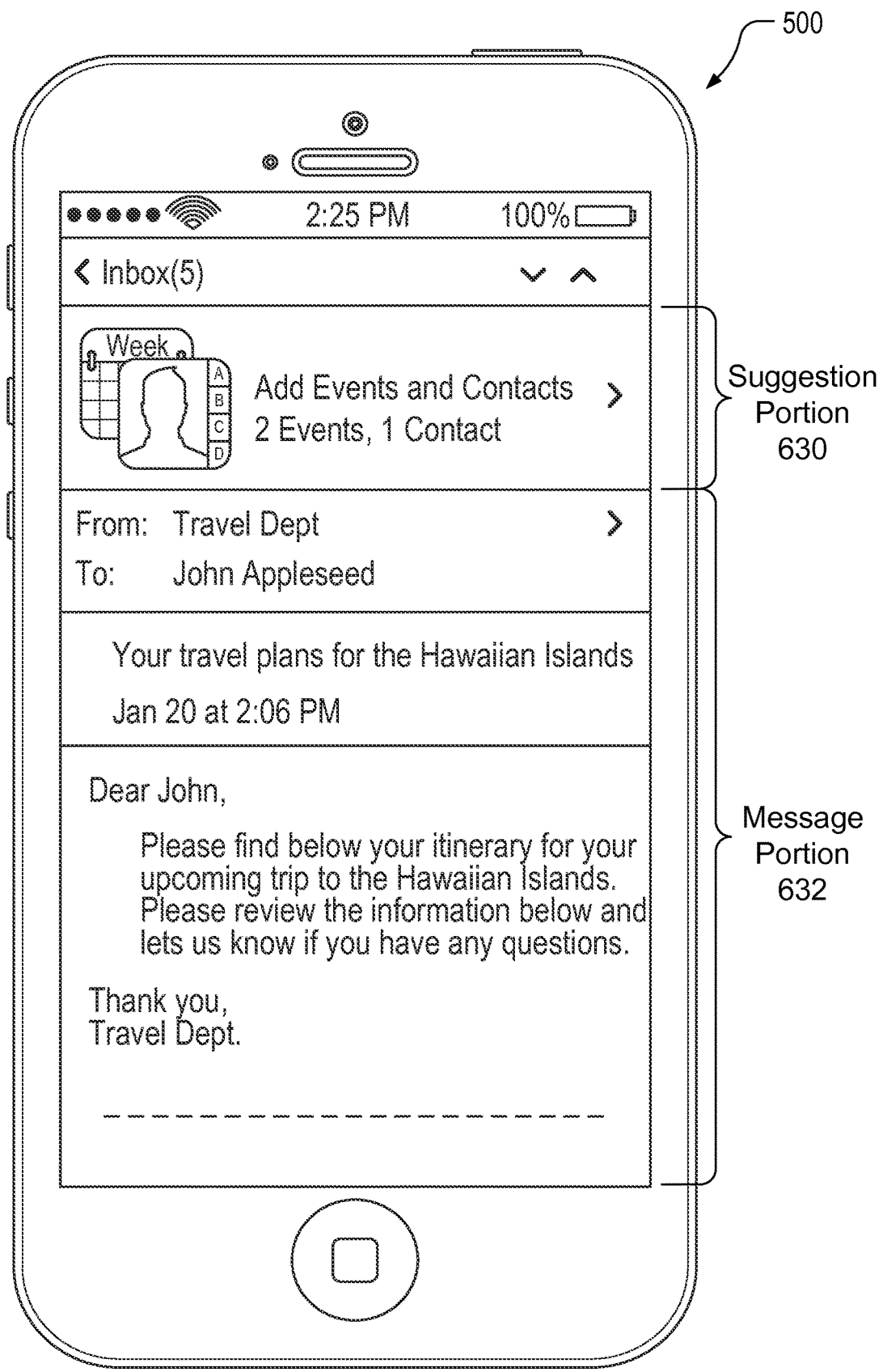
Figure 6G:
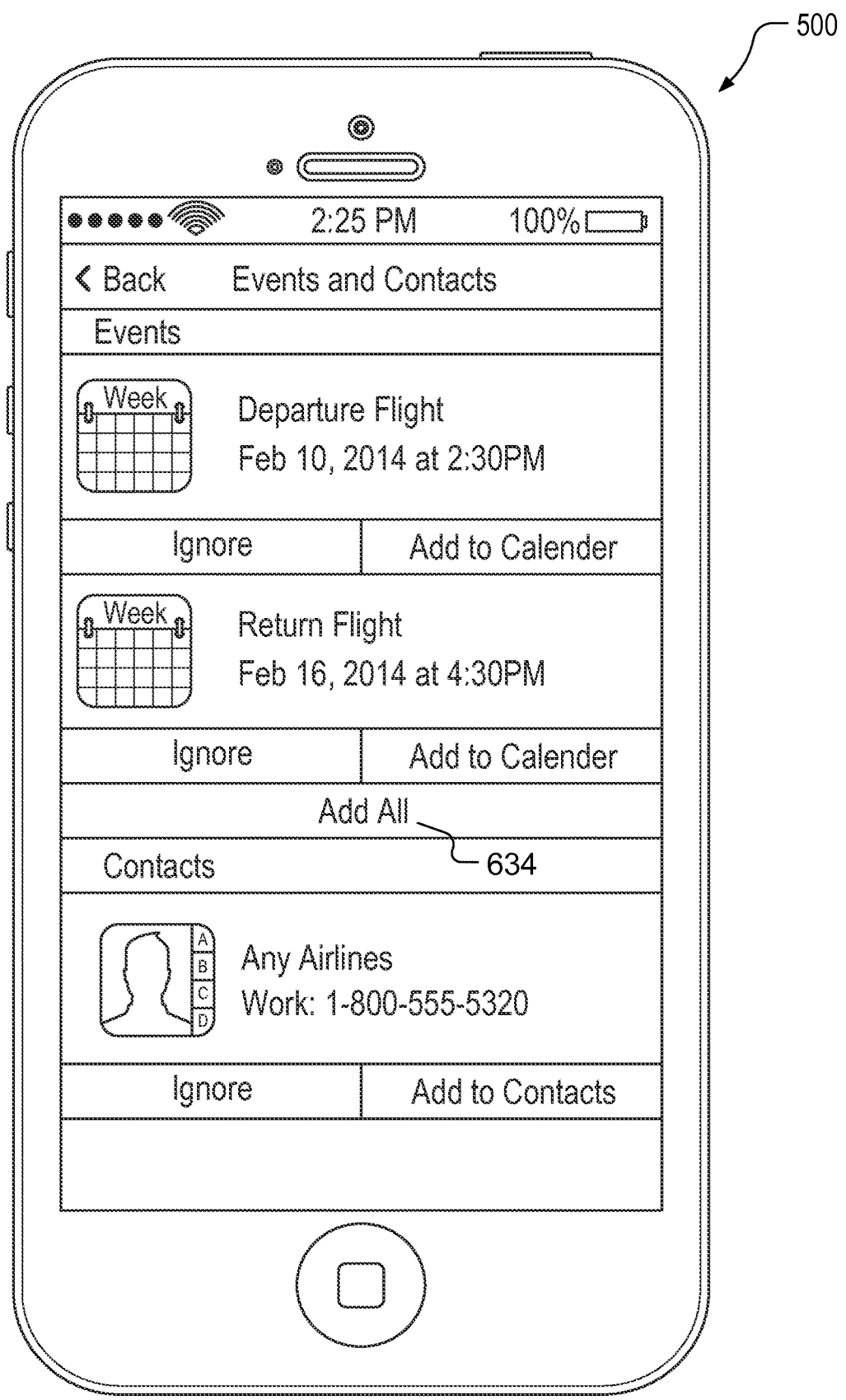

FIGS. 6A and 6G illustrate exemplary user interfaces for providing suggested contacts and calendar events in accordance with some embodiments.

In particular, FIG. 6A shows the display, by contacts module 137 for example, of a user interface corresponding to a contact with suggested contact information (i.e., contact information in suggested state 540), for example, after processing a message as described above. In this example, the contact is associated with an individual named John Appleseed and includes a company name ("Any Company Inc."), work number ("405-555-1234") and a mobile number ("405-123-6633"). The company name and work number are confirmed items of contact information and belong to added state 550. The mobile number is a suggested item of contact information and belongs to suggested state 540.

Device 500 can provide user interface object 600 (e.g., the word "suggestion") in the user interface to indicate to the user that the mobile number is a suggested item of contact information and not one that has been confirmed by the user. Any suitable user interface object can be used for this purpose, including a label, icon, or other visual indication that the mobile number is a suggested item of contact information. When the same contact includes items of contact information in suggested state 540 and items of contact information in added state 550, as in the case in FIG. 6A, device 500 can display the items in suggested state 540 below, or in a position of lesser priority to, all items in added state 550.

Device 500 can also prevent the user from directly invoking an application (e.g., telephone module 138) to call John Appleseed at the suggested number from this initial user interface. For example, device 500 can provide the text and/or region associated with the suggested number with a different visual appearance than that of confirmed items of contact information, such as a grayed out appearance (not shown), to indicate that a selection of the suggested number by the user will not directly call the number. Rather, upon selecting the suggested number by the user, device 500 can replace the current user interface with a second user interface through which the user can review and call the suggested number.

As shown in FIG. 6B, the second user interface (labeled "Review Suggestion") includes suggestion portion 606 in the form of a banner that includes user interface object 602 (labeled "Add to Contact") associated with the suggested number. Selecting user interface object 602 by the user can cause device 500 to add the suggested number to the contact in added state 550 (e.g., change the state of the suggested number from suggested state 540 to added state 550). Upon selection of the mobile number or similar indication, such as the telephone icon displayed next to the mobile number, by the user in this subsequent user interface, device 500 can invoke an application (e.g., telephone module 138) to call John Appleseed at the suggested number. In some embodiments, device 500 can retain the mobile number in suggested state 540 if the user does not select user interface object 602 but does select the mobile number or similar indication (e.g., a user calling the suggested number is not treated as an implicit approval of the suggested number for the contact). In other embodiments, device 500 can change the state of the mobile number to added state 550 upon the user selecting the mobile number, even if the user had not selected user interface object 602 (e.g., a user calling the suggested number is treated as an implicit approval of the suggested number for the contact).

The second user interface in FIG. 6B also includes user interface object 604 (labeled "Ignore") associated with the suggested number. Selection of user interface object 604 by the user can cause device 500 to cease displaying user interface object 602, which removes the option of adding to the number to the contact. Upon selecting user interface object 604, device 500 can change the state of the suggested number from suggested state 540 to rejected state 560. In rejected state 560, device 500 can be configured to no longer display or suggest the suggested number in association with this contact.

Additionally, the second user interface in FIG. 6B includes message portion 608 (labeled as "Related email") that includes a portion of the message from which the suggested number was identified by device 500. Thus, in providing an interface for reviewing suggested contact information, the user interface of FIG. 6B can provide the user with message context associated with the suggested contact information. As shown in FIG. 6B, device 500 can display a limited section of the e-mail relating to the portion with the mobile number. Upon the user selecting the displayed portion of the message, device 500 can cause a message application (e.g., E-mail Client Module 140) to open the entire e-mail for the user. In some embodiments, the entire e-mail can be displayed with the suggested contact information in a user interface corresponding to that shown in FIG. 6D.

FIG. 6C shows a user interface that is displayed in response to the user selecting the "Edit" user interface object in FIG. 6A. In this edit user interface, the user can also directly call the suggested number, represented by user interface object 610, which is highlighted (i.e., in bold) to indicate that the number is in suggested state 540. Any suitable visual indication can be used to indicate that user interface object 610 is in suggested state 540.

FIG. 6D shows a screen that a user can view upon opening a message on device 500 (e.g., an e-mail displayed by E-mail Client Module 140) with device 500 having identified suggested contact information in the message. The user interface of FIG. 6D includes suggestion portion 612 and message portion 614. Message portion 614 includes the content of the message as received by device 500. Suggestion portion 612 includes a user interface object corresponding to the identified entity ("John Appleseed"), a user interface object corresponding to the identified contact information ("405-123-6633") and user interface object 618 (labeled "Add to Contacts") associated with the identified contact information that, when selected, causes the device to add the suggested number to the contact in added state 550. Suggestion portion 612 includes user interface object 620 (labeled "Ignore") associated with the identified contact information that, upon selection, causes device 500 to change the state of the identified contact information from suggested state 540 to rejected state 560. In rejected state 560, device 500 can be configured to no longer display or suggest the suggested contact information in association with this contact. Selecting identified contact information 616 of suggestion portion 612 above the "Ignore" and "Add to Contacts" tile can bring up a user interface corresponding to the contact associated with the identified entity. For example, device 500 can present the contact information for "John Appleseed" in a user interface corresponding to that shown in FIG. 6A in this embodiment.

FIG. 6E shows a screen that a user can view upon opening a message on device 500 (e.g., an e-mail displayed by E-mail Client Module 140) with device 500 having identified suggested event information in the message. The user interface of FIG. 6E includes suggestion portion 620 and message portion 622. Message portion 622 includes the content of the message as received by device 500. Suggestion portion 620 includes a user interface object corresponding to the identified event information ("Dinner", "Any Sushi Bar", "Fri, March 7th", or "9:50 PM") and user interface object 626 (labeled "Add to Calendar") associated with the identified event information that, when selected, causes device 500 to add the suggested event information to a calendar event in added state 550. Suggestion portion 620 includes user interface object 628 (labeled "Ignore") that, upon selection, causes device 500 to change the state of the identified event information from suggested state 540 to rejected state 560. In rejected state 560, device 500 can be configured to no longer display or suggest the suggested event information in association with this calendar event. Selecting identified event information 624 of suggestion portion 620 above the "Ignore" and "Add to Calendar" tile can bring up a user interface (not shown) corresponding to a calendar event associated with the identified event information (e.g., displayed by contacts module 137 for example), through which the user can select a user interface object to add the suggested event information to a calendar event in added state 550.

In some examples, the device may display a calendar event on a calendar of the device, wherein the calendar event corresponds to event information in the suggested state 540. Calendar events in the suggested state 540 that are displayed on the calendar of the device may optionally be grayed out to indicate that they are in the suggested state 540. The device may display details of the calendar event (e.g., when the user activates an affordance associated with the calendar event), including at least a portion of the source of the event information (e.g., a portion of the communication, such as an email, on which the suggested event information is based). Alternatively, or in addition, the device may display an affordance which when activated causes the device to display at least a portion of the communication (e.g., an email) on which the suggest event information is based. The displayed details of the suggested calendar event may also optionally include an affordance to ignore (or reject) the suggested calendar event or accept the suggested calendar event. Thus, a user can see suggested calendar events on a calendar of the device and the user can quickly and efficiently reject or accept the suggested calendar event.

FIG. 6F shows a screen that a user can view upon opening a message on device 500 (e.g., an e-mail displayed by E-mail Client Module 140) with device 500 having identified multiple suggested contacts and/or calendar events in the message. The user interface of FIG. 6F includes suggestion portion 630 and message portion 632. Message portion 632 includes the content of the message as received by device 500. Suggestion portion 630 further includes a user selectable region that, when selected, causes device 500 to display a subsequent user interface having a list of the multiple instances of identified contact or event information as shown in FIG. 6G. Confining suggestion portion 630 of FIG. 6F to a single banner rather than incorporating all of the suggestions of FIG. 6G into the user interface of FIG. 6F prevents the suggestion portion of FIG. 6F from interfering with the user's ability to view and read the message in the message portion with ease.

FIG. 6G shows the subsequent user interface having the list of suggested contact and event information identified in the message associated with the user interface of FIG. 6F. As shown in FIG. 6G, the suggestions are organized by type (e.g., suggested calendar events are grouped together and suggested contacts are grouped together) and each suggestion includes the "Ignore" and "Add to Contact" and "Add to Calendar" functionality described above. The user interface of FIG. 6G also includes user interface object 634 ("Add All") that, when selected, causes device 500 to add each of a grouping of the multiple instances of identified contact or event information (e.g., the two suggested calendar events shown in FIG. 6G) to a corresponding contact or calendar event in added state 550.

Figure 7A:
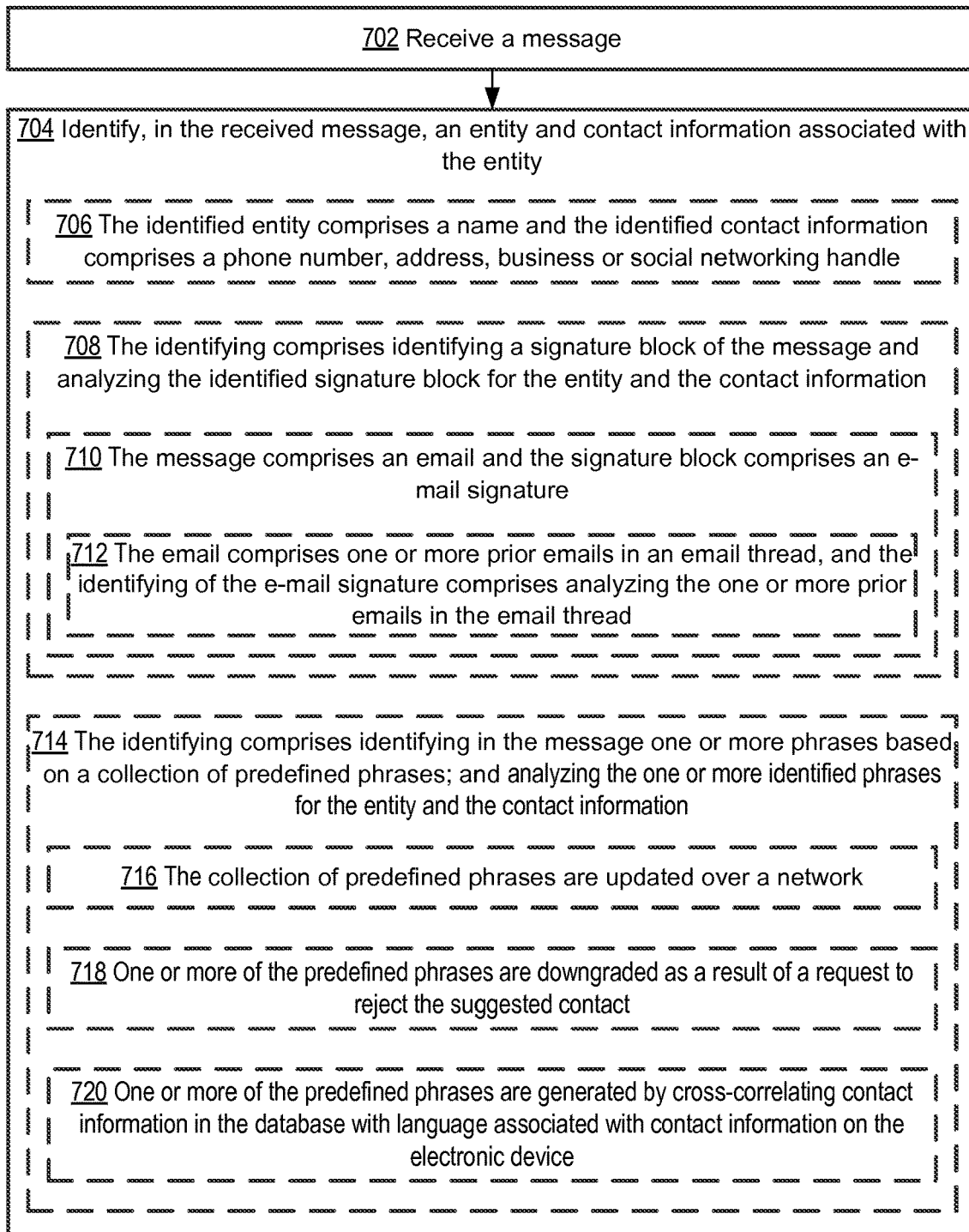
FIGS. 7A and 7B illustrate a flow diagram of an exemplary process for generating a suggested contact in accordance with some embodiments.
Figure 7B:
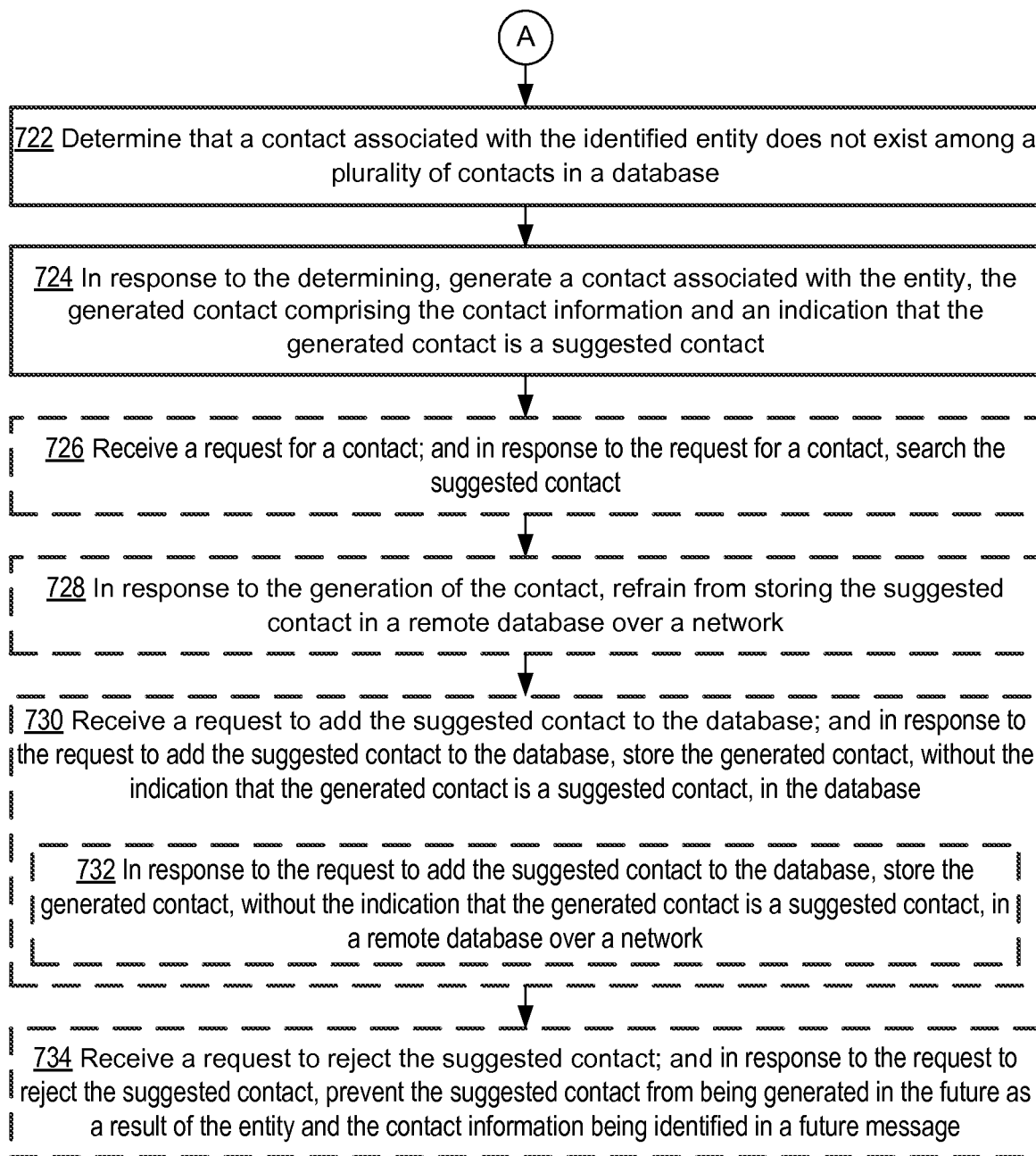

FIGS. 7A and 7B illustrate a flow diagram of an exemplary process for generating a suggested contact in accordance with some embodiments. The process can be performed at an electronic device (e.g., device 500).

The electronic device can receive (702) a message (e.g., FIG. 6D, email in message portion 614) and identify (704), in the received message, an entity (e.g., FIG. 6D, "John Appleseed") and contact information (e.g., FIG. 6D, "405-123-6633") associated with the entity. The device can determine (722) that a contact (e.g., FIG. 5A, contact 530A) associated with the identified entity does not exist among a plurality of contacts in a database (e.g., storage on device 500, such as an address book database), and in response to this determination (724), the device can generate a contact associated with the entity, the generated contact including the contact information and an indication (e.g., metadata) that the generated contact is a suggested contact (e.g., in suggested state 540). It is noted that when the device generates the "John Appleseed" contact as a suggested contact, each item of contact information in the contact can be indicated as a suggested item of contact information and stored in suggested state 540 or the entire contact as a whole can be indicated as a suggested contact and stored in suggested state 540. It is also noted that any message resident on the device can be analyzed using the disclosed process, such as incoming and outgoing messages.

In some embodiments, the identified entity is (706) a name and the identified contact information is a phone number, address, business or social networking handle.

In some embodiments, the device can identify unstructured content in the message by recognizing signature blocks in the message. For example, to identify the entity and associated contact information in the message, the device can identify (708) a signature block of the message and analyze the identified signature block for the entity and the contact information. The message can include (710) an email and the signature block can be an e-mail signature. The email can include (712) one or more prior emails in an email thread, and the identifying of the e-mail signature can include analyzing the one or more prior emails in the email thread. By unrolling the quoting layers of the e-mail the device can avoid misassociating contact information location in different e-mails in an e-mail thread.

In some embodiments, the device can identify unstructured content in the message by searching for definitive phrases with data detectors. For example, to identify the entity and associated contact information in the message, the device can identify (714) in the message one or more phrases based on a collection of predefined phrases, and analyze the one or more identified phrases for the entity and the contact information. The device can update (716) the collection of predefined phrases over a network, which can allow the device to continue to use accurate phrases. The device can also downgrade (718) one or more of the predefined phrases as a result of a request to reject the suggested contact. In other words, if users continue to reject suggestions identified through the use of particular phrases, that can be an indication that those phrases are inaccurate. The device can also generate (720) one or more of the predefined phrases by cross-correlating contact information in the database with language associated with contact information on the electronic device (such as messages, calendar events, etc.) In this manner the device can determine what exact language in a message with contact information, for example, led a user to create or update a contact with the contact information.

In some embodiments, the suggested contact can be searchable in view of the data architecture of FIG. 5A. For example, the device can receive (726) a request for a contact (e.g., by a user searching for a contact via an application on the device) and, in response to the request for a contact, search the suggested contact.

In some embodiments, the device can (728), in response to the generation of the contact, refrain from storing the suggested contact in a remote database over a network. For example, if the suggested contact is in suggested state 540, the device can refrain from pushing the contact to an updating or synchronization service (e.g., an application on the device) that allows contacts to be updated on multiple clients over a network.

In some embodiments, the device can (730) receive a request to add the suggested contact (e.g., FIG. 6D, "Add to Contacts" 618) to the database and in response to the request, store the generated contact, without the indication that the generated contact is a suggested contact (e.g., change the state of the contact from suggested state 540 to added state 550), in the database. In response to the request to add the suggested contact to the database, the device can store (732) the generated contact, without the indication that the generated contact is a suggested contact, in a remote database over a network by, for example, pushing the contact to an updating or synchronization service.

In some embodiments, the device can (734) receive a request to reject the suggested contact (e.g., FIG. 6D, "Ignore" 620) and, in response to the request, reject the suggested contact, preventing the suggested contact from being generated in the future as a result of the entity and the contact information being identified in a future message. This can be implemented by storing rejected contacts in rejected state 560, so that the device can know what has already been rejected.

Figure 8A:
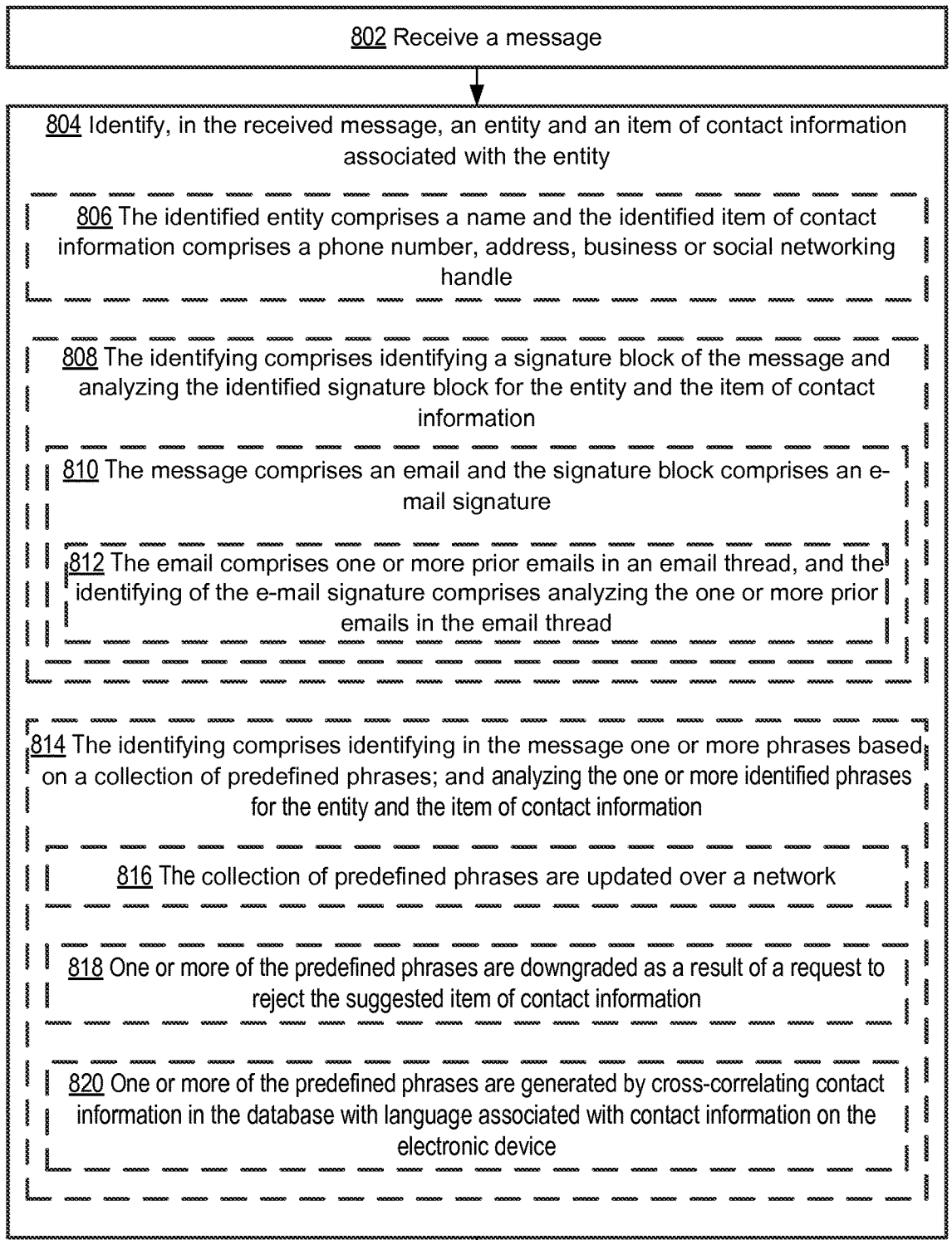
FIGS. 8A and 8B illustrate a flow diagram of an exemplary process for updating an existing contact with a suggested item of contact information in accordance with some embodiments.
Figure 8B:
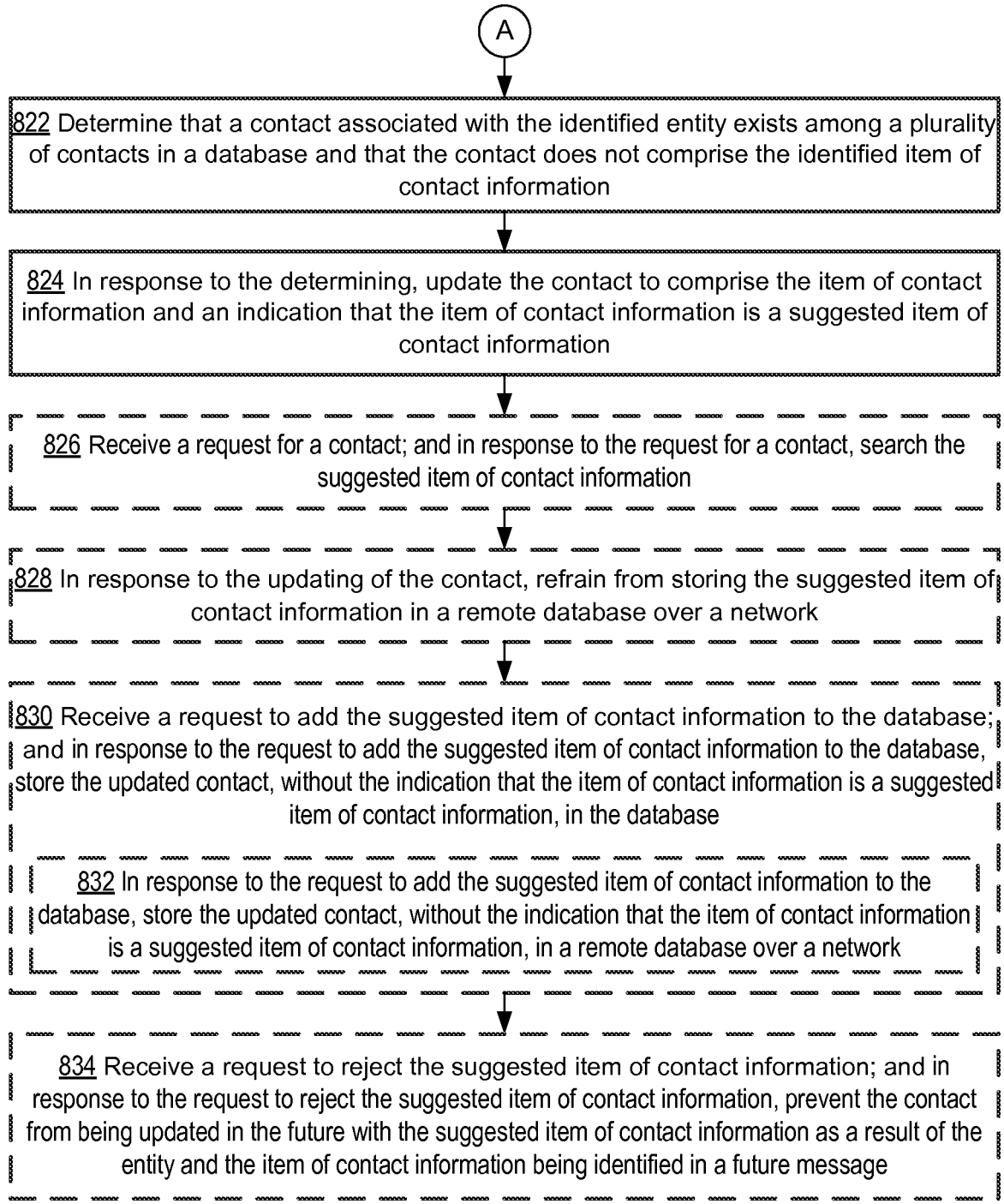

FIGS. 8A and 8B illustrate a flow diagram of an exemplary process for updating an existing contact with a suggested item of contact information in accordance with some embodiments. The process can be performed at an electronic device (e.g., device 500).

The electronic device can receive (802) a message (e.g., FIG. 6D, email in message portion 614) and identify (804), in the received message, an entity (e.g., FIG. 6D, "John Appleseed") and an item of contact information (e.g., FIG. 6D, "405-123-6633") associated with the entity. The device can determine (822) that a contact (e.g., FIG. 5A, contact 530A) associated with the identified entity exists among a plurality of contacts in a database and that the contact does not include the identified item of contact information. In response to this determination (824), the device can update the contact to include the item of contact information and an indication (e.g., metadata) that the item of contact information is a suggested item of contact information (e.g., in suggested state 540). It is also noted that any message resident on the device can be analyzed using the disclosed process, such as incoming and outgoing messages.

In some embodiments, the identified entity is (806) a name and the identified item of contact information is a phone number, address, business or social networking handle.

In some embodiments, the device can identify unstructured content in the message by recognizing signatures in the message. For example, to identify the entity and associated item of contact information in the message, the device can identify (808) a signature block of the message and analyze the identified signature block for the entity and the item of contact information. The message can include (810) an email and the signature block can be an e-mail signature. The email can include (812) one or more prior emails in an email thread, and the identifying of the e-mail signature can include analyzing the one or more prior emails in the email thread. By unrolling the quoting layers of the e-mail the device can avoid misassociating contact information location in different e-mails in an e-mail thread.

In some embodiments, the device can identify unstructured content in the message by searching for definitive phrases with data detectors. For example, to identify the entity and associated item of contact information in the message, the device can identify (814) in the message one or more phrases based on a collection of predefined phrases, and analyze the one or more identified phrases for the entity and the item of contact information. The device can update (816) the collection of predefined phrases over a network, which can allow the device to continue to use accurate phrases. The device can also downgrade (818) one or more of the predefined phrases as a result of a request to reject the suggested item of contact information. In other words, if users continue to reject suggestions identified through the use of particular phrases, that can be an indication that those phrases are inaccurate. The device can also generate (820) one or more of the predefined phrases by cross-correlating contact information in the database with language associated with contact information on the electronic device (such as messages, calendar events, etc.) In this manner the device can determine what exact language in a message with contact information, for example, led a user to create or update a contact with the contact information.

In some embodiments, the suggested contact can be searchable in view of the data architecture of FIG. 5A. For example, the device can receive (826) a request for a contact (e.g., by a user searching for a contact via an application on the device) and, in response to the request for a contact, search the suggested item of contact information.

In some embodiments, the device can (828), in response to the updating of the contact, refrain from storing the suggested item of contact information in a remote database over a network. If the suggested item of contact information is in suggested state 540, the device can refrain from pushing the item of contact information to an updating or synchronization service (e.g., an application on the device) that allows contacts to be updated on multiple clients over a network.

In some embodiments, the device can (830) receive a request to add the suggested item of contact information to the database (e.g., FIG. 6B, "Add to Contacts" 602) and in response to the request, store the updated contact, without the indication that the item of contact information is a suggested item of contact information (e.g., change the state of the contact information from suggested state 540 to added state 550), in the database. In response to the request to add the suggested item of contact information to the database, the device can store (832) the updated contact, without the indication that the item of contact information is a suggested item of contact information, in a remote database over a network by, for example, pushing the contact information to an updating/synchronization service.

In some embodiments, the device can (834) receive a request to reject the suggested item of contact information (e.g., FIG. 6B, "Ignore" 604) and, in response to the request, reject the suggested item of contact information, preventing the contact from being updated in the future with the suggested item of contact information as a result of the entity and the item of contact information being identified in a future message. This can be implemented by storing rejected contact information in rejected state 560, so that the device can know what has already been rejected.

Figure 9A:
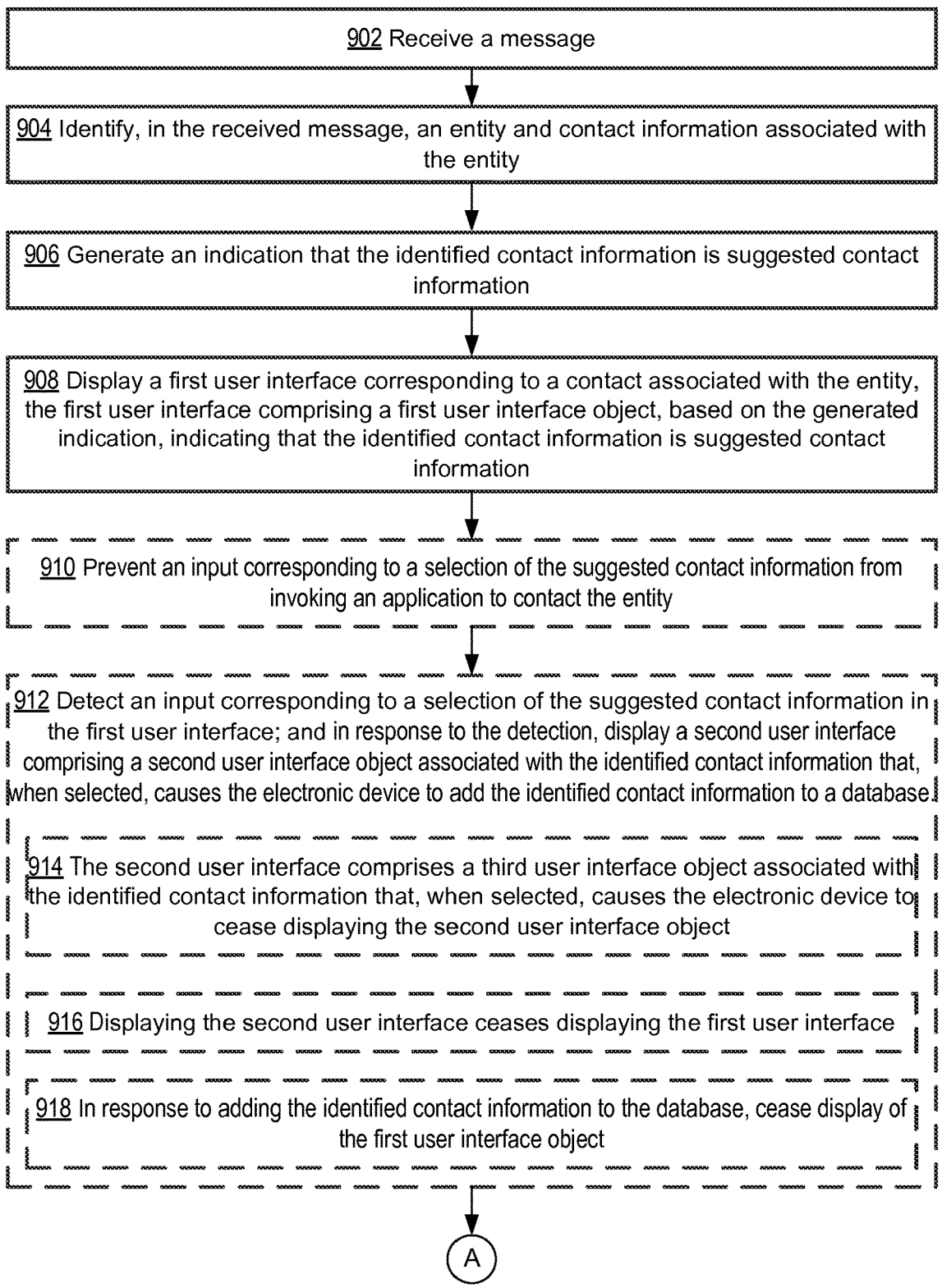
FIGS. 9A and 9B illustrate a flow diagram of an exemplary process for displaying a contact with suggested contact information in accordance with some embodiments.
Figure 9B:
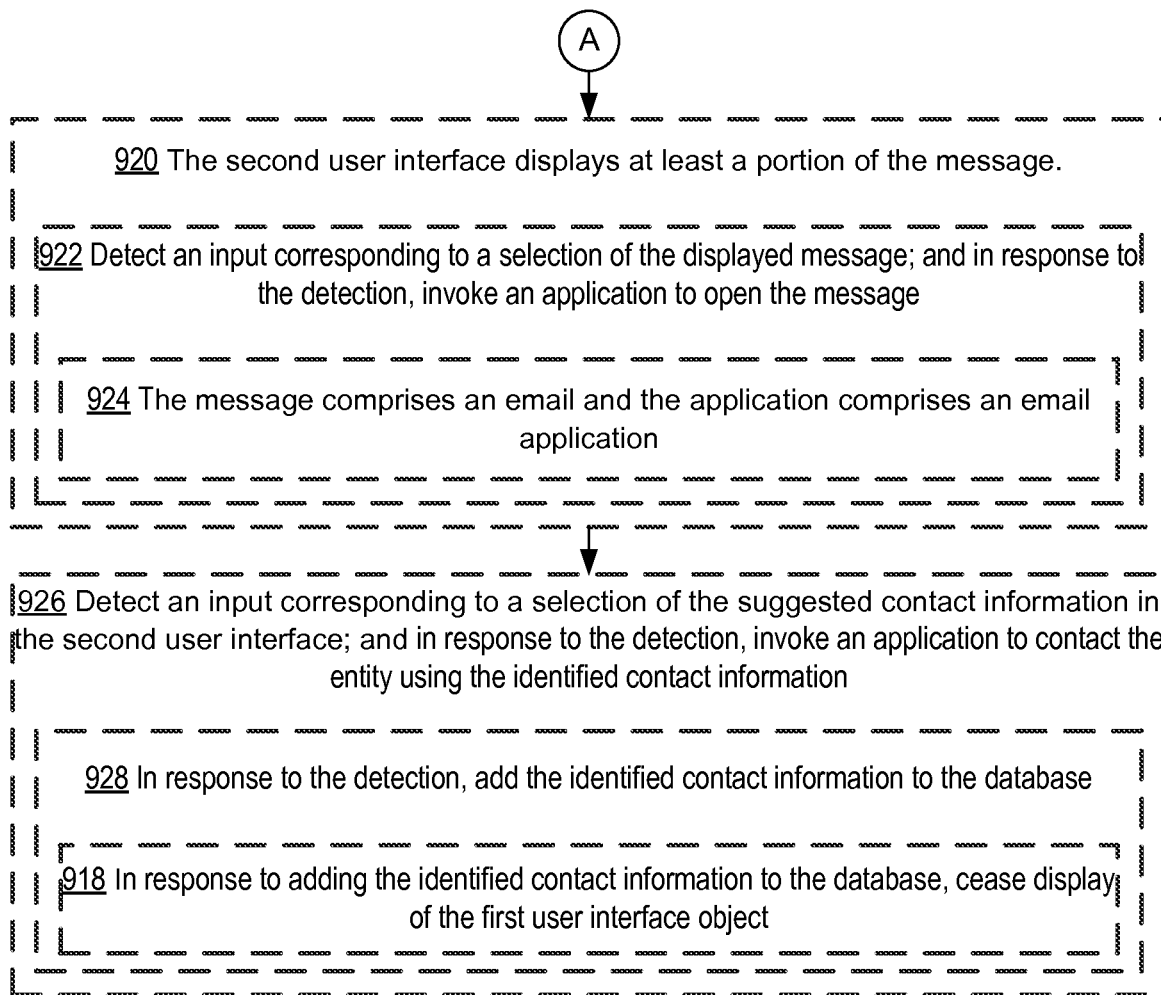

FIGS. 9A and 9B illustrate a flow diagram of an exemplary process for displaying a contact with suggested contact information in accordance with some embodiments. The process can be performed at an electronic device with a display (e.g., device 500).

The electronic device can receive (902) a message (e.g., FIG. 6D, email in message portion 614) and identify (904), in the received message, an entity (e.g., FIG. 6D, "John Appleseed") and contact information (e.g., FIG. 6D, "405-123-6633") associated with the entity. The device can generate (906) an indication (e.g., metadata) that the identified contact information is suggested contact information, and display (908) a first user interface (e.g., FIG. 6A) corresponding to a contact associated with the entity. The first user interface can include a first user interface object (e.g., "Suggestion") based on the generated indication, indicating that the identified contact information is suggested contact information.

In some embodiments, the device can prevent (910) an input corresponding to a selection of the suggested contact information from invoking an application to contact the entity (e.g., FIG. 6A, selecting the suggested number does not call the number).

In some embodiments, the device can (912) detect an input corresponding to a selection of the suggested contact information in the first user interface, and in response to the detection, display a second user interface (e.g., FIG. 6B) including a second user interface object (e.g., FIG. 6B, "Add to Contacts" 602) associated with the identified contact information that, when selected, causes the electronic device to add the identified contact information to a database. The second user interface can (914) include a third user interface object (e.g., FIG. 6B, "Ignore" 604) associated with the identified contact information that, when selected, causes the electronic device to cease displaying the second user interface object. Displaying the second user interface can cease (916) displaying the first user interface. The device can, in response to adding the identified contact information to the database, cease (918) display of the first user interface object.

In some embodiments the second user interface can display (920) at least a portion of the message (e.g., FIG. 6B, "Related email"). The device can (922) detect an input corresponding to a selection of the displayed message and, in response to the detection, invoke an application (e.g., E-mail Client Module 140) to open the message (e.g., FIG. 6D). The message can (924) be an email and the application can be an email application.

In some embodiments the device can detect (926) an input corresponding to a selection of the suggested contact information in the second user interface, and in response to the detection, invoke an application (e.g., telephone module 138) to contact the entity using the identified contact information. In response to the detection of the input corresponding to a selection of the suggested contact information in the second user interface, the device can (928) add the identified contact information to the database (e.g., change the state of the contact information from suggested state 540 to added state 550). The device can, in response to adding the identified contact information to the database, cease (918) display of the first user interface object.

Figure 10:
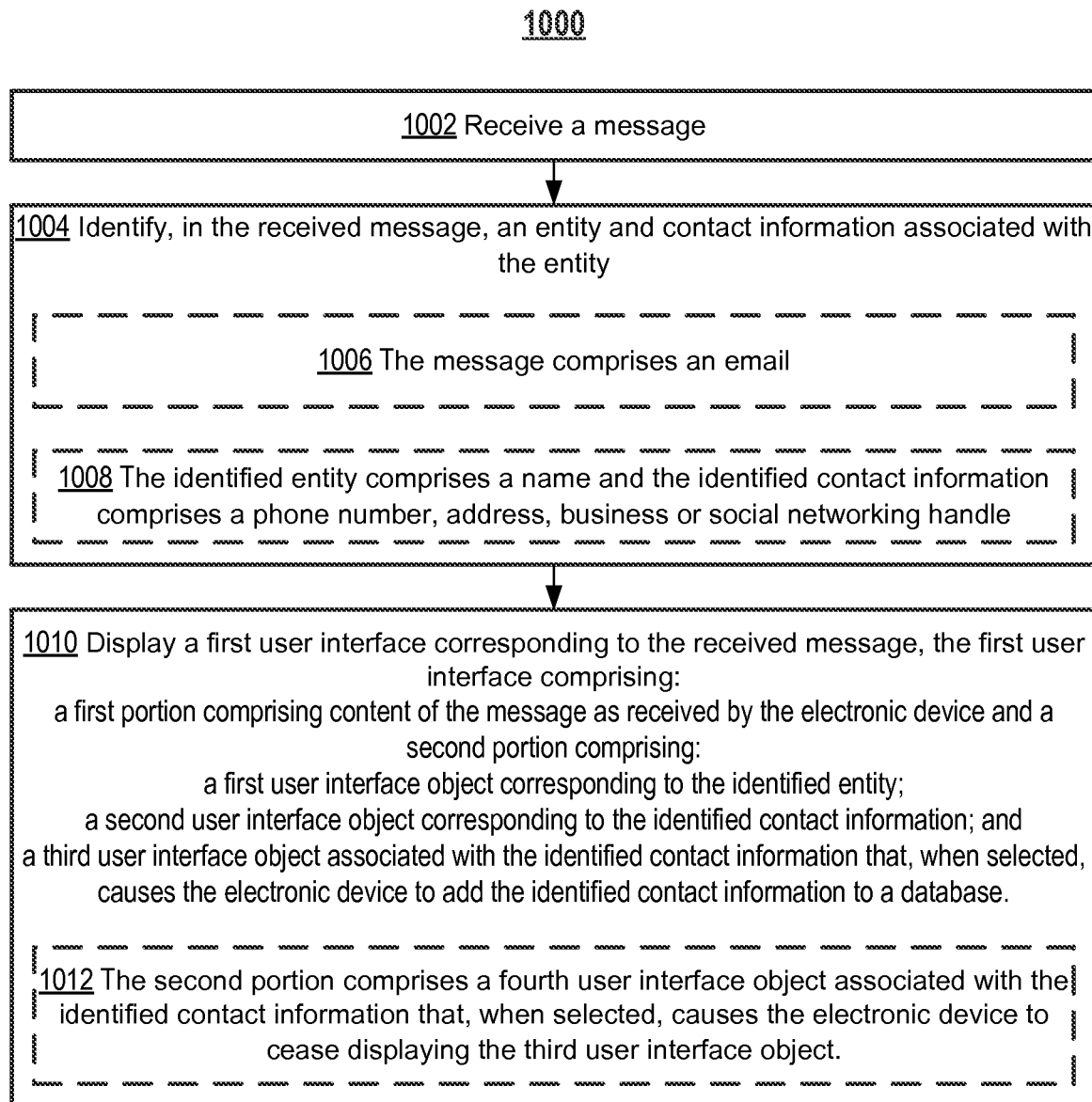
FIG. 10 illustrates a flow diagram of an exemplary process for displaying suggested contact information with a message in accordance with some embodiments.

FIG. 10 illustrates a flow diagram of an exemplary process for displaying suggested contact information with a message in accordance with some embodiments. The process can be performed at an electronic device with a display (e.g., device 500).

The electronic device can receive (1002) a message (e.g., FIG. 6D, email in message portion 614) and identify (1004), in the received message, an entity (e.g., FIG. 6D, "John Appleseed") and contact information (e.g., FIG. 6D, "405-123-6633") associated with the entity. The message can (1006) be an email. The identified entity can (1008) be a name and the identified contact information can be a phone number, address, business or social networking handle.

The device can display (1010) a first user interface (e.g., FIG. 6D) corresponding to the received message. The first user interface can include a first portion (e.g., FIG. 6D, message portion 614) including content of the message as received by the electronic device and a second portion (e.g., FIG. 6D, suggestion portion 612) including a first user interface object (e.g., FIG. 6D, "John Appleseed") corresponding to the identified entity, a second user interface object (e.g., FIG. 6D, "405-123-6633") corresponding to the identified contact information, and a third user interface object (e.g., FIG. 6D, "Add to Contacts" 618) associated with the identified contact information that, when selected, causes the electronic device to add the identified contact information to a database (e.g., store the contact information as a contact). The second portion can (1012) include a fourth user interface object (e.g., FIG. 6D, "Ignore" 620) associated with the identified contact information that, when selected, causes the electronic device to cease displaying the third user interface object.

Figure 11B:
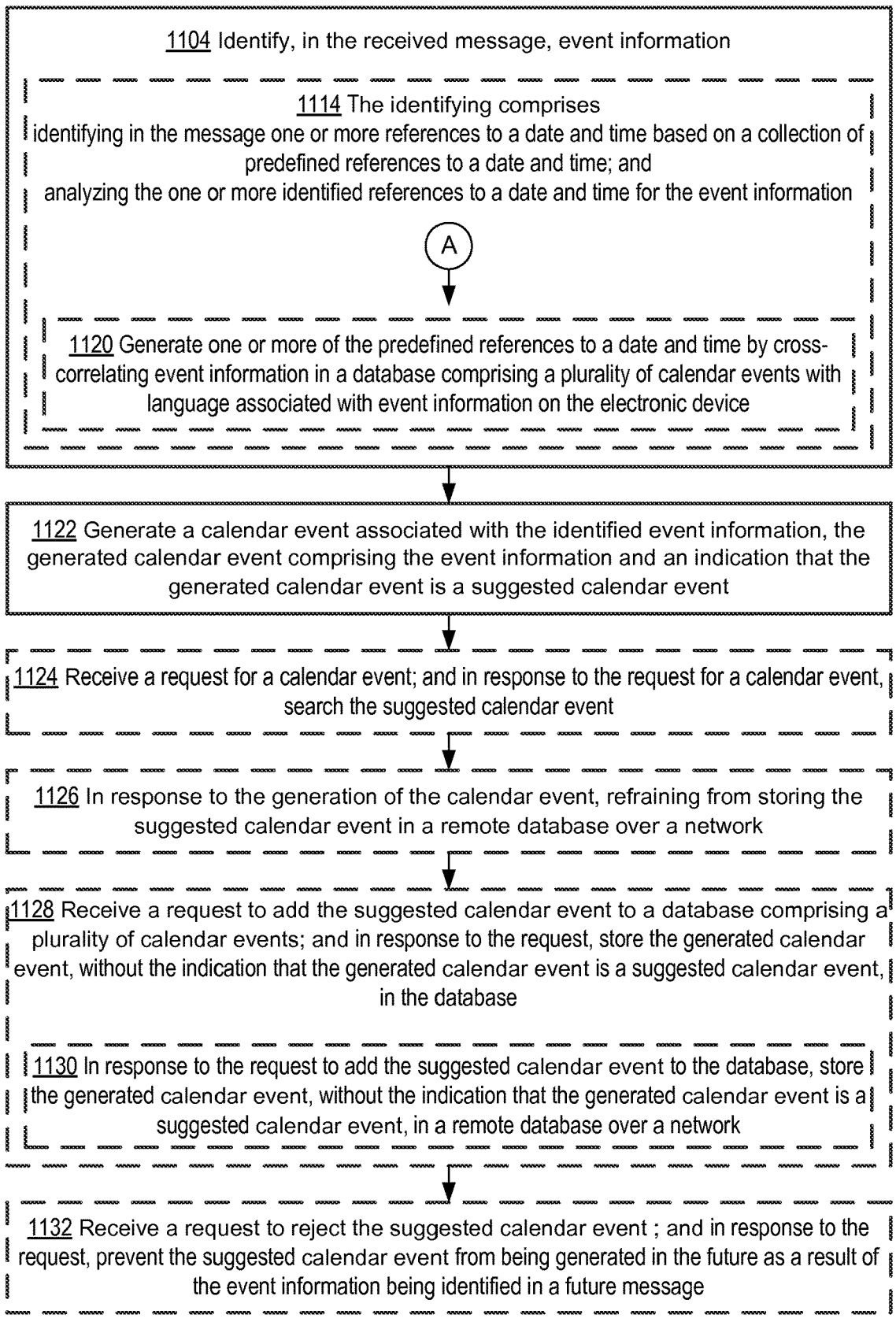

FIGS. 11A and 11B illustrate a flow diagram of an exemplary process for generating a suggested calendar event in accordance with some embodiments. The process can be performed at an electronic device (e.g., device 500).

The electronic device can receive (1102) a message (e.g., FIG. 6E, email in message portion 622) and identify (1104), in the received message, event information (e.g., FIG. 6E, "Dinner", "Any Sushi Bar", "Fri, March 7th", or "9:50 PM"). The device can generate (1122) a calendar event (e.g., FIG. 5B, calendar event 530B) associated with the identified event information, the generated calendar event including the event information and an indication (e.g., metadata) that the generated calendar event is a suggested calendar event (e.g., in suggested state 540).

In some embodiments, the identified event information is (1106) a date and a time.

In some embodiments, the device can identify structured content in the message by using templates configured to recognize event information in the particular format provided by such messages. For example, to identify the event information in the message, the device can (1108) identify a format of content in the message, identify a template from a collection of predefined templates that is configured to recognize event information in the format of the content in the message, and analyze the content with the identified template for the event information. The message can include (1110) an email and the content can include a reservation (e.g., FIG. 6E). The device can update (1112) the collection of predefined templates over a network, which can allow the device to continue to use accurate templates.

In some embodiments, the device can identify unstructured content in the message by searching for references to event information with data detectors. For example, to identify the event information in the message, the device can identify (1114) in the message one or more references to a date and time based on a collection of predefined references to a date and time, and analyze the one or more identified references to a date and time for the event information. The device can update (1116) the collection of predefined references to a date and time over a network, which can allow the device to continue to use accurate references. The device can downgrade (1118) one or more of the predefined references to a date and time as a result of a request to reject the suggested calendar event. In other words, if users continue to reject suggestions identified through the use of particular references to date and time, that can be an indication that those references are inaccurate. The device can generate (1120) one or more of the predefined references to a date and time by cross-correlating event information in a database including a plurality of calendar events with language associated with event information on the electronic device. In this manner the device can better determine what language in a message with event information, for example, led a user to create or update a calendar event with the event information.

In some embodiments, the suggested calendar event can be searchable in view of the data architecture of FIG. 5. For example, the device can receive (1124) a request for a calendar event (e.g., by a user searching for a calendar event via an application on the device) and, in response to the request for a calendar event, searching the suggested calendar event.

In some embodiments, the device can, in response to the generation of the calendar event, refrain (1126) from storing the suggested calendar event in a remote database over a network. For example, if the suggested calendar event is in suggested state 540, the device can refrain from pushing the calendar event to an updating or synchronization service (e.g., an application on the device) that allows calendar events to be updated on multiple clients over a network.

In some embodiments the device can (1128) receive a request to add the suggested calendar event (e.g., FIG. 6E, "Add to Calendar" 626) to a database including a plurality of calendar events, and in response, storing the generated calendar event, without the indication that the generated calendar event is a suggested calendar event (e.g., change the state of the calendar event from suggested state 540 to added state 550), in the database. In response to the request to add the suggested calendar event to the database, the device can store (1130) the generated calendar event, without the indication that the generated calendar event is a suggested calendar event, in a remote database over a network by, for example, pushing the calendar event to an updating or synchronization service.

In some embodiments, the device can (1132) receive a request to reject the suggested calendar event (e.g., FIG. 6E, "Ignore" 628), and, in response to the request to reject, prevent the suggested calendar event from being generated in the future as a result of the event information being identified in a future message. This can be implemented by storing rejected events in rejected state 560, so that the device can know what has already been rejected.

Figure 12:
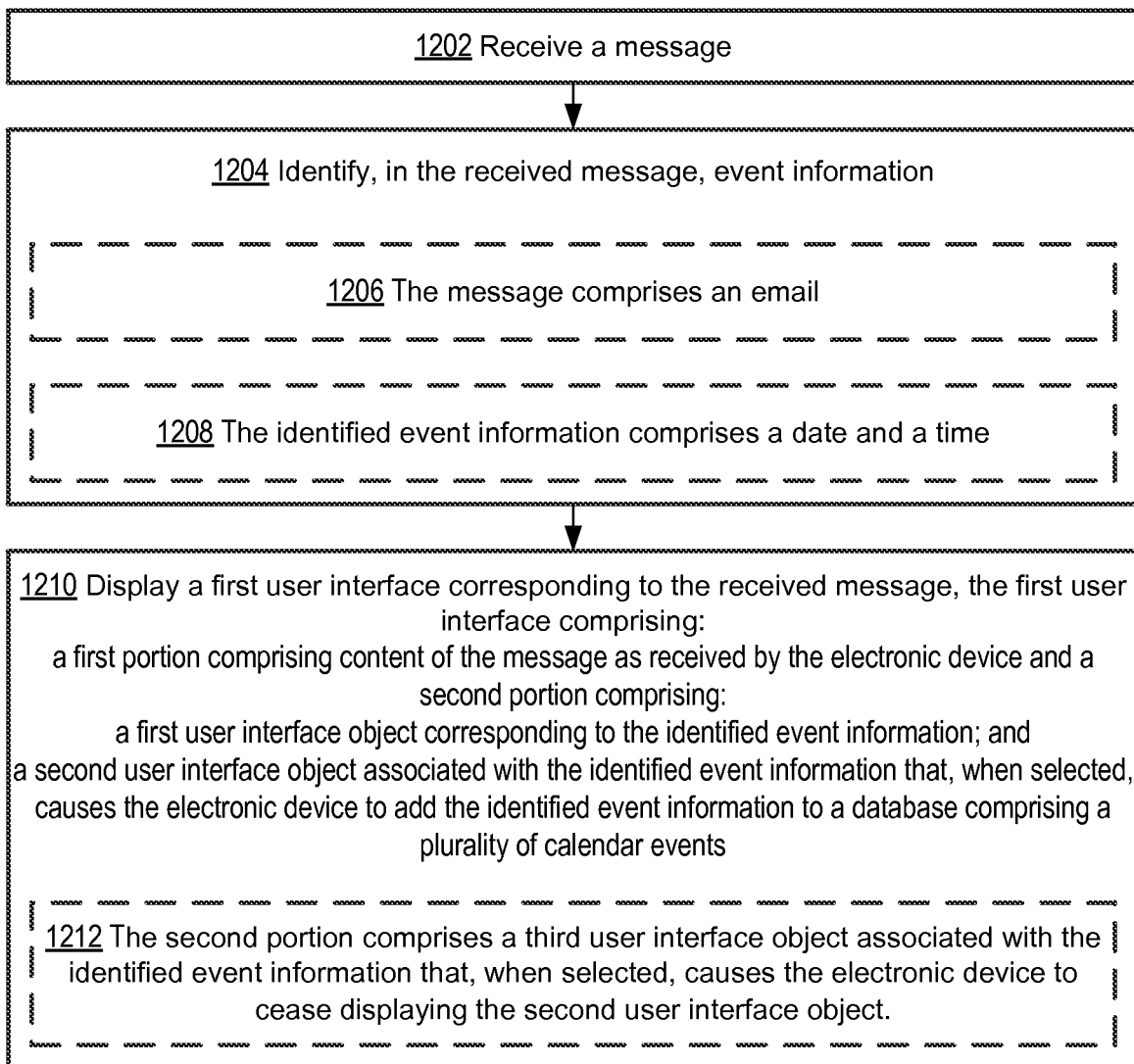
FIG. 12 illustrates a flow diagram of an exemplary process for displaying suggested event information with a message in accordance with some embodiments.

FIG. 12 illustrates a flow diagram of an exemplary process for displaying suggested event information with a message in accordance with some embodiments. The process can be performed at an electronic device with a display (e.g., device 500).

The electronic device can receive (1202) a message (e.g., FIG. 6E, email in message portion 622) and identify (1204), in the received message, event information (e.g., FIG. 6E, "Dinner", "Any Sushi Bar", "Fri, March 7th", or "9:50 PM"). The message can be (1206) an email. The identified event information can (1208) be a date and a time.

The device can display (1210) a first user interface (e.g., FIG. 6E) corresponding to the received message. The first user interface can include a first portion (e.g., FIG. 6E, message portion 622) including content of the message as received by the electronic device and a second portion (e.g., FIG. 6E, suggestion portion 620) including a first user interface object (e.g., FIG. 6E, "Dinner", "Any Sushi Bar", "Fri, March 7th", or "9:50 PM") corresponding to the identified event information and a second user interface object (e.g., FIG. 6E, "Add to Calendar" 626) associated with the identified event information that, when selected, causes the electronic device to add the identified event information to a database including a plurality of calendar events (e.g., store the event information as a calendar event). The second portion can (1212) include a third user interface object (e.g., FIG. 6E, "Ignore" 628) associated with the identified event information that, when selected, causes the electronic device to cease displaying the second user interface object.

Figure 13:
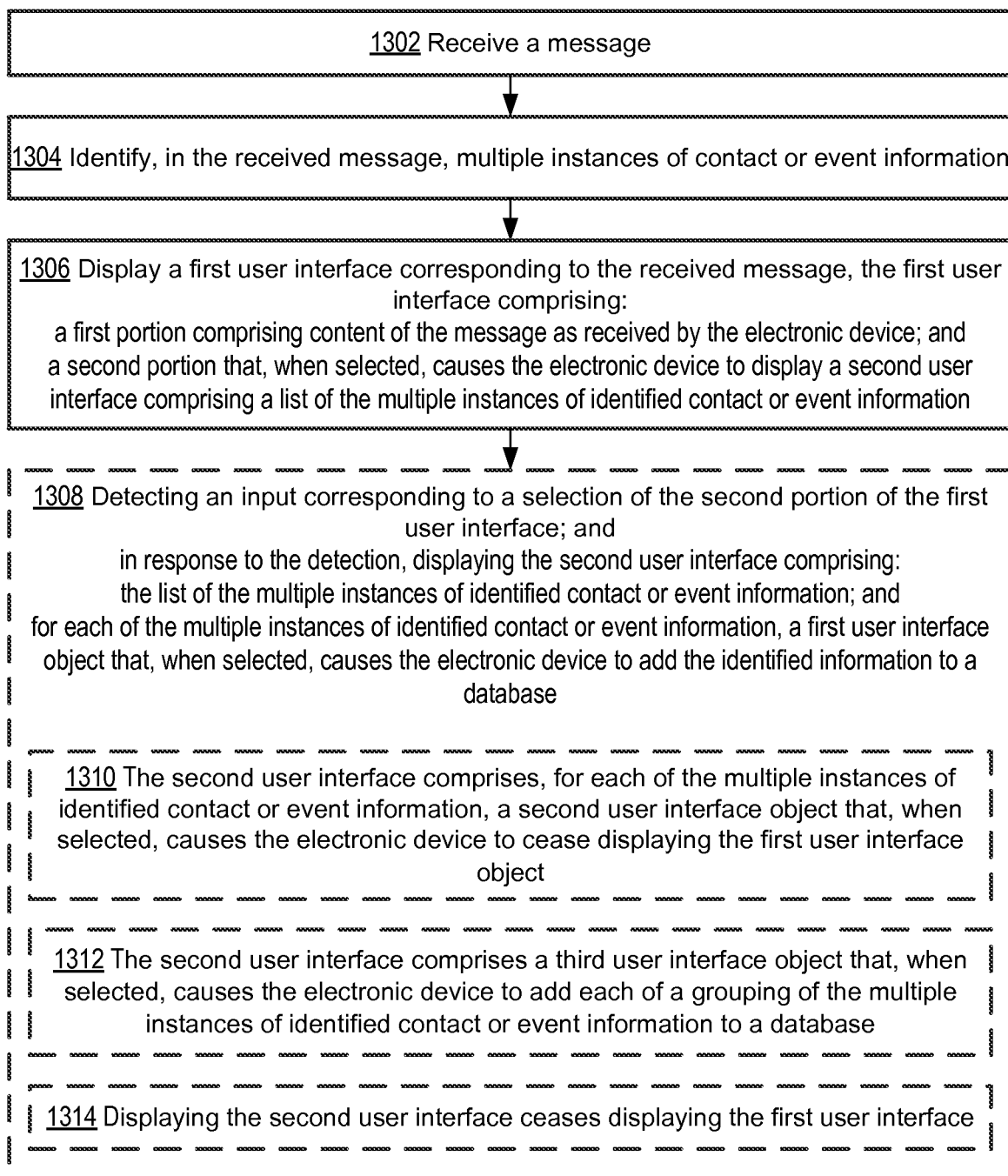
FIG. 13 illustrates a flow diagram of an exemplary process for displaying multiple suggested contact or event information with a message in accordance with some embodiments.

FIG. 13 illustrates a flow diagram of an exemplary process for displaying multiple suggested contact or event information with a message in accordance with some embodiments. The process can be performed at an electronic device with a display (e.g., device 500).

The electronic device can receive (1302) a message (e.g., FIG. 6F, email in message portion 632) and identify (1304), in the received message, multiple instances of contact or event information (e.g., FIG. 6F, "2 Events, 1 Contact" in attached travel itinerary).

The device can display (1306) a first user interface (e.g., FIG. 6F) corresponding to the received message. The first user interface can include a first portion (e.g., FIG. 6F, message portion 632) including content of the message as received by the electronic device and a second portion (e.g., FIG. 6F, suggestion portion 630) that, when selected, causes the electronic device to display a second user interface (FIG. 6G) including a list of the multiple instances of identified contact or event information.

In some embodiments, the device can (1308) detect an input corresponding to a selection of the second portion of the first user interface and, in response to the detection, display the second user interface including the list of the multiple instances of identified contact or event information and, for each of the multiple instances of identified contact or event information, a first user interface object (e.g., FIG. 6G, "Add to Calendar", or "Add to Contacts") that, when selected, causes the electronic device to add the identified information to a database (e.g., store the event information as a calendar event, or the contact information as a contact). The second user interface can (1310) include, for each of the multiple instances of identified contact or event information, a second user interface object (e.g., FIG. 6G, "Ignore") that, when selected, causes the electronic device to cease displaying the first user interface object. The second user interface can (1312) include a third user interface object (e.g., FIG. 6G, "Add All" 634) that, when selected, causes the electronic device to add each of a grouping (e.g., calendar events or contacts) of the multiple instances of identified contact or event information to a database. Displaying the second user interface can cease (1314) displaying the first user interface.

It should be understood that the particular order in which the operations in FIGS. 7A-13 have been described is exemplary and not intended to indicate that the described order is the only order in which the operations could be performed. One of ordinary skill in the art would recognize various ways to reorder the operations described herein. For brevity, these details are not repeated here. Additionally, it should be noted that aspects of processes 700-1300 (FIGS. 7-13) may be incorporated with one another.

The operations in the information processing processes described above may be implemented by running one or more functional modules in information processing apparatus such as general purpose processors or application specific chips. These modules, combinations of these modules, and/or their combination with general hardware (e.g., as described above with respect to FIGS. 1A, 1B and 3) are all included within the scope of protection of the invention.

Figure 14:
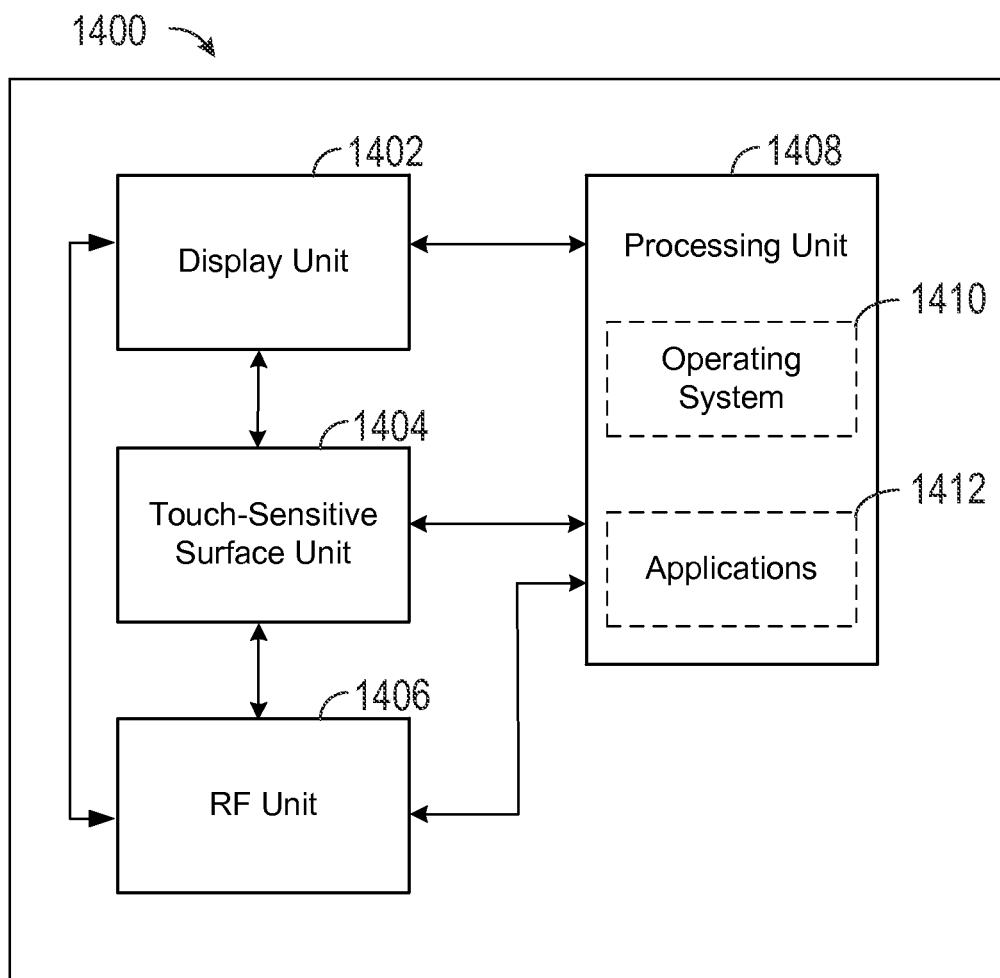
FIG. 14 is a functional block diagram of an electronic device in accordance with some embodiments.

FIG. 14 shows exemplary functional blocks of an electronic device 1400 that, in some examples, perform the features described above. As shown in FIG. 14, electronic device 1400 includes a display unit 1402 configured to display graphical objects; a touch-sensitive surface unit 1404 configured to receive user gestures; one or more RF units 1406 configured to detect and communicate with external electronic devices; and a processing unit 1408 coupled to display unit 1402, touch-sensitive surface unit 1404, and RF units 1406.

In some embodiments, processing unit 1408 is configured to support an operating system 1410 running one or more applications 1412. In some embodiments, processing unit 1408 is configured to receive data, from RF unit 1406, representing an external device that is within wireless communications range, display a graphical user interface affordance on touch-sensitive surface unit 1404, and in response to detecting a contact on the displayed affordance, launch an application on device 1400 that corresponds to an application that is executing on the external device.

The functional blocks of the device 1400 are, optionally, implemented by hardware, software, or a combination of hardware and software to carry out the principles of the various described examples. It is understood by persons of skill in the art that the functional blocks described in FIG. 14 are, optionally, combined or separated into sub-blocks to implement the principles of the various described examples. Therefore, the description herein optionally supports any possible combination or separation or further definition of the functional blocks described herein.

Figure 15:
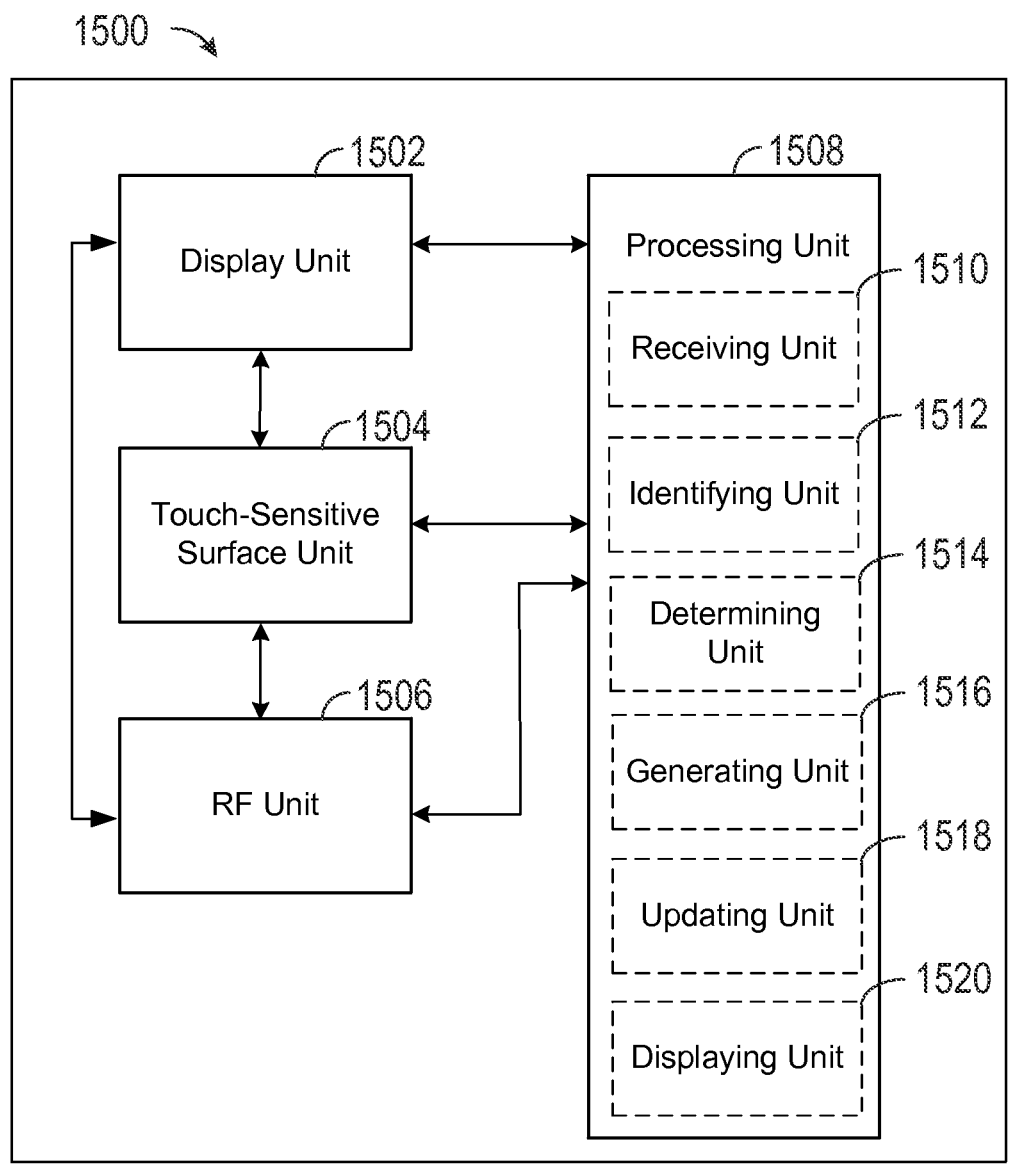
FIG. 15 is a functional block diagram of an electronic device in accordance with some embodiments.

FIG. 15 shows exemplary functional blocks of another electronic device 1500 that, in some examples, perform the features described above. As shown in FIG. 14, electronic device 1500 includes a display unit 1402 configured to display graphical objects; a touch-sensitive surface unit 1504 configured to receive user gestures; one or more RF units 1506 configured to detect and communicate with external electronic devices; and a processing unit 1508 coupled to display unit 1502, touch-sensitive surface unit 1504, and RF units 1506.

In some embodiments, processing unit 1508 is configured to support one or more of units 1510-1520 to perform the various functions described above. For example, receiving unit 1510 is configured to perform one or more of the receiving functions describe above (e.g., receiving a message). Identifying unit 1512 is configured to perform one or more of the identifying functions described above (e.g., identifying, in a received message, an entity and contact information associated with the entity; identifying, in a received message, event information; or identifying, in a received message, multiple instances of contact or event information). Determining unit 1514 is configured to perform one or more of the determining functions described above (e.g., determining that a contact associated with the identified entity does not exist among a plurality of contacts in a database; determining that a contact associated with the identified entity exists among a plurality of contacts in a database and that the contact does not comprise the identified item of contact information). Generating unit 1516 is configured to perform one or more of the generating steps described above (e.g., generating, in response to the determining, a contact associated with the entity; generating an indication that the identified contact information is suggested contact information; generating a calendar event associated with the identified event information). Updating unit 1518 is configured to perform one or more of the updating steps described above (e.g., updating, in response to the determining, the contact to comprise the items of contact information and an indication that the item of contact information is a suggested item of contact information). Displaying unit 1520 is configured to perform one or more of the displaying steps described above (e.g., displaying, for example on display unit 1502, a first user interface corresponding to a contact associated with the entity or the received message).

The functional blocks of the device 1500 are, optionally, implemented by hardware, software, or a combination of hardware and software to carry out the principles of the various described examples. It is understood by persons of skill in the art that the functional blocks described in FIG. 15 are, optionally, combined or separated into sub-blocks to implement the principles of the various described examples. Therefore, the description herein optionally supports any possible combination or separation or further definition of the functional blocks described herein.

Figure 16:
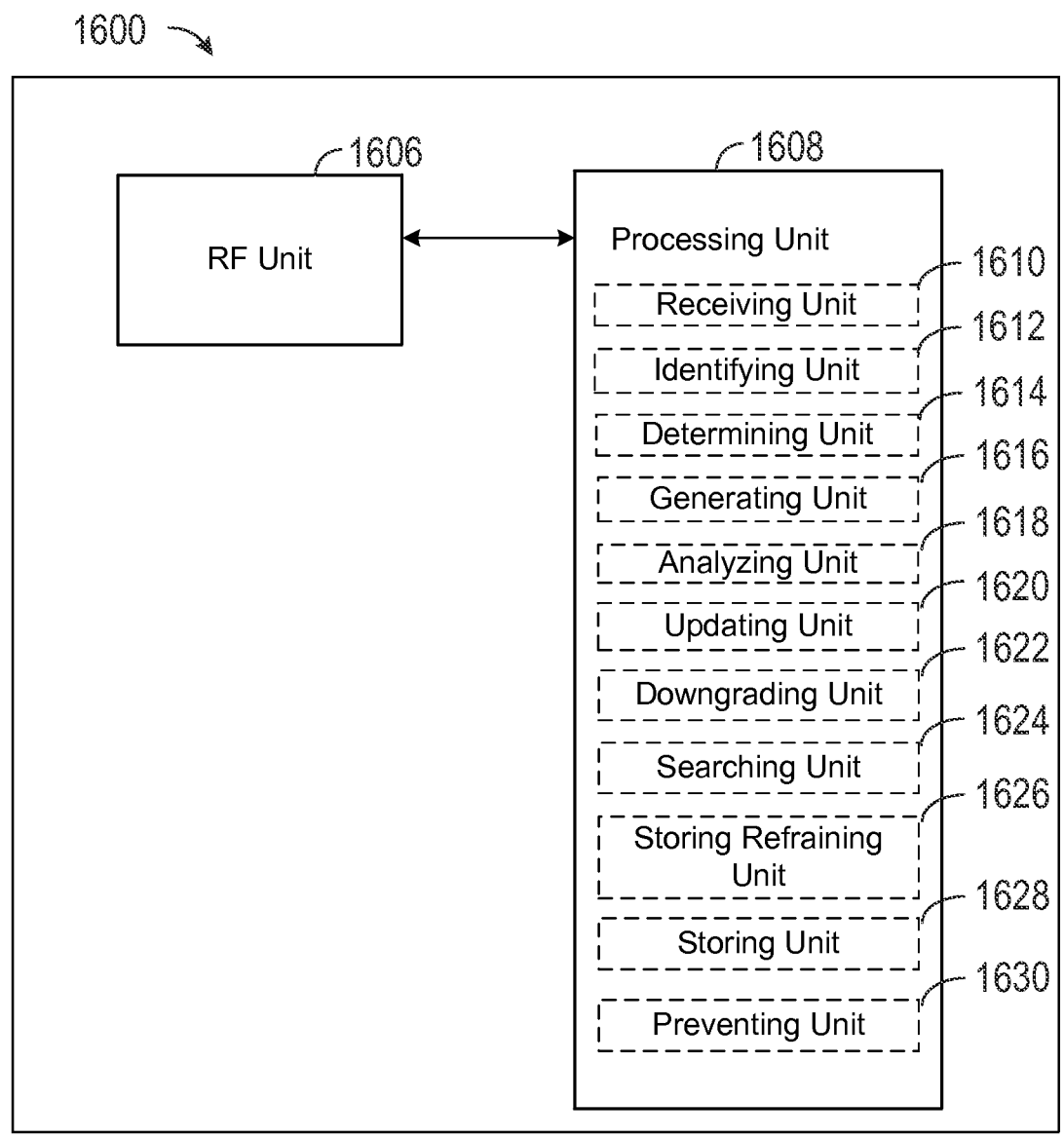
FIG. 16 is a functional block diagram of an electronic device in accordance with some embodiments.

In accordance with some embodiments, FIG. 16 shows a functional block diagram of an electronic device 1600 configured in accordance with the principles of the various described embodiments. The functional blocks of the device are, optionally, implemented by hardware, software, or a combination of hardware and software to carry out the principles of the various described embodiments. It is understood by persons of skill in the art that the functional blocks described in FIG. 16 are, optionally, combined or separated into sub-blocks to implement the principles of the various described embodiments. Therefore, the description herein optionally supports any possible combination or separation or further definition of the functional blocks described herein.

As shown in FIG. 16, an electronic device 1600 includes one or more RF units 1606 configured communicate with external electronic devices; and a processing unit 1608, coupled to the RF units 1606. In some embodiments, the processing unit 1608 includes a receiving unit 1610, an identifying unit 1612, a determining unit 1614, a generating unit 1616, an analyzing unit 1618, an updating unit 1620, a downgrading unit 1622, a searching unit 1624, a storing refraining unit 1626, a storing unit 1628, and a preventing unit 1630.

The processing unit 1608 is configured to: receive (e.g., with receiving unit 1610) a message; identify (e.g., with identifying unit 1612), in the received message, an entity and contact information associated with the entity; determine (e.g., with determining unit 1614) that a contact associated with the identified entity does not exist among a plurality of contacts in a database; and in response to the determining, generate (e.g., with generating unit 1616) a contact associated with the entity, the generated contact comprising the contact information and an indication that the generated contact is a suggested contact.

In some embodiments, the identified entity comprises a name and the identified contact information comprises a phone number, address, business or social networking handle.

In some embodiments, to identify, the processing unit 1608 is further configured to: identify (e.g., with identifying unit 1612) a signature block of the message; and analyze (e.g., with analyzing unit 1618) the identified signature block for the entity and the contact information.

In some embodiments, the message comprises an email and the signature block comprises an e-mail signature.

In some embodiments, the email comprises one or more prior emails in an email thread, and wherein to identify the e-mail signature, the processing unit 1608 is further configured to: analyze (e.g., with analyzing unit 1618) the one or more prior emails in the email thread.

In some embodiments, to identify, the processing unit 1608 is further configured to: identify (e.g., with identifying unit 1612) in the message one or more phrases based on a collection of predefined phrases; and analyze (e.g., with analyzing unit 1618) the one or more identified phrases for the entity and the contact information.

In some embodiments, the processing unit 1608 further configured to: update (e.g., with updating unit 1620) the collection of predefined phrases over a network.

In some embodiments, the processing unit 1608 further configured to: downgrade (e.g., with downgrading unit 1622) one or more of the predefined phrases as a result of a request to reject the suggested contact.

In some embodiments, the processing unit 1608 further configured to: generate (e.g., with generating unit 1616) one or more of the predefined phrases by cross-correlating contact information in the database with language associated with contact information on the electronic device.

In some embodiments, the processing unit 1608 further configured to: receive (e.g., with receiving unit 1610) a request for a contact; and in response to the request for a contact, search (e.g., with searching unit 1624) the suggested contact.

In some embodiments, the processing unit 1608 further configured to: in response to the generation of the contact, refrain from storing (e.g., with storing refraining unit 1626) the suggested contact in a remote database over a network.

In some embodiments, the processing unit 1608 further configured to: receive (e.g., with receiving unit 1610) a request to add the suggested contact to the database; and in response to the request to add the suggested contact to the database, store (e.g., with storing unit 1628) the generated contact, without the indication that the generated contact is a suggested contact, in the database.

In some embodiments, the processing unit 1608 further configured to: in response to the request to add the suggested contact to the database, store (e.g., with storing unit 1628) the generated contact, without the indication that the generated contact is a suggested contact, in a remote database over a network.

In some embodiments, the processing unit 1608 further configured to: receive (e.g., with receiving unit 1610) a request to reject the suggested contact; and in response to the request to reject the suggested contact, prevent (e.g., with preventing unit 1630) the suggested contact from being generated in the future as a result of the entity and the contact information being identified in a future message.

The operations described above with reference to FIGS. 7A-7B are, optionally, implemented by components depicted in FIGS. 1A-1B or FIG. 16. For example, receive operation at block 702, identify operation at block 704, determine operation at block 722, generate operation at block 724, receive operation at block 726, and refrain from storing operation at block 728 may be implemented by event sorter 170, event recognizer 180, and event handler 190.

Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub event, such as activation of an affordance on a user interface. When a respective predefined event or sub-event is detected, event recognizer 180 activates an event handler 190 associated with the detection of the event or sub-event. Event handler 190 may utilize or call data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Figure 17:
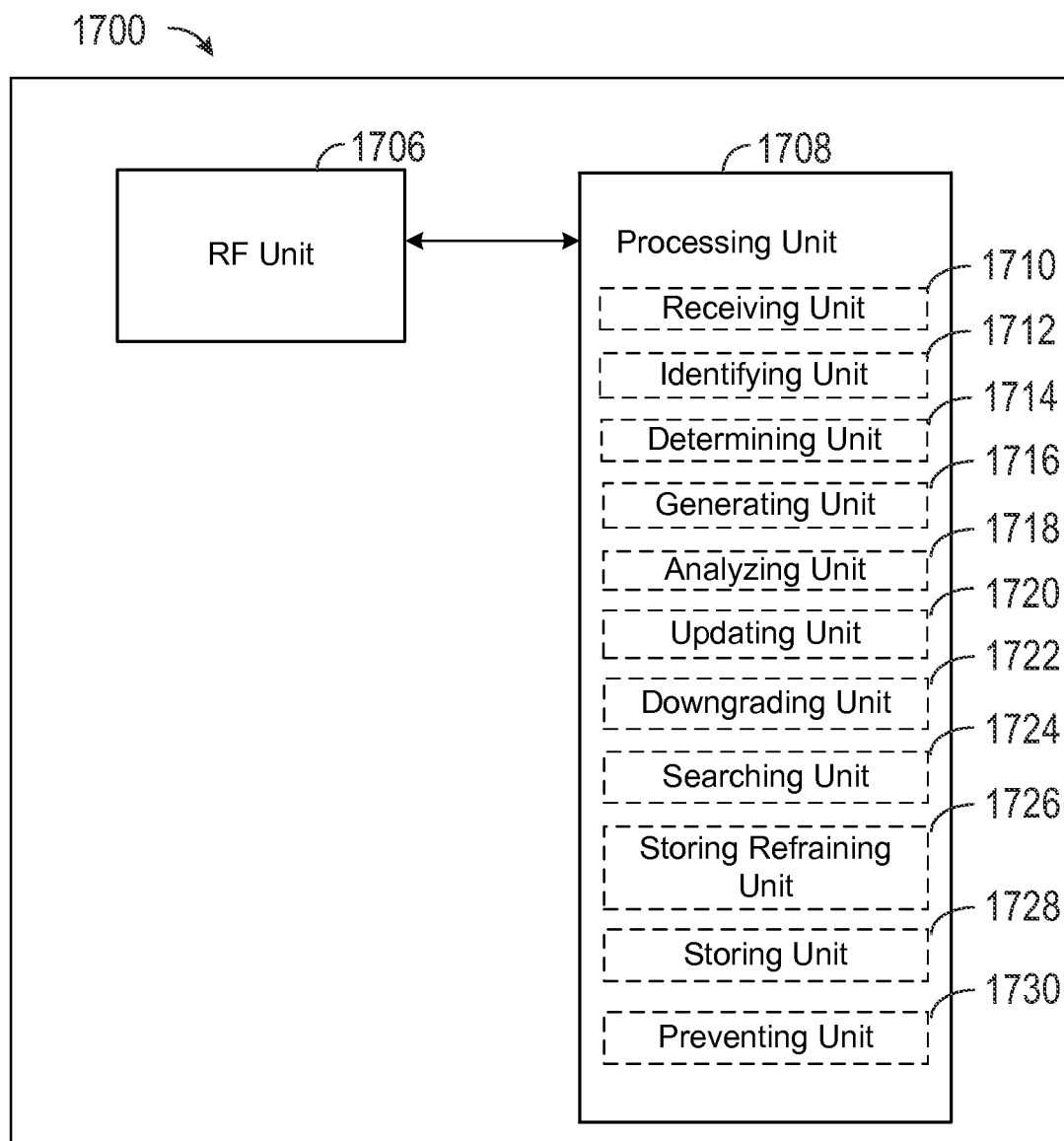
FIG. 17 is a functional block diagram of an electronic device in accordance with some embodiments.

In accordance with some embodiments, FIG. 17 shows a functional block diagram of an electronic device 1700 configured in accordance with the principles of the various described embodiments. The functional blocks of the device are, optionally, implemented by hardware, software, or a combination of hardware and software to carry out the principles of the various described embodiments. It is understood by persons of skill in the art that the functional blocks described in FIG. 17 are, optionally, combined or separated into sub-blocks to implement the principles of the various described embodiments. Therefore, the description herein optionally supports any possible combination or separation or further definition of the functional blocks described herein.

As shown in FIG. 17, an electronic device 1700 includes one or more RF units 1706 configured to communicate with external electronic devices; and processing unit 1708 coupled to one or more RF units 1706. In some embodiments, the processing unit 1708 includes a receiving unit 1710, an identifying unit 1712, a determining unit 1714, a generating unit 1716, an analyzing unit 1718, an updating unit 1720, a downgrading unit 1722, a searching unit 1724, a storing refraining unit 1726, a storing unit 1728, and a preventing unit 1730.

The processing unit 1708 is configured to: receive (e.g., with receiving unit 1710) a message; identify (e.g., with identifying unit 1712), in the received message, an entity and an item of contact information associated with the entity; determine (e.g., with determining unit 1714) that a contact associated with the identified entity exists among a plurality of contacts in a database and that the contact does not comprise the identified item of contact information; and in response to the determining, update (e.g., with updating unit 1720) the contact to comprise the item of contact information and an indication that the item of contact information is a suggested item of contact information.

In some embodiments, the identified entity comprises a name and the identified item of contact information comprises a phone number, address, business or social networking handle.

In some embodiments, to identify, the processing unit 1708 is further configured to: identify (e.g., with identifying unit 1712) a signature block of the message; and analyze (e.g., with analyzing unit 1718) the identified signature block for the entity and the item of contact information.

In some embodiments, the message comprises an email and the signature block comprises an e-mail signature.

In some embodiments, the email comprises one or more prior emails in an email thread, and wherein to identify the e-mail signature, the processing unit 1708 is further configured to analyze (e.g., with analyzing unit 1718) the one or more prior emails in the email thread.

In some embodiments, to identify, the processing unit 1708 is further configured to: identify (e.g., with identifying unit 1712) in the message one or more phrases based on a collection of predefined phrases; and analyze (e.g., with analyzing unit 1718) the one or more identified phrases for the entity and the item of contact information.

In some embodiments, the processing unit 1708 is further configured to: update (e.g., with updating unit 1720) the collection of predefined phrases over a network.

In some embodiments, the processing unit 1708 is further configured to: downgrade (e.g., with downgrading unit 1722) one or more of the predefined phrases as a result of a request to reject the suggested item of contact information.

In some embodiments, the processing unit 1708 is further configured to: generate (e.g., with generating unit 1716) one or more of the predefined phrases by cross-correlating contact information in the database with language associated with contact information on the electronic device.

In some embodiments, the processing unit 1708 is further configured to: receive (e.g., with receiving unit 1710) a request for a contact; and in response to the request for a contact, search (e.g., with searching unit 1724) the suggested item of contact information.

In some embodiments, the processing unit 1708 is further configured to: in response to the updating of the contact, refrain from storing (e.g., with storing refraining unit 1726) the suggested item of contact information in a remote database over a network.

In some embodiments, the processing unit 1708 is further configured to: receive (e.g., with receiving unit 1710) a request to add the suggested item of contact information to the database; and in response to the request to add the suggested item of contact information to the database, store (e.g., with storing unit 1728) the updated contact, without the indication that the item of contact information is a suggested item of contact information, in the database.

In some embodiments, the processing unit 1708 is further configured to: in response to the request to add the suggested item of contact information to the database, store (e.g., with storing unit 1728) the updated contact, without the indication that the item of contact information is a suggested item of contact information, in a remote database over a network.

In some embodiments, the processing unit 1708 is further configured to: receive (e.g., with receiving unit 1710) a request to reject the suggested item of contact information; and in response to the request to reject the suggested item of contact information, prevent (e.g., with preventing unit 1730) the contact from being updated in the future with the suggested item of contact information as a result of the entity and the item of contact information being identified in a future message.

The operations described above with reference to FIGS. 8A-8B are, optionally, implemented by components depicted in FIGS. 1A-1B or FIG. 17. For example, receive operation at block 802, identify operation at block 804, determine operation at block 822, and update operation at block 824 may be implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub event, such as activation of an affordance on a user interface. When a respective predefined event or sub-event is detected, event recognizer 180 activates an event handler 190 associated with the detection of the event or sub-event. Event handler 190 may utilize or call data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Figure 18:
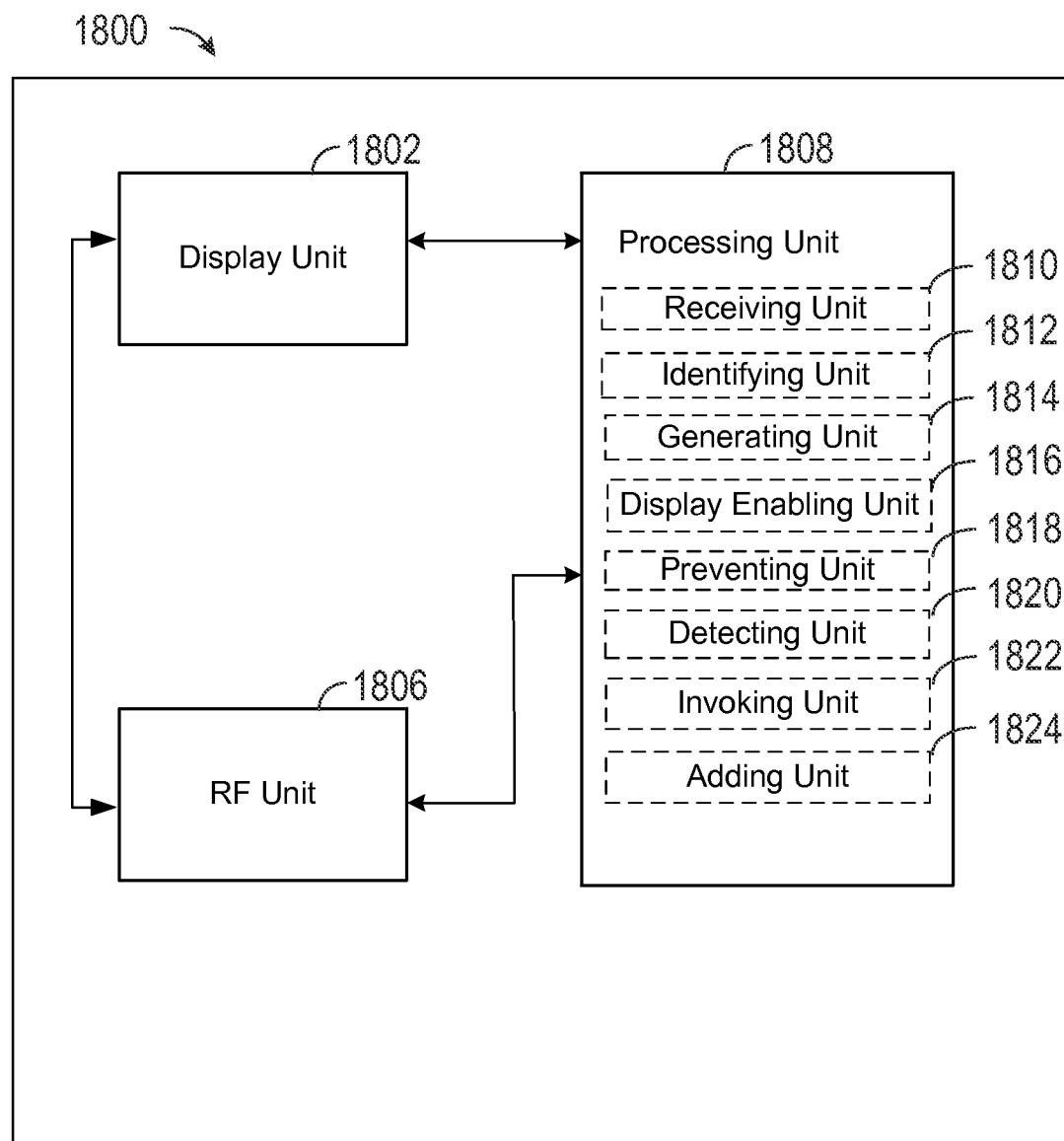
FIG. 18 is a functional block diagram of an electronic device in accordance with some embodiments.

In accordance with some embodiments, FIG. 18 shows a functional block diagram of an electronic device 1800 configured in accordance with the principles of the various described embodiments. The functional blocks of the device are, optionally, implemented by hardware, software, or a combination of hardware and software to carry out the principles of the various described embodiments. It is understood by persons of skill in the art that the functional blocks described in FIG. 18 are, optionally, combined or separated into sub-blocks to implement the principles of the various described embodiments. Therefore, the description herein optionally supports any possible combination or separation or further definition of the functional blocks described herein.

As shown in FIG. 18, an electronic device 1800 includes a display unit 1802 configured to display graphical objects; one or more RF units 1806 configured communicate with external electronic devices; and processing unit 1808 coupled to display unit 1802 and one or more RF units 1806. In some embodiments, the processing unit 1808 includes a receiving unit 1810, an identifying unit 1812, a generating unit 1814, a display enabling unit 1816, a preventing unit 1818, a detecting unit 1820, an invoking unit 1822, and an adding unit 1824.

The processing unit 1808 is configured to: receive (e.g., with receiving unit 1810) a message; identify (e.g., with identifying unit 1812), in the received message, an entity and contact information associated with the entity; generate (e.g., with generating unit 1814) an indication that the identified contact information is suggested contact information; and enable display of (e.g., with display enabling unit 1816) a first user interface corresponding to a contact associated with the entity, the first user interface comprising a first user interface object, based on the generated indication, indicating that the identified contact information is suggested contact information.

In some embodiments, the processing unit 1808 is further configured to: prevent (e.g., with preventing unit 1818) an input corresponding to a selection of the suggested contact information from invoking an application to contact the entity.

In some embodiments, the processing unit 1808 is further configured to: detect (e.g., with detecting unit 1820) an input corresponding to a selection of the suggested contact information in the first user interface; and in response to the detection of the input corresponding to a selection of the suggested contact information in the first user interface, enable display of (e.g., with display enabling unit 1816) a second user interface comprising a second user interface object associated with the identified contact information that, when selected, causes the electronic device to add the identified contact information to a database.

In some embodiments, the second user interface comprises a third user interface object associated with the identified contact information that, when selected, causes the electronic device to cease displaying the second user interface object.

In some embodiments, display of the second user interface ceases display of the first user interface.

In some embodiments, the second user interface displays at least a portion of the message.

In some embodiments, the processing unit 1808 is further configured to: detect (e.g., with detecting unit 1820) an input corresponding to a selection of the displayed message; and in response to the detection of the input corresponding to a selection of the displayed message, invoke (e.g., with invoking unit 1822) an application to open the message.

In some embodiments, the message comprises an email and the application comprises an email application.

In some embodiments, the processing unit 1808 is further configured to: detect (e.g., with detecting unit 1820) an input corresponding to a selection of the suggested contact information in the second user interface; and in response to the detection of the input corresponding to a selection of the suggested contact information in the second user interface, invoke (e.g., with invoking unit 1822) an application to contact the entity using the identified contact information.

In some embodiments, the processing unit 1808 is further configured to: in response to the detection of the input corresponding to a selection of the suggested contact information in the second user interface, add (e.g., with adding unit 1824) the identified contact information to the database.

In some embodiments, the processing unit 1808 is further configured to: in response to adding the identified contact information to the database, cease display of the first user interface object.

The operations described above with reference to FIGS. 9A-9B are, optionally, implemented by components depicted in FIGS. 1A-1B or FIG. 18. For example, receive operation at block 902, identify operation at block 904, generate operation at block 906, and display operation at block 908 may be implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub event, such as activation of an affordance on a user interface. When a respective predefined event or sub-event is detected, event recognizer 180 activates an event handler 190 associated with the detection of the event or sub-event. Event handler 190 may utilize or call data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Figure 19:
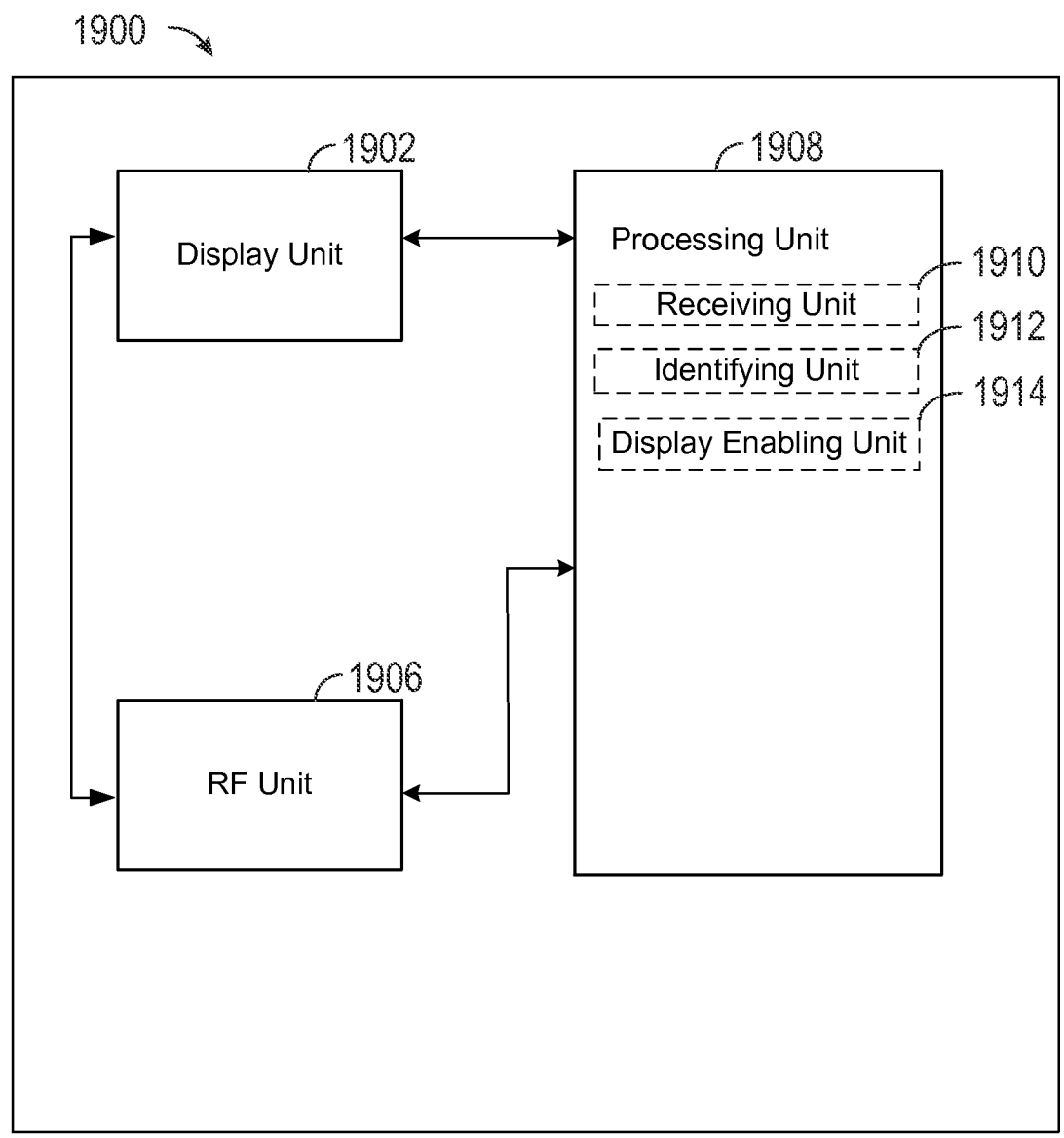
FIG. 19 is a functional block diagram of an electronic device in accordance with some embodiments.

In accordance with some embodiments, FIG. 19 shows a functional block diagram of an electronic device 1900 configured in accordance with the principles of the various described embodiments. The functional blocks of the device are, optionally, implemented by hardware, software, or a combination of hardware and software to carry out the principles of the various described embodiments. It is understood by persons of skill in the art that the functional blocks described in FIG. 19 are, optionally, combined or separated into sub-blocks to implement the principles of the various described embodiments. Therefore, the description herein optionally supports any possible combination or separation or further definition of the functional blocks described herein.

As shown in FIG. 19, an electronic device 1900 includes a display unit 1902 configured to display graphical objects and one or more RF units 1906 configured to communicate with external electronic devices; and processing unit 1908 coupled to display unit 1902 and one or more RF units 1906. In some embodiments, the processing unit 1908 includes a receiving unit 1910, an identifying unit 1912, and a display enabling unit 1914.

The processing unit 1908 is configured to: receive (e.g., with receiving unit 1910) a message; identify (e.g., with identifying unit 1912), in the received message, an entity and contact information associated with the entity; and enable display (e.g., with display enabling unit 1914) of a first user interface corresponding to the received message, the first user interface comprising: a first portion comprising content of the message as received by the electronic device; and a second portion comprising: a first user interface object corresponding to the identified entity; a second user interface object corresponding to the identified contact information; and a third user interface object associated with the identified contact information that, when selected, causes the electronic device to add the identified contact information to a database.

In some embodiments, the second portion comprises a fourth user interface object associated with the identified contact information that, when selected, causes the electronic device to cease displaying the third user interface object.

In some embodiments, the message comprises an email.

In some embodiments, the identified entity comprises a name and the identified contact information comprises a phone number, address, business or social networking handle.

The operations described above with reference to FIG. 10 are, optionally, implemented by components depicted in FIGS. 1A-1B or FIG. 19. For example, receive operation at block 1002, identify operation at block 1004, and display operation at block 1010 may be implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub event, such as activation of an affordance on a user interface. When a respective predefined event or sub-event is detected, event recognizer 180 activates an event handler 190 associated with the detection of the event or sub-event. Event handler 190 may utilize or call data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Figure 20:
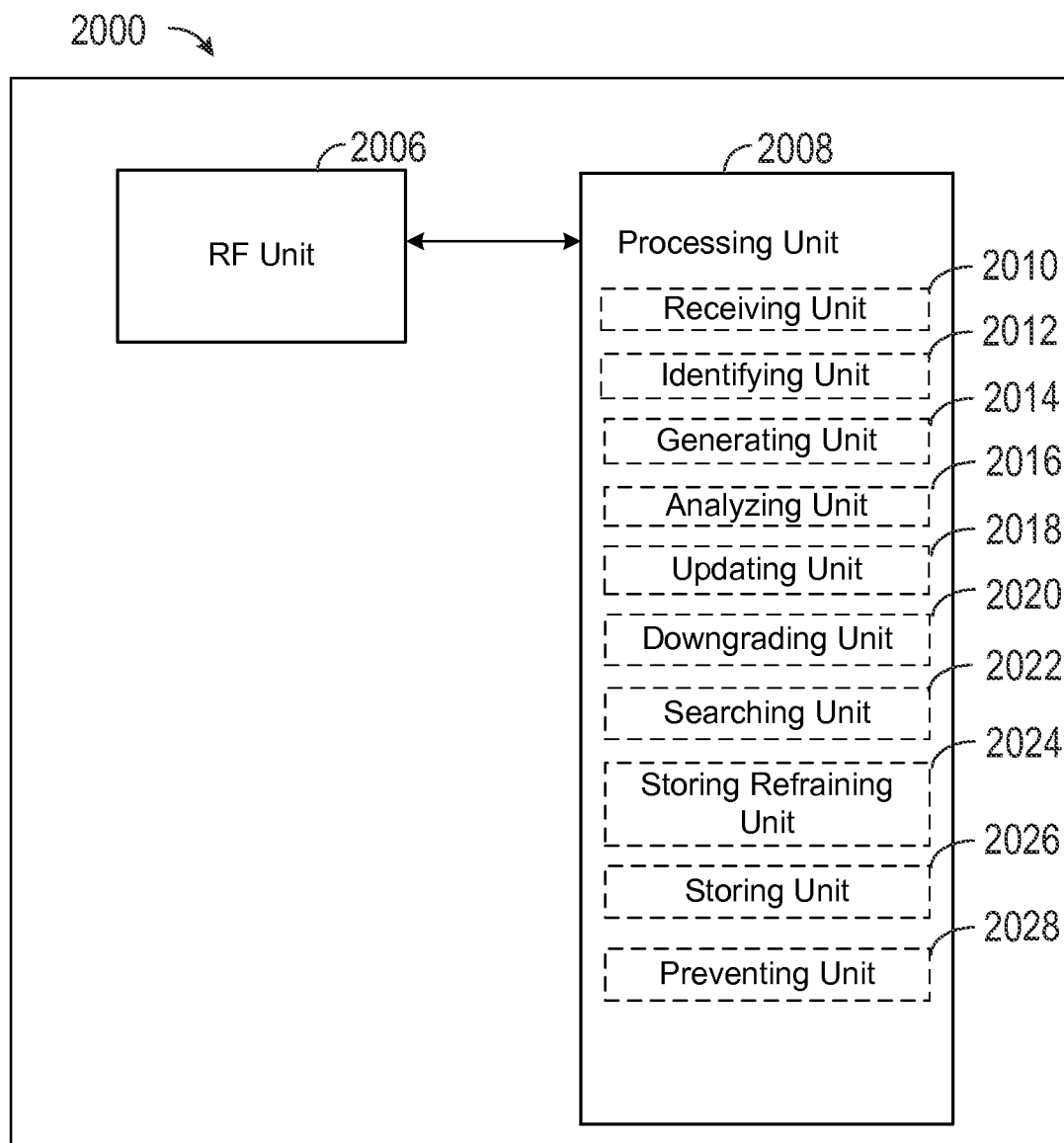
FIG. 20 is a functional block diagram of an electronic device in accordance with some embodiments.

In accordance with some embodiments, FIG. 20 shows a functional block diagram of an electronic device 2000 configured in accordance with the principles of the various described embodiments. The functional blocks of the device are, optionally, implemented by hardware, software, or a combination of hardware and software to carry out the principles of the various described embodiments. It is understood by persons of skill in the art that the functional blocks described in FIG. 20 are, optionally, combined or separated into sub-blocks to implement the principles of the various described embodiments. Therefore, the description herein optionally supports any possible combination or separation or further definition of the functional blocks described herein.

As shown in FIG. 20, an electronic device 2000 includes one or more RF units 2006 configured to communicate with external electronic devices; and processing unit 2008 coupled to one or more RF units 2006. In some embodiments, the processing unit 2008 includes a receiving unit 2010, an identifying unit 2012, a generating unit 2014, an analyzing unit 2016, an updating unit 2018, a downgrading unit 2020, a searching unit 2022, a storing refraining unit 2024, a storing unit 2026, and a preventing unit 2028.

The processing unit 2008 is configured to: receive (e.g., with receiving unit 2010) a message; identify (e.g., with identifying unit 2012), in the received message, event information; and generate (e.g., with generating unit 2014) a calendar event associated with the identified event information, the generated calendar event comprising the event information and an indication that the generated calendar event is a suggested calendar event.

In some embodiments, the identified event information comprises a date and a time.

In some embodiments, to identify, the processing unit 2008 is further configured to: identify (e.g., with identifying unit 2012) a format of content in the message; identify (e.g., with identifying unit 2012) a template from a collection of predefined templates that is configured to recognize event information in the format of the content in the message; and analyze (e.g., with analyzing unit 2016) the content with the identified template for the event information.

In some embodiments, the message comprises an email and the content comprises a reservation.

In some embodiments, the processing unit 2008 is further configured to update (e.g., with updating unit 2018) the collection of predefined templates over a network.

In some embodiments, to identify, the processing unit 2008 is further configured to: identify (e.g., with identifying unit 2012) in the message one or more references to a date and time based on a collection of predefined references to a date and time; and analyze (e.g., with analyzing unit 2016) the one or more identified references to a date and time for the event information.

In some embodiments, the processing unit 2008 is further configured to update (e.g., with updating unit 2018) the collection of predefined references to a date and time over a network.

In some embodiments, the processing unit 2008 is further configured to downgrade (e.g., with downgrading unit 2020) one or more of the predefined references to a date and time as a result of a request to reject the suggested calendar event.

In some embodiments, the processing unit 2008 is further configured to generate (e.g., with generating unit 2014) one or more of the predefined references to a date and time by cross-correlating event information in a database comprising a plurality of calendar events with language associated with event information on the electronic device.

In some embodiments, the processing unit 2008 is further configured to: receive (e.g., with receiving unit 2010) a request for a calendar event; and in response to the request for a calendar event, search (e.g., with searching unit 2022) the suggested calendar event.

In some embodiments, the processing unit 2008 is further configured to, in response to the generation of the calendar event, refrain from storing (e.g., with storing refraining unit 2024) the suggested calendar event in a remote database over a network.

In some embodiments, the processing unit 2008 is further configured to: receive (e.g., with receiving unit 2010) a request to add the suggested calendar event to a database comprising a plurality of calendar events; and in response to the request to add the suggested calendar event to the database, store (e.g., with storing unit 2026) the generated calendar event, without the indication that the generated calendar event is a suggested calendar event, in the database.

In some embodiments, the processing unit 2008 is further configured to, in response to the request to add the suggested calendar event to the database, store (e.g., with storing unit 2026) the generated calendar event, without the indication that the generated calendar event is a suggested calendar event, in a remote database over a network.

In some embodiments, the processing unit 2008 is further configured to: receive (e.g., with receiving unit 2010) a request to reject the suggested calendar event; and in response to the request to reject the suggested calendar event, prevent (e.g., with preventing unit 2028) the suggested calendar event from being generated in the future as a result of the event information being identified in a future message.

The operations described above with reference to FIGS. 11A-11B are, optionally, implemented by components depicted in FIGS. 1A-1B or FIG. 20. For example, receive operation at block 1102, identify operation at block 1104, and generate operation at block 1122 may be implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub event, such as activation of an affordance on a user interface. When a respective predefined event or sub-event is detected, event recognizer 180 activates an event handler 190 associated with the detection of the event or sub-event. Event handler 190 may utilize or call data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Figure 21:
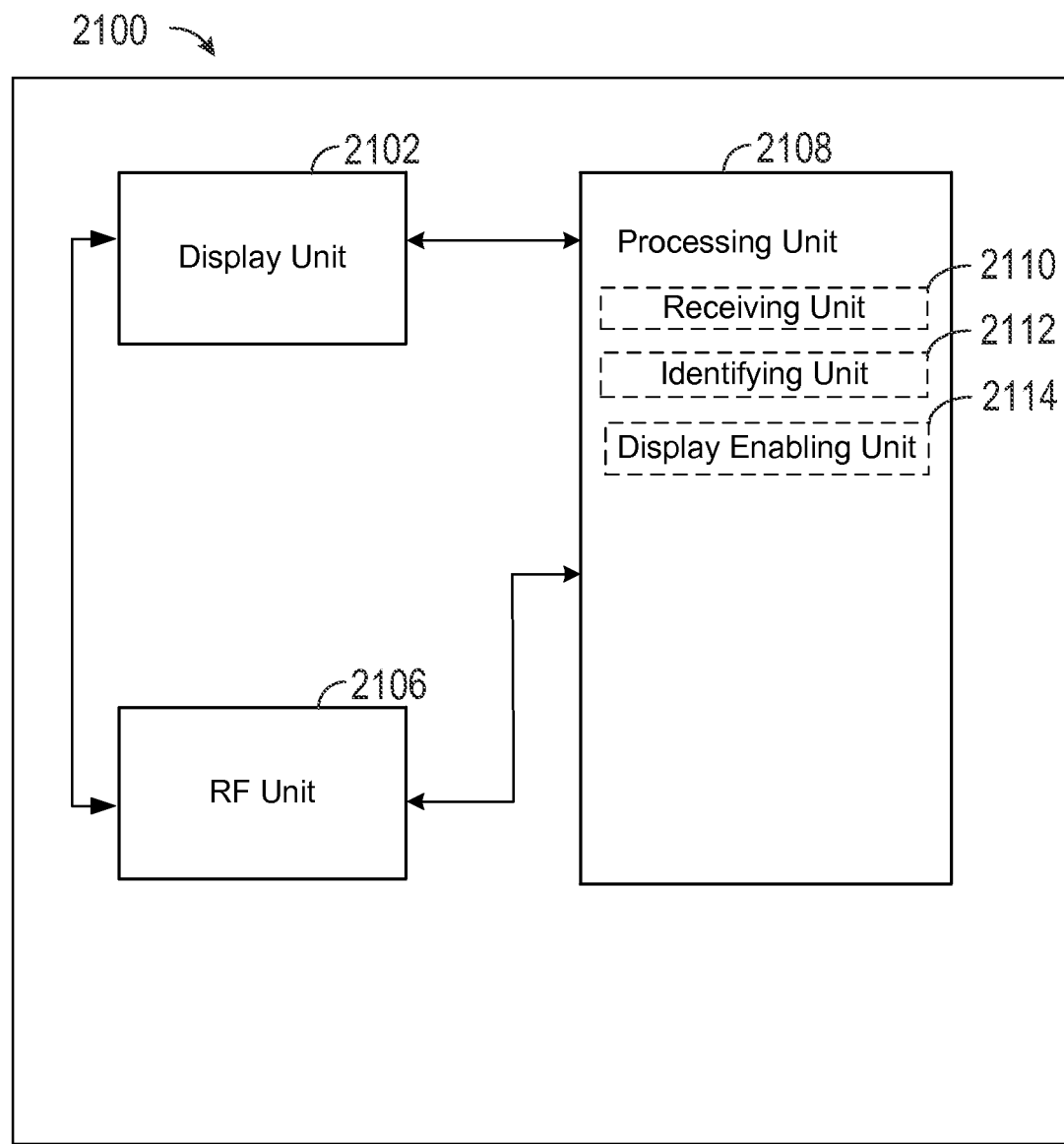
FIG. 21 is a functional block diagram of an electronic device in accordance with some embodiments.

In accordance with some embodiments, FIG. 21 shows a functional block diagram of an electronic device 2100 configured in accordance with the principles of the various described embodiments. The functional blocks of the device are, optionally, implemented by hardware, software, or a combination of hardware and software to carry out the principles of the various described embodiments. It is understood by persons of skill in the art that the functional blocks described in FIG. 21 are, optionally, combined or separated into sub-blocks to implement the principles of the various described embodiments. Therefore, the description herein optionally supports any possible combination or separation or further definition of the functional blocks described herein.

As shown in FIG. 21, an electronic device 2100 includes a display unit 2102 configured to display graphical objects and one or more RF units 2106 configured to communicate with external electronic devices; and processing unit 2108 coupled to display unit 2102 and one or more RF units 2106. In some embodiments, the processing unit 2108 includes a receiving unit 2110, an identifying unit 2112, and a display enabling unit 2114.

The processing unit 2108 is configured to: receive (e.g., with receiving unit 2110) a message; identify (e.g., with identifying unit 2112), in the received message, event information; and enable display (e.g., with display enabling unit 2114) of a first user interface corresponding to the received message, the first user interface comprising: a first portion comprising content of the message as received by the electronic device; and a second portion comprising: a first user interface object corresponding to the identified event information; and a second user interface object associated with the identified event information that, when selected, causes the electronic device to add the identified event information to a database comprising a plurality of calendar events.

In some embodiments, the second portion comprises a third user interface object associated with the identified event information that, when selected, causes the electronic device to cease displaying the second user interface object.

In some embodiments, the message comprises an email.

In some embodiments, the identified event information comprises a date and a time.

The operations described above with reference to FIG. 12 are, optionally, implemented by components depicted in FIGS. 1A-1B or FIG. 21. For example, receive operation at block 1202, identify operation at block 1204, and display operation at block 1210 may be implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub event, such as activation of an affordance on a user interface. When a respective predefined event or sub-event is detected, event recognizer 180 activates an event handler 190 associated with the detection of the event or sub-event. Event handler 190 may utilize or call data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Figure 22:
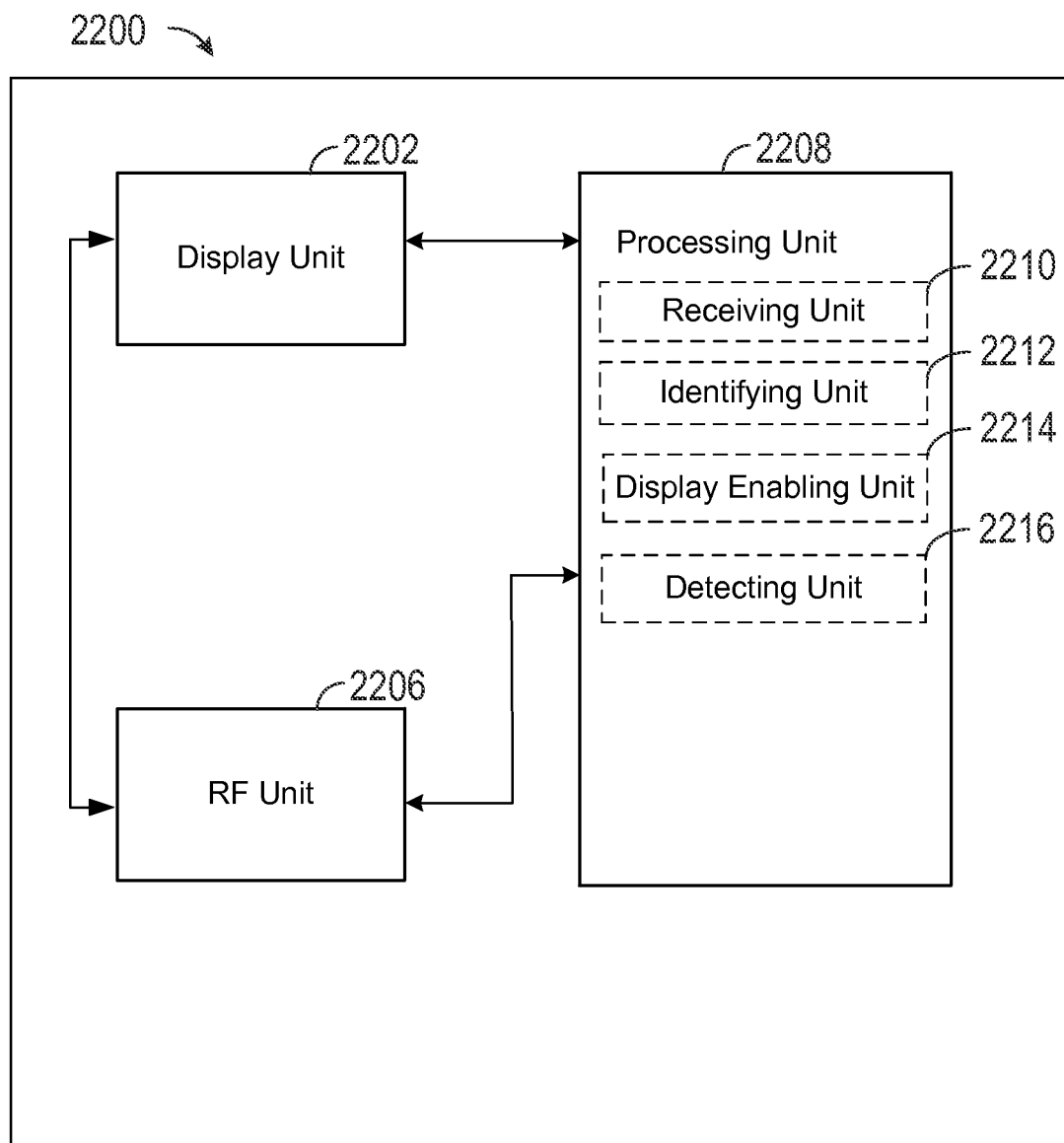
FIG. 22 is a functional block diagram of an electronic device in accordance with some embodiments.

In accordance with some embodiments, FIG. 22 shows a functional block diagram of an electronic device 2200 configured in accordance with the principles of the various described embodiments. The functional blocks of the device are, optionally, implemented by hardware, software, or a combination of hardware and software to carry out the principles of the various described embodiments. It is understood by persons of skill in the art that the functional blocks described in FIG. 22 are, optionally, combined or separated into sub-blocks to implement the principles of the various described embodiments. Therefore, the description herein optionally supports any possible combination or separation or further definition of the functional blocks described herein.

As shown in FIG. 22, an electronic device 2200 includes a display unit 2202 configured to display graphical objects and one or more RF units 2206 configured to communicate with external electronic devices; and processing unit 2208 coupled to display unit 2202 and one or more RF units 2206. In some embodiments, the processing unit 2208 includes a receiving unit 2210, an identifying unit 2212, a display enabling unit 2214, and a detecting unit 2216.

The processing unit 2208 is configured to: receive (e.g., with receiving unit 2210) a message; identify (e.g., with identifying unit 2212), in the received message, multiple instances of contact or event information; and enable display (e.g., with display enabling unit 2214) of a first user interface corresponding to the received message, the first user interface comprising: a first portion comprising content of the message as received by the electronic device; and a second portion that, when selected, causes the electronic device to display a second user interface comprising a list of the multiple instances of identified contact or event information.

In some embodiments, the processing unit 2208 is further configured to: detect (e.g., with detecting unit 2216) an input corresponding to a selection of the second portion of the first user interface; and in response to the detection of the input corresponding to a selection of the second portion of the first user interface, enable display (e.g., with display enabling unit 2214) of the second user interface comprising: the list of the multiple instances of identified contact or event information; and for each of the multiple instances of identified contact or event information, a first user interface object that, when selected, causes the electronic device to add the identified information to a database.

In some embodiments, the second user interface comprises, for each of the multiple instances of identified contact or event information, a second user interface object that, when selected, causes the electronic device to cease displaying the first user interface object.

In some embodiments, the second user interface comprises a third user interface object that, when selected, causes the electronic device to add each of a grouping of the multiple instances of identified contact or event information to a database.

In some embodiments, to enable display of the second user interface ceases display of the first user interface.

The operations described above with reference to FIG. 13 are, optionally, implemented by components depicted in FIGS. 1A-1B or FIG. 22. For example, receive operation at block 1302, identify operation at block 1304, and display operation at block 1306 may be implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub event, such as activation of an affordance on a user interface. When a respective predefined event or sub-event is detected, event recognizer 180 activates an event handler 190 associated with the detection of the event or sub-event. Event handler 190 may utilize or call data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

As described above, one aspect of the present technology is the gathering and use of data available from various sources to improve the delivery to users of invitational content or any other content that may be of interest to them. The present disclosure contemplates that in some instances, this gathered data may include personal information data that uniquely identifies or can be used to contact or locate a specific person. Such personal information data can include demographic data, location-based data, telephone numbers, email addresses, home addresses, or any other identifying information.

The present disclosure recognizes that the use of such personal information data, in the present technology, can be used to the benefit of users. For example, the personal information data can be used to deliver targeted content that is of greater interest to the user. Accordingly, use of such personal information data enables calculated control of the delivered content. Further, other uses for personal information data that benefit the user are also contemplated by the present disclosure.

The present disclosure further contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. For example, personal information from users should be collected for legitimate and reasonable uses of the entity and not shared or sold outside of those legitimate uses. Further, such collection should occur only after receiving the informed consent of the users. Additionally, such entities would take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services. In another example, users can select not to provide location information for targeted content delivery services. In yet another example, users can select to not provide precise location information, but permit the transfer of location zone information.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publically available information.

What is claimed is:

1. A non-transitory computer readable storage medium storing one or more programs configured to be executed by one or more processors of an electronic device with a display, the one or more programs including instructions for:
    receiving a message that includes unstructured content;
    in response to receiving the message, identifying, in the unstructured content, event information; and
    in response to identifying the event information, generating a calendar event associated with the identified event information;
    in response to a request to view the received message, concurrently displaying, on the display:
        at least a portion of the received message;
        an indication that the generated calendar event is a suggested calendar event; and
        a rejection affordance for the generated calendar event;
    while displaying, on the display, the rejection affordance for the generated calendar event, detecting selection of the rejection affordance; and
    in response to detecting selection of the rejection affordance:
        ceasing to display the indication that the generated calendar event is a suggested calendar event, and
        maintaining display of the at least a portion of the received message.

2. The non-transitory computer readable storage medium of claim 1, wherein the identified event information comprises a date and a time.

3. The non-transitory computer readable storage medium of claim 1, wherein identifying event information further includes:
    identifying a format of content in the message;
    identifying a template from a collection of predefined templates that is configured to recognize event information in the format of the content in the message; and
    analyzing the content with the identified template for the event information.

4. The non-transitory computer readable storage medium of claim 3, wherein the message comprises an email and the content comprises a reservation.

5. The non-transitory computer readable storage medium of claim 3, the one or more programs further including instructions for:
   updating the collection of predefined templates over a network.

6. The non-transitory computer readable storage medium of claim 1, wherein identifying event information further includes:
   identifying in the message one or more references to a date and time based on a collection of predefined references to a date and time; and
   analyzing the one or more identified references to a date and time for the event information.

7. The non-transitory computer readable storage medium of claim 6, the one or more programs further including instructions for:
   updating the collection of predefined references to a date and time over a network.

8. The non-transitory computer readable storage medium of claim 6, the one or more programs further including instructions for:
   downgrading one or more of the predefined references to a date and time as a result of a request to reject the suggested calendar event.

9. The non-transitory computer readable storage medium of claim 6, the one or more programs further including instructions for:
   generating one or more of the predefined references to a date and time by cross-correlating event information in a database comprising a plurality of calendar events with language associated with event information on the electronic device.

10. The non-transitory computer readable storage medium of claim 1, the one or more programs further including instructions for:
    receiving a request for a calendar event; and
    in response to the request for a calendar event, searching the suggested calendar event.

11. The non-transitory computer readable storage medium of claim 1, the one or more programs further including instructions for:
    in response to the generation of the calendar event, refraining from storing the suggested calendar event in a remote database over a network.

12. The non-transitory computer readable storage medium of claim 1, the one or more programs further including instructions for:
    receiving a request to add the suggested calendar event to a database comprising a plurality of calendar events; and
    in response to the request to add the suggested calendar event to the database, storing the generated calendar event, without the indication that the generated calendar event is a suggested calendar event, in the database.

13. The non-transitory computer readable storage medium of claim 12, the one or more programs further including instructions for:
    in response to the request to add the suggested calendar event to the database, storing the generated calendar event, without the indication that the generated calendar event is a suggested calendar event, in a remote database over a network.

14. The non-transitory computer readable storage medium of claim 1, the one or more programs further including instructions for:
    receiving a request to reject the suggested calendar event; and
    in response to the request to reject the suggested calendar event, preventing the suggested calendar event from being generated in the future as a result of the event information being identified in a future message.

15. The non-transitory computer readable storage medium of claim 1, wherein the unstructured content is natural language content.

16. An electronic device, comprising:
    a display;
    one or more processors;
    memory; and
    one or more programs, wherein the one or more programs are stored in the memory and configured to be executed by the one or more processors, the one or more programs including instructions for:
    receiving a message that includes unstructured content;
    in response to receiving the message, identifying, in the unstructured content, event information; and
    in response to identifying the event information, generating a calendar event associated with the identified event information;
    in response to a request to view the received message, concurrently displaying, on the display:
      at least a portion of the received message; and
      an indication that the generated calendar event is a suggested calendar event; and
      a rejection affordance for the generated calendar event;
    while displaying, on the display, the rejection affordance for the generated calendar event, detecting selection of the rejection affordance; and
    in response to detecting selection of the rejection affordance:
      ceasing to display the indication that the generated calendar event is a suggested calendar event, and
      maintaining display of the at least a portion of the received message.

17. The electronic device of claim 15, wherein the identified event information comprises a date and a time.

18. The electronic device of claim 15, wherein identifying event information further includes:
    identifying a format of content in the message;
    identifying a template from a collection of predefined templates that is configured to recognize event information in the format of the content in the message; and
    analyzing the content with the identified template for the event information.

19. The electronic device of claim 18, wherein the message comprises an email and the content comprises a reservation.

20. The electronic device of claim 18, the one or more programs further including instructions for:
    updating the collection of predefined templates over a network.

21. The electronic device of claim 16, wherein identifying event information further includes:
    identifying in the message one or more references to a date and time based on a collection of predefined references to a date and time; and
    analyzing the one or more identified references to a date and time for the event information.

22. The electronic device of claim 21, the one or more programs further including instructions for:
    updating the collection of predefined references to a date and time over a network.

23. The electronic device of claim 21, the one or more programs further including instructions for:

downgrading one or more of the predefined references to a date and time as a result of a request to reject the suggested calendar event.

24. The electronic device of claim 21, the one or more programs further including instructions for:
generating one or more of the predefined references to a date and time by cross-correlating event information in a database comprising a plurality of calendar events with language associated with event information on the electronic device.

25. The electronic device of claim 16, the one or more programs further including instructions for:
receiving a request for a calendar event; and
in response to the request for a calendar event, searching the suggested calendar event.

26. The electronic device of claim 16, the one or more programs further including instructions for:
in response to the generation of the calendar event, refraining from storing the suggested calendar event in a remote database over a network.

27. The electronic device of claim 16, the one or more programs further including instructions for:
receiving a request to add the suggested calendar event to a database comprising a plurality of calendar events; and
in response to the request to add the suggested calendar event to the database, storing the generated calendar event, without the indication that the generated calendar event is a suggested calendar event, in the database.

28. The electronic device of claim 27, the one or more programs further including instructions for:
in response to the request to add the suggested calendar event to the database, storing the generated calendar event, without the indication that the generated calendar event is a suggested calendar event, in a remote database over a network.

29. The electronic device of claim 15, the one or more programs further including instructions for:
receiving a request to reject the suggested calendar event; and
in response to the request to reject the suggested calendar event, preventing the suggested calendar event from being generated in the future as a result of the event information being identified in a future message.

30. The electronic device of claim 16, wherein the unstructured content is natural language content.

31. A method comprising:
at an electronic device with a display:
receiving a message that includes unstructured content;
in response to receiving the message, identifying, in the unstructured content, event information; and
in response to identifying the event information, generating a calendar event associated with the identified event information;
in response to a request to view the received message, concurrently displaying, on the display:
at least a portion of the received message; and
an indication that the generated calendar event is a suggested calendar event; and
a rejection affordance for the generated calendar event;
while displaying, on the display, the rejection affordance for the generated calendar event, detecting selection of the rejection affordance; and
in response to detecting selection of the rejection affordance:
ceasing to display the indication that the generated calendar event is a suggested calendar event, and maintaining display of the at least a portion of the received message.

32. The method of claim 31, wherein the identified event information comprises a date and a time.

33. The method of claim 31, wherein identifying event information further includes:
identifying a format of content in the message;
identifying a template from a collection of predefined templates that is configured to recognize event information in the format of the content in the message; and
analyzing the content with the identified template for the event information.

34. The method of claim 33, wherein the message comprises an email and the content comprises a reservation.

35. The method of claim 33, further comprising:
updating the collection of predefined templates over a network.

36. The method of claim 31, wherein identifying event information further includes:
identifying in the message one or more references to a date and time based on a collection of predefined references to a date and time; and
analyzing the one or more identified references to a date and time for the event information.

37. The method of claim 36, further comprising:
updating the collection of predefined references to a date and time over a network.

38. The method of claim 36, further comprising:
downgrading one or more of the predefined references to a date and time as a result of a request to reject the suggested calendar event.

39. The method of claim 36, further comprising:
generating one or more of the predefined references to a date and time by cross-correlating event information in a database comprising a plurality of calendar events with language associated with event information on the method.

40. The method of claim 31, further comprising:
receiving a request for a calendar event; and
in response to the request for a calendar event, searching the suggested calendar event.

41. The method of claim 31, further comprising:
in response to the generation of the calendar event, refraining from storing the suggested calendar event in a remote database over a network.

42. The method of claim 31, further comprising:
receiving a request to add the suggested calendar event to a database comprising a plurality of calendar events; and
in response to the request to add the suggested calendar event to the database, storing the generated calendar event, without the indication that the generated calendar event is a suggested calendar event, in the database.

43. The method of claim 42, further comprising:
in response to the request to add the suggested calendar event to the database, storing the generated calendar event, without the indication that the generated calendar event is a suggested calendar event, in a remote database over a network.

44. The method of claim 31, further comprising:
receiving a request to reject the suggested calendar event; and
in response to the request to reject the suggested calendar event, preventing the suggested calendar event from being generated in the future as a result of the event information being identified in a future message.

45. The method of claim 31, wherein the unstructured content is natural language content.

\* \* \* \* \*

UNITED STATES PATENT AND TRADEMARK OFFICE
CERTIFICATE OF CORRECTION

Page 1 of 1

PATENT NO. : 10,579,212 B2
APPLICATION NO. : 14/724751
DATED : March 3, 2020
INVENTOR(S) : Daniel C. Gross et al.

It is certified that error appears in the above-identified patent and that said Letters Patent is hereby corrected as shown below:

On the Title Page

In The Title, and in the Specification, Column 1, Line 1, delete "STRUCTURED SUGGESTIONS" and insert -- AUTOMATICALLY IDENTIFYING AND PROVIDING CALENDAR EVENT SUGGESTIONS FROM MESSAGES --, therefor.

In The Other Publications, at Column 2, Line 2, delete "1115" and insert -- 11-15, --, therefor.

In the Claims

In Claim 17, at Column 58, Line 38, delete "15," and insert -- 16, --, therefor.

In Claim 18, at Column 58, Line 40, delete "15," and insert -- 16, --, therefor.

In Claim 29, at Column 59, Line 37, delete "15," and insert -- 16, --, therefor.

Signed and Sealed this
Twentieth Day of July, 2021

Drew Hirshfeld
*Performing the Functions and Duties of the*
*Under Secretary of Commerce for Intellectual Property and*
*Director of the United States Patent and Trademark Office*